United States Patent
Ismalon

(10) Patent No.: US 8,812,541 B2
(45) Date of Patent: *Aug. 19, 2014

(54) GENERATION OF REFINEMENT TERMS FOR SEARCH QUERIES

(71) Applicant: Collarity, Inc., Palo Alto, CA (US)

(72) Inventor: Emil Ismalon, Tel-Aviv (IL)

(73) Assignee: Collarity, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,986

(22) Filed: Mar. 12, 2013

(65) Prior Publication Data

US 2013/0173614 A1   Jul. 4, 2013

Related U.S. Application Data

(63) Continuation of application No. 12/801,534, filed on Jun. 14, 2010, now Pat. No. 8,429,184, which is a continuation-in-part of application No. 12/253,087, filed on Oct. 16, 2008, and a continuation-in-part of application No. 11/846,213, filed on Aug. 28, 2007, now Pat. No. 7,756,855, said application No. 12/253,087 is a continuation of application No. PCT/US2007/067103, filed on Apr. 20, 2007, and a continuation-in-part of application No. 11/633,461, filed on Dec. 5, 2006, now abandoned.

(60) Provisional application No. 60/887,580, filed on Jan. 31, 2007, provisional application No. 60/886,193, filed on Jan. 23, 2007, provisional application No. 60/829,135, filed on Oct. 11, 2006, provisional application No. 60/829,132, filed on Oct. 11, 2006, provisional application No. 60/829,136, filed on Oct. 11, 2006, provisional application No. 60/796,188, filed on May 1, 2006, provisional application No. 60/793,253, filed on Apr. 20, 2006, provisional application No. 60/741,902, filed on Dec. 5, 2005.

(51) Int. Cl.
G06F 17/30 (2006.01)

(52) U.S. Cl.
CPC .... *G06F 17/30011* (2013.01); *G06F 17/30017* (2013.01); *G06F 17/3002* (2013.01); *G06F 17/30026* (2013.01)
USPC .......... 707/769; 707/765; 707/759; 707/713; 709/201; 709/203; 709/213; 709/217

(58) Field of Classification Search
CPC ................ G06F 17/30011; G06F 17/30017; G06F 17/3002; G06F 17/30026
USPC .......... 707/759, 769, 713; 709/201, 203, 213, 709/217

See application file for complete search history.

(56) References Cited

U.S. PATENT DOCUMENTS

| | | |
|---|---|---|
| 4,823,306 A | 4/1989 | Barbic et al. |
| 5,301,109 A | 4/1994 | Landauer et al. |
| 5,325,445 A | 6/1994 | Herbert |
| 5,619,709 A | 4/1997 | Caid et al. |
| 5,724,521 A | 3/1998 | Dedrick |
| 5,754,938 A | 5/1998 | Herz et al. |
| 5,754,939 A | 5/1998 | Herz et al. |
| 5,809,242 A | 9/1998 | Shaw et al. |
| 5,825,943 A | 10/1998 | DeVito et al. |
| 5,857,179 A | 1/1999 | Vaithyanthan et al. |
| 5,864,845 A | 1/1999 | Voorhees et al. |
| 5,887,133 A | 3/1999 | Brown et al. |
| 5,926,812 A | 7/1999 | Hilsenrath et al. |
| 5,948,061 A | 9/1999 | Merriman et al. |
| 5,963,724 A | 10/1999 | Mantooth et al. |
| 5,987,457 A | 11/1999 | Ballard |
| 6,002,394 A | 12/1999 | Schein et al. |
| 6,006,225 A | 12/1999 | Bowman et al. |
| 6,098,065 A | 8/2000 | Skillen et al. |
| 6,134,532 A | 10/2000 | Lazarus et al. |
| 6,137,911 A | 10/2000 | Zhilyaev |
| 6,167,397 A | 12/2000 | Jacobson et al. |
| 6,189,002 B1 | 2/2001 | Roitblat |
| 6,233,591 B1 | 5/2001 | Sherman et al. .............. 707/501 |
| 6,289,353 B1 | 9/2001 | Hazlehurst et al. |
| 6,308,202 B1 | 10/2001 | Cohen et al. |
| 6,321,226 B1 | 11/2001 | Garber et al. |
| 6,327,574 B1 | 12/2001 | Kramer et al. |
| 6,347,313 B1 | 2/2002 | Ma et al. |
| 6,356,898 B2 | 3/2002 | Cohen et al. |

| | | |
|---|---|---|
| 6,360,221 B1 | 3/2002 | Gough et al. |
| 6,363,379 B1 | 3/2002 | Jacobson et al. |
| 6,366,298 B1 | 4/2002 | Haitsuka et al. |
| 6,377,961 B1 | 4/2002 | Ryu |
| 6,385,592 B1 | 5/2002 | Angles et al. |
| 6,411,950 B1 | 6/2002 | Moricz et al. |
| 6,442,545 B1 | 8/2002 | Feldman et al. |
| 6,449,657 B2 | 9/2002 | Stanbach, Jr. et al. |
| 6,449,765 B1 | 9/2002 | Ballard |
| 6,513,036 B2 | 1/2003 | Fruensgaard et al. |
| 6,529,903 B2 | 3/2003 | Smith et al. |
| 6,539,377 B1 | 3/2003 | Culliss |
| 6,539,396 B1 | 3/2003 | Bowman-Amuah |
| 6,564,213 B1 | 5/2003 | Ortega et al. |
| 6,581,056 B1 | 6/2003 | Rao |
| 6,584,492 B1 | 6/2003 | Cezar et al. |
| 6,611,825 B1 | 8/2003 | Billheimer et al. |
| 6,636,848 B1 | 10/2003 | Aridor et al. |
| 6,647,383 B1 | 11/2003 | August et al. |
| 6,665,656 B1 | 12/2003 | Carter |
| 6,665,838 B1 | 12/2003 | Brown et al. |
| 6,671,681 B1 | 12/2003 | Emens et al. |
| 6,675,205 B2 | 1/2004 | Meadway et al. |
| 6,681,223 B1 | 1/2004 | Sundaresan |
| 6,701,309 B1 | 3/2004 | Beeferman et al. |
| 6,708,176 B2 | 3/2004 | Strunk et al. |
| 6,711,577 B1 | 3/2004 | Wong et al. |
| 6,732,088 B1 | 5/2004 | Glance et al. |
| 6,772,150 B1 | 8/2004 | Whitman et al. |
| 6,772,200 B1 | 8/2004 | Bakshi et al. |
| 6,839,682 B1 | 1/2005 | Blume et al. |
| 6,842,906 B1 | 1/2005 | Bowman-Amuah |
| 6,874,018 B2 | 3/2005 | Wu |
| 6,876,997 B1 | 4/2005 | Rorex et al. |
| 6,892,181 B1 | 5/2005 | Megiddo et al. |
| 6,892,354 B1 | 5/2005 | Servan-Schreiber et al. |
| 6,904,408 B1 | 6/2005 | McCarthy et al. |
| 6,904,588 B2 | 6/2005 | Reddy et al. |
| 6,920,448 B2 | 7/2005 | Kincaid et al. |
| 6,925,460 B2 | 8/2005 | Kummamuru et al. |
| 6,947,930 B2 | 9/2005 | Anick et al. |
| 6,978,263 B2 | 12/2005 | Soulanille |
| 6,983,320 B1 | 1/2006 | Thomas et al. |
| 7,013,323 B1 | 3/2006 | Thomas et al. |
| 7,028,072 B1 | 4/2006 | Kliger et al. |
| 7,065,550 B2 | 6/2006 | Raghunandan |
| 7,076,497 B2 | 7/2006 | Donteverde |
| 7,089,237 B2 | 8/2006 | Turnbull et al. |
| 7,096,218 B2 | 8/2006 | Schrmer et al. |
| 7,110,993 B2 | 9/2006 | Soulanille et al. |
| 7,139,755 B2 | 11/2006 | Hammond |
| 7,152,059 B2 | 12/2006 | Monteverde |
| 7,152,061 B2 | 12/2006 | Curtis et al. |
| 7,152,065 B2 | 12/2006 | Behrens et al. |
| 7,181,438 B1 | 2/2007 | Szabo |
| 7,236,969 B1 | 6/2007 | Skillen et al. |
| 7,257,570 B2 | 8/2007 | Riise et al. |
| 7,272,638 B2 | 9/2007 | Lee et al. |
| 7,295,991 B1 | 11/2007 | Clarke et al. |
| 7,296,019 B1 | 11/2007 | Chandrasekar et al. |
| 7,313,556 B2 | 12/2007 | Gallivan et al. |
| 7,319,975 B2 | 1/2008 | Monteverde |
| 7,321,892 B2 | 1/2008 | Vadon et al. |
| 7,376,709 B1 | 5/2008 | Brei et al. |
| 7,451,129 B2 | 11/2008 | Lamping et al. |
| 7,451,130 B2 | 11/2008 | Gupta et al. |
| 7,461,059 B2 | 12/2008 | Richardson et al. |
| 7,464,079 B2 | 12/2008 | Soulanille |
| 7,469,245 B2 | 12/2008 | Skillen et al. |
| 7,499,940 B1 | 3/2009 | Gibbs |
| 7,529,740 B2 | 5/2009 | Chang et al. |
| 7,539,693 B2 | 5/2009 | Frank et al. |
| 7,562,074 B2 | 7/2009 | Liddell et al. |
| 7,565,345 B2 | 7/2009 | Bailey et al. |
| 7,567,958 B1 | 7/2009 | Alspector et al. |
| 7,577,718 B2 | 8/2009 | Slawson et al. |
| 7,593,929 B2 | 9/2009 | Dettinger et al. |
| 7,596,581 B2 | 9/2009 | Frank et al. |
| 7,606,798 B2 | 10/2009 | Ge et al. |
| 7,634,462 B2 | 12/2009 | Weyand et al. |
| 7,636,714 B2 | 12/2009 | Lamping et al. |
| 7,660,737 B1 | 2/2010 | Lim et al. |
| 7,660,815 B1 | 2/2010 | Scofield et al. |
| 7,676,462 B2 | 3/2010 | Kirkland et al. |
| 7,676,517 B2 | 3/2010 | Hurst-Hiller et al. |
| 7,685,192 B1 | 3/2010 | Scofield et al. |
| 7,739,357 B2 | 6/2010 | Gould |
| 7,752,326 B2 | 7/2010 | Smit |
| 7,756,855 B2 | 7/2010 | Ismalon |
| 7,774,335 B2 | 8/2010 | Scofield et al. |
| 7,774,339 B2 | 8/2010 | White et al. |
| 7,774,348 B2 | 8/2010 | Delli Santi et al. |
| 7,788,252 B2 | 8/2010 | Delli Santi et al. |
| 7,788,276 B2 | 8/2010 | Peng et al. |
| 7,792,813 B2 | 9/2010 | Selberg |
| 7,792,832 B2 | 9/2010 | Poltorak |
| 7,793,326 B2 | 9/2010 | McCoskey et al. |
| 7,797,421 B1 | 9/2010 | Scofield et al. |
| 7,805,339 B2 | 9/2010 | Ashkenazi et al. |
| 7,805,450 B2 | 9/2010 | Delli Santi et al. |
| 7,809,548 B2 | 10/2010 | Mihalcea et al. |
| 7,809,721 B2 | 10/2010 | Putivsky et al. |
| 7,810,119 B2 | 10/2010 | Johnson |
| 7,813,967 B2 | 10/2010 | Kopelman et al. |
| 7,814,097 B2 | 10/2010 | Smith et al. |
| 7,822,774 B2 | 10/2010 | Craswell et al. |
| 7,831,582 B1 | 11/2010 | Scofield et al. |
| 7,844,599 B2 | 11/2010 | Kasperski et al. |
| 7,870,147 B2 | 1/2011 | Bailey et al. |
| 7,890,521 B1 | 2/2011 | Grushetskyy et al. |
| 7,917,528 B1 | 3/2011 | Dave et al. |
| 7,925,498 B1 | 4/2011 | Baker et al. |
| 7,962,479 B2 | 6/2011 | Jones et al. |
| 8,073,868 B2 | 12/2011 | Lavi |
| 8,135,729 B2 | 3/2012 | Brewer et al. |
| 8,429,184 B2 * | 4/2013 | Ismalon ................ 707/765 |
| 2001/0042064 A1 | 11/2001 | Davis et al. |
| 2002/0073088 A1 | 6/2002 | Beckmann et al. |
| 2002/0078045 A1 | 6/2002 | Dutta |
| 2002/0100040 A1 | 7/2002 | Bull |
| 2002/0107853 A1 | 8/2002 | Hofmann et al. |
| 2002/0111994 A1 | 8/2002 | Raghunandan |
| 2002/0123912 A1 | 9/2002 | Subramanian et al. |
| 2002/0133483 A1 | 9/2002 | Klenk et al. |
| 2002/0161747 A1 | 10/2002 | Li et al. |
| 2002/0169764 A1 | 11/2002 | Kincaid et al. |
| 2002/0198882 A1 | 12/2002 | Linden et al. |
| 2003/0020745 A1 | 1/2003 | Kawaguchi et al. |
| 2003/0058277 A1 | 3/2003 | Bowman-Amuah |
| 2003/0061206 A1 | 3/2003 | Qian |
| 2003/0123443 A1 | 7/2003 | Anwar |
| 2003/0126136 A1 | 7/2003 | Omoigui ................ 707/10 |
| 2003/0140313 A1 | 7/2003 | Smith |
| 2003/0220917 A1 | 11/2003 | Copperman et al. |
| 2004/0010566 A1 | 1/2004 | Monteverde |
| 2004/0034652 A1 | 2/2004 | Hofmann et al. |
| 2004/0034799 A1 | 2/2004 | Mikami |
| 2004/0068486 A1 | 4/2004 | Childovski |
| 2004/0073485 A1 | 4/2004 | Liu et al. |
| 2004/0153472 A1 | 8/2004 | Rieffanaugh |
| 2004/0158559 A1 | 8/2004 | Poltorak |
| 2004/0249709 A1 | 12/2004 | Donovan et al. |
| 2004/0249809 A1 | 12/2004 | Ramani et al. |
| 2005/0027691 A1 | 2/2005 | Brin et al. |
| 2005/0033657 A1 | 2/2005 | Herrington et al. |
| 2005/0055341 A1 | 3/2005 | Haar et al. |
| 2005/0076003 A1 | 4/2005 | DuBose et al. |
| 2005/0076097 A1 | 4/2005 | Sullivan et al. |
| 2005/0086283 A1 | 4/2005 | Marshall |
| 2005/0091204 A1 | 4/2005 | Melman |
| 2005/0108001 A1 | 5/2005 | Aarskog |
| 2005/0114322 A1 | 5/2005 | Melman |
| 2005/0114324 A1 | 5/2005 | Mayer |
| 2005/0131762 A1 | 6/2005 | Bharat et al. |
| 2005/0144158 A1 | 6/2005 | Capper et al. |
| 2005/0149494 A1 | 7/2005 | Lindh et al. |
| 2005/0171760 A1 | 8/2005 | Tinkler |
| 2005/0210024 A1 | 9/2005 | Hurst-Hiller et al. |

| | | |
|---|---|---|
| 2005/0216434 A1 | 9/2005 | Haveliwala et al. |
| 2005/0222989 A1 | 10/2005 | Haveliwala et al. |
| 2005/0234881 A1 | 10/2005 | Burago et al. |
| 2005/0234904 A1 | 10/2005 | Brill et al. |
| 2005/0283468 A1 | 12/2005 | Kamvar et al. |
| 2006/0026013 A1 | 2/2006 | Kraft |
| 2006/0047643 A1 | 3/2006 | Chaman |
| 2006/0059134 A1 | 3/2006 | Palmon et al. |
| 2006/0074883 A1 | 4/2006 | Teevan et al. |
| 2006/0101074 A1 | 5/2006 | Cancilla et al. |
| 2006/0115145 A1 | 6/2006 | Bishop et al. |
| 2006/0161520 A1 | 7/2006 | Brewer et al. |
| 2006/0161553 A1 | 7/2006 | Woo |
| 2006/0167842 A1 | 7/2006 | Watson |
| 2006/0179051 A1 | 8/2006 | Whitney et al. |
| 2006/0184512 A1 | 8/2006 | Kohanim et al. |
| 2006/0218146 A1 | 9/2006 | Bitan et al. |
| 2006/0242129 A1 | 10/2006 | Libes et al. |
| 2006/0248062 A1 | 11/2006 | Libes et al. |
| 2006/0253427 A1 | 11/2006 | Wu et al. |
| 2006/0259481 A1 | 11/2006 | Handley |
| 2006/0282328 A1 | 12/2006 | Gerace et al. |
| 2006/0294084 A1 | 12/2006 | Patel et al. |
| 2007/0005590 A1 | 1/2007 | Thrasher |
| 2007/0011154 A1 | 1/2007 | Musgrove et al. |
| 2007/0011668 A1 | 1/2007 | Wholey et al. |
| 2007/0043617 A1 | 2/2007 | Stein et al. |
| 2007/0043688 A1 | 2/2007 | Kountz et al. |
| 2007/0050339 A1 | 3/2007 | Kasperski et al. |
| 2007/0061301 A1 | 3/2007 | Ramer et al. |
| 2007/0073694 A1 | 3/2007 | Picault et al. |
| 2007/0073756 A1 | 3/2007 | Manhas et al. |
| 2007/0083506 A1 | 4/2007 | Liddell et al. |
| 2007/0121843 A1 | 5/2007 | Atazky et al. |
| 2007/0150537 A1 | 6/2007 | Graham |
| 2007/0162396 A1 | 7/2007 | Goldman et al. |
| 2007/0162422 A1 | 7/2007 | Djabarov |
| 2007/0174255 A1 | 7/2007 | Sravanapudi et al. |
| 2007/0198474 A1 | 8/2007 | Davidson et al. |
| 2007/0198506 A1 | 8/2007 | Attaran Rezaei et al. |
| 2007/0198526 A1 | 8/2007 | Pitkow |
| 2007/0203887 A1 | 8/2007 | Dynin |
| 2007/0203929 A1 | 8/2007 | Bolivar |
| 2007/0208630 A1 | 9/2007 | Chatter et al. |
| 2007/0214123 A1 | 9/2007 | Messer et al. |
| 2007/0244866 A1 | 10/2007 | Mishkanian et al. |
| 2007/0250500 A1 | 10/2007 | Ismalon |
| 2007/0250511 A1 | 10/2007 | Endler et al. |
| 2007/0255702 A1 | 11/2007 | Orme |
| 2007/0266019 A1 | 11/2007 | Lavi |
| 2007/0276829 A1 | 11/2007 | Wang et al. |
| 2007/0282785 A1 | 12/2007 | Fayyad et al. |
| 2008/0004959 A1 | 1/2008 | Tunguz-Zawislak et al. |
| 2008/0016034 A1 | 1/2008 | Guha et al. |
| 2008/0040126 A1 | 2/2008 | Estrada et al. ............ 705/1 |
| 2008/0065617 A1 | 3/2008 | Burke et al. |
| 2008/0070209 A1 | 3/2008 | Zhuang et al. |
| 2008/0091670 A1 | 4/2008 | Ismalon |
| 2008/0104026 A1 | 5/2008 | Koran |
| 2008/0114751 A1 | 5/2008 | Cramer et al. |
| 2008/0137668 A1 | 6/2008 | Rodriguez et al. |
| 2008/0140643 A1 | 6/2008 | Ismalon |
| 2008/0172363 A1 | 7/2008 | Wang et al. |
| 2008/0172380 A1 | 7/2008 | Czyz et al. |
| 2008/0215416 A1 | 9/2008 | Ismalon |
| 2008/0275861 A1 | 11/2008 | Baluja et al. |
| 2008/0288596 A1 | 11/2008 | Smith et al. |
| 2008/0300937 A1 | 12/2008 | Allen et al. |
| 2009/0119261 A1 | 5/2009 | Ismalon |
| 2009/0144234 A1 | 6/2009 | Sharif et al. |
| 2009/0177556 A1 | 7/2009 | Matsuo ............ 705/26 |
| 2009/0228296 A1 | 9/2009 | Ismalon |
| 2009/0241065 A1 | 9/2009 | Costello |
| 2009/0241066 A1 | 9/2009 | Costello |
| 2009/0277556 A1 | 11/2009 | Aoyama |
| 2009/0288012 A1 | 11/2009 | Hertel et al. |
| 2010/0070898 A1 | 3/2010 | Langlois et al. |
| 2010/0228710 A1 | 9/2010 | Imig et al. |
| 2011/0035403 A1 | 2/2011 | Ismalon |
| 2011/0040619 A1 | 2/2011 | Jebara et al. |

FOREIGN PATENT DOCUMENTS

| | | |
|---|---|---|
| EP | 1 653 376 | 5/2006 |
| WO | WO 2007/124430 | 11/2007 |

OTHER PUBLICATIONS

Jan Pedersen et al., Snippet Search: a Single Phrase Approach to Text Access (1991) (Xerox Parc) in Proceedings of the 1991 Joint Statistical Meetings. American Statistical Association.

Gauch S et al., "An Expert System for Automatic Query Reformulation" (1993).

Ubiquitous Advertising on the Merging Advertisement on the Browser. Youji Kohda and Susumu Endo. Fifth International World Wide Web Conference. (May 6-10, 1996).

Smeaton Relevance Feedback and Query Expansion for Searching the Web a Model for Searching a Digital Library, ISBN 3-540-63554-8, Sep. 1997.

Stenmark To search is great, Oct. 1997.

Sunayama et al. Refining search expression by discovering hidden users interests, pp. 186-197, 1998.

Chen et al. Internet browsing and searching, pp. 582-603, 1998.

Cooper and Byrd Obiwan a Visual Interface for Prompted Query Refinement, 1998 IEEE.

Unintrusive Customization Techniques for Web Advertising. Marc Langheinrich et al. Computer Networks. vol. 31, No. 11-16, pp. 1259-1272. (Published 1999).

Oliveira et al. Interactive Query Expansion in a Meta-search Engine, pp. 50-57, 1999.

Gauch S et al., "A Corpus Analysis Approach for Automatic Query Expansion and Its Extension to Multiple Databases," ACM Transactions on Information System, vol. 17, No. 3, pp. 250-269 (Jul. 1999).

Anick P, "Interactive Document Retrieval using Faceted Terminological Feedback," HICSS 2:2036 (1999).

Recommending from Content: Preliminary Results from an E-Commerce Experiment, Mark Rosenstein and Carol Lochbaum. CHI 2000. Published Apr. 1-6, 2000, The Hague, The Netherlands.

J. Matthews, "Automating Ad Intelligence," SiliconValley, downloaded from siliconvalley.internet.com/news/article.php/3531.sub.--, (Jun. 20, 2000) 4 pgs.

Mena E et al., "Observer: An Approach for Query Processing in Global Information Systems Based on Interoperation Across Pre-Existing Ontologies," Distributed and Parallel Databases, 8, 233-271 (Apr. 2000).

Beeferman and Berger Agglomerative clustering of a search engine query log, pp. 407-416, 2000.

Glance Community Search Assistant, pp. 91-96, 2001.

Scholer and Williams Query association for effective retrieval, pp. 324-331, 2002.

Pamela Parker, ClickZ, Interactive Ads play Big Role in "Miniority Report" Jun. 12, 2002 (InteractiveAd).

http://developers.evrsoft.com/forum/showthread.php?t=2039, Oct. 2003.

Huang et al. Relevant term suggestion, pp. 638-649, 2003.

Lu et al. Extending a Web Browser with Client-Side Mining, pp. 166-177, 2003.

Anick, Using terminological feedback for websearch, pp. 88-95, 2003.

Storey et al. The role of user profiles in context aware query processing, pp. 51-63, 2004.

Dzeng and Chang Learning search keywords for search procurement, 2004.

Valentine, Google Suggest Tool Beta-Amazing, Dec. 2004.

Gretzel and Wober, Intelligent search support ISBN 3-211-20669-8, 2004.

Smyth B et al., "Exploiting Query Repetition and Regularity in an Adaptive Community-Based Wed Search Engine," User Modeling and User-Adapted Interaction 14:383-423 (2004).
Dalmau, M. et al., "Integrating thesaurus relationships into search and browse in an online photograph collection", Library Hi Tech, vol. 23, No. 3, Aug. 13, 2004, pp. 425-452.
Sugiyama et al. Adaptive Web Search Based on User Profile Constructed Without Any Effort from Users, 2004.
Koutrika G, "A Unified User Profile Framework for Query Disambiguation and Personalization," PIA 2005: 44-53 (Jul. 24-25, 2005).
"Searchable Banners: The Next Wave for Online Databases" (Borrell Associates Inc., Nov. 2005).
Sahami and Heilman A web based kernel function for matching short text snippets, pp. 2-9, 2005.
Bakshi and Karger Semantic web applications, 2005.
Hoeber O et al., "Visualization Support for Interactive Query Refinement," Department of Computer Science, University of Regina, Regina, Saskatchewan, Canada (Sep. 2005).
FLUIT Autofocus semantic search for the desktop, 2005 IEEE.
Li et al. A new approach to query expansion, pp. 2302-2306, Aug. 2005.
Jansenand McNeese Evaluating the effectiveness of and patterns of interactions pp. 1480-1503, 2005.
David Berkowitz, "Banner Ads: The New Search Engine", SearchINSIDER (Dec. 6, 2005).
Internet Archives, www.waybackmachine-www.cnn.com (CNN2005).
Woolston, Pro Ajax and the NET 2 0 Platform, 2006.
Jones et al. Generating query substitutions, 2006.
Chandalia, G. et al., "Re-ranking Search Results based on Perturbation of Concept-Association Graphs" Apr. 2006.
Lovic et al. Enhancing search engine performance using expert systems, 2006 IEEE.
Joshi and Motwani Keyword generation for search engine advertising, ISBN 0-7695-2702-7 pp. 490-496, 2006.
Guy Shani, et al., Establishing User Profiles in MediaScout recommender system, 2007 (Affinity).
Ming-Chang Chen, "Mining Progressive User Behavior for E-Commerce Using Virtual Reality Technique", Dec. 2007, A Thesis presented to the Faculty of the Graduate School at the University of Missouri-Columbia, pp. 1-85.
An Office Action dated Nov. 26, 2008, which issued during the prosecution of Applicant's U.S. Appl. No. 11/633,461.
International Preliminary Report on Patentability (IPRP) dated Oct. 30, 2008, which issued during the prosecution of Applicant's PCT/US2007/067103.
Ye et al. Towards lightweight application integration based on mashup, 2009 Congress on Services—I.
An Office Action dated Jul. 21, 2009, which issued during the prosecution of Applicant's U.S. Appl. No. 11/633,461.
Birman et al. Building collaboration applications, 2009 IEEE International Conference on Web services.
An Office Action dated Nov. 3, 2009, which issued during the prosecution of Applicant's U.S. Appl. No. 11/846,213.
An Office Action dated Nov. 10, 2010, which issued during the prosecution of Applicant's U.S. Appl. No. 12/023,564.
An Office Action dated Jun. 30, 2010, which issued during the prosecution of Applicant's U.S. Appl. No. 11/870,999.
An Office Action dated Jan. 21, 2011, which issued during the prosecution of U.S. Appl. No. 11/870,999.
An Office Action dated Mar. 31, 2011 which issued during the prosecution of U.S. Appl. No. 12/397,510.
An Office Action dated Jun. 13, 2011 which issued during the prosecution of U.S. Appl. No. 12/253,087.
An Office Action dated Jul. 11, 2011 which issued during the prosecution of U.S. Appl. No. 12/023,564.
An Office Action dated Jul. 18, 2011 which issued during the prosecution of U.S. Appl. No. 12/491,451.
An Office Action dated Dec. 1, 2011, which issued during the prosecution of U.S. Appl. No. 12/397,510.
An Office Action dated Mar. 5, 2012, which issued during the prosecution of U.S. Appl. No. 12/253,087.
An Office Action dated Mar. 16, 2012, which issued during the prosecution of U.S. Appl. No. 12/491,451.
Google Inc.'s Initial Invalidity Contentions, filed in *Collarity, Inc.,* v. *Google Inc.*, Jun. 11, 2012.
An Office Action dated Jul. 31, 2012, which issued during the prosecution of U.S. Appl. No. 12/491,451.
Office Action for U.S. Appl. No. 12/397,510 dated Dec. 28, 2012.
Google Inc.'s First Supplemental Invalidity Contentions, filed in *Collarity, Inc.* v. *Google Inc.*, Jan. 30, 2013.
An English Abstract of CN 1967534A to Wei Xincheng.
Search Engine Lowdown Apr. 6, 2005—"Google Testing 'Alternate Searches'—Confirmed," Search Engine Lowdown, http://www.searchenginelowdown.com/2005/04/google-testing-alternate-searches.html crawled by the Internet Archive on Apr. 6, 2005 and available as of Sep. 7, 2013 at web.archive.org.
Search Engine Roundtable Jul. 12, 2005—"Embedded Alternate Searches," Search Engine Roundtable, http://web.archive.org/web/20050714021509/http:/www.seroundtable.com/archives/002200.html crawled by Internet Archive on Sep. 10, 2013 and available as of Sep. 10, 2013 at web.archive.org.
An Office Action dated Aug. 23, 2012, which issued during the prosecution of U.S. Appl. No. 12/801,534.
Memorandum Order—Claim Construction May 6, 2013 *Collarity, Inc* v *Google Inc.*
An Office Action date Aug. 30, 2013, which issued during the prosecution of U.S. Appl. No. 13/009,305.
An Office Action date Sep. 10, 2013, which issued during the prosecution of U.S. Appl. No. 12/023,564.
Expert Report of David D. Lewis, Ph.D. Regarding Invalidity of U.S. Appl. No. 7,756,855, *Collarity Inc.* v. *Google Inc.* (redacted) (Sep. 2013).
An Office Action date Oct. 3, 2013, which issued during the prosecution of U.S. Appl. No. 12/253,087.
An Office Action date Oct. 21, 2013, which issued during the prosecution of U.S. Appl. No. 12/397,510.
Google Sresults A.
Google Sresults B.
Google Sresults C.
U.S. Appl No. 60/741,902, filed Dec. 2005, Emil Ismalon.
U.S. Appl No. 60/793,253, filed Apr. 2006, Emil Ismalon.
U.S. Appl No. 60/796,188, filed May 2006, Emil Ismalon.
U.S. Appl No. 60/829,136, filed Oct. 2006, Emil Ismalon.
U.S. Appl No. 60/829,135, filed Oct. 2006, Emil Ismalon.
U.S. Appl No. 60/829,132, filed Oct. 2006, Emil Ismalon.
U.S. Appl No. 11/633,461, filed Dec. 2006, Emil Ismalon.
U.S. Appl No. 60/887,580, filed Jan. 2007, Levy Cohen.
U.S. Appl No. 60/886,193, filed Jan. 2007, Emil Ismalon.
U.S. Appl No. 11/846,213, filed Aug. 2007, Emil Ismalon.
U.S. Appl No. 12/253,087, filed Oct. 2008, Emil Ismalon.
Office Action dated Apr. 9, 2014, issued to corresponding U.S. Appl. No. 12/397,510.
Notice of Allowance dated Jun. 20, 2014, issued to corresponding U.S. Appl. No. 13/009,305.

\* cited by examiner

*Primary Examiner* — Frantz Coby
(74) *Attorney, Agent, or Firm* — Stein IP, LLC

(57) ABSTRACT

A computer-implemented method includes receiving from a user, by a search system, a search query comprising terms. Using at least one association graph comprising terms, the search system generates a suggested replacement query by designating one or more of the terms of the search query as anchor terms, and the remaining terms of the search query as non-anchor terms, and replacing one or more of the non-anchor terms of the search query with one or more suggested replacement terms, to generate the suggested replacement query that includes the one or more anchor terms and the one or more suggested replacement terms. The suggested replacement query is presented to the user. Responsively to a selection of the suggested replacement query by the user, the search query received from the user is replaced with the suggested replacement query, and search results are generated responsively to the suggested replacement query and presented.

66 Claims, 18 Drawing Sheets

FIG. 4

|  | PHYSICS | OPEN | ENGINE | JAVA | PARTICLE | ANGULAR | MOMENTUM | SPIN | PRIZE | WINNERS | NOBEL |
|---|---|---|---|---|---|---|---|---|---|---|---|
| PHYSICS | 70 | 35 | 70 | 45 | 20 | 90 | 45 | 54 | 80 | 60 | 50 |
| OPEN | | 0 | 20 | 40 | 0 | 0 | 0 | 0 | 0 | 0 | 0 |
| ENGINE | | | 25 | 35 | 0 | 0 | 0 | 0 | 0 | 0 | 0 |
| JAVA | | | | 20 | 0 | 0 | 0 | 0 | 0 | 0 | 0 |
| PARTICLE | | | | | 0 | 20 | 15 | 20 | 0 | 0 | 0 |
| ANGULAR | | | | | | | 30 | 60 | 0 | 0 | 0 |
| MOMENTUM | | | | | | | | 0 | 0 | 0 | 0 |
| SPIN | | | | | | | | | 0 | 0 | 0 |
| PRIZE | | | | | | | | | 40 | 50 | 25 |
| WINNERS | | | | | | | | | | 0 | 25 |
| NOBEL | | | | | | | | | | | 0 |

FIG. 12A

| PRIMARY INDEX | SECONDARY INDEX | USER ID | ASSOCIATION SCORE | DEGREE | URL ID(S) |
|---|---|---|---|---|---|
| PHYSICS | ENGINE | 001 | 70 | 1 | 24,26,123 |
| | | 002 | 80 | 1 | 25,27,123 |
| | | 004 | 100 | 1 | 140,190,400 |
| PHYSICS | ANGULAR | 003 | 75 | 1 | 140,20,420 |
| | | 005 | 80 | 1 | 135,500,312 |
| | | 001 | 90 | 1 | 130,523,300 |
| | | 002 | 120 | 1 | 24,800,673 |
| PHYSICS | PRIZE | 001 | 80 | 1 | 415,715,716 |
| | | 003 | 110 | 1 | 416,715,843 |
| PHYSICS | RELATIVITY | 002 | 80 | 1 | 100,120,905 |
| | | 005 | 90 | 1 | 111,135,906 |
| | | 008 | 110 | 1 | 112,176,5 |
| | | 009 | 150 | 1 | 112,177,920 |
| GEOMETRY | POINTS | 010 | 80 | 1 | 43,50,116 |
| | | 013 | 90 | 1 | 42,50,999 |
| | | 012 | 95 | 1 | 905,55,124 |
| GEOMETRY | PLANES | 014 | 100 | 1 | 110,87,12 |
| | | 012 | 105 | 1 | 19,104,12 |
| | | 010 | 110 | 1 | 18,550,113 |

FIG. 12B

| PRIMARY INDEX | SECONDARY INDEX | USER ID | ASSOCIATION SCORE | DEGREE | URL ID(S) |
|---|---|---|---|---|---|
| PHYSICS+ ENGINE | | 001 | 70 | | |
| | | 002 | 80 | | |
| | | 003 | 100 | | |

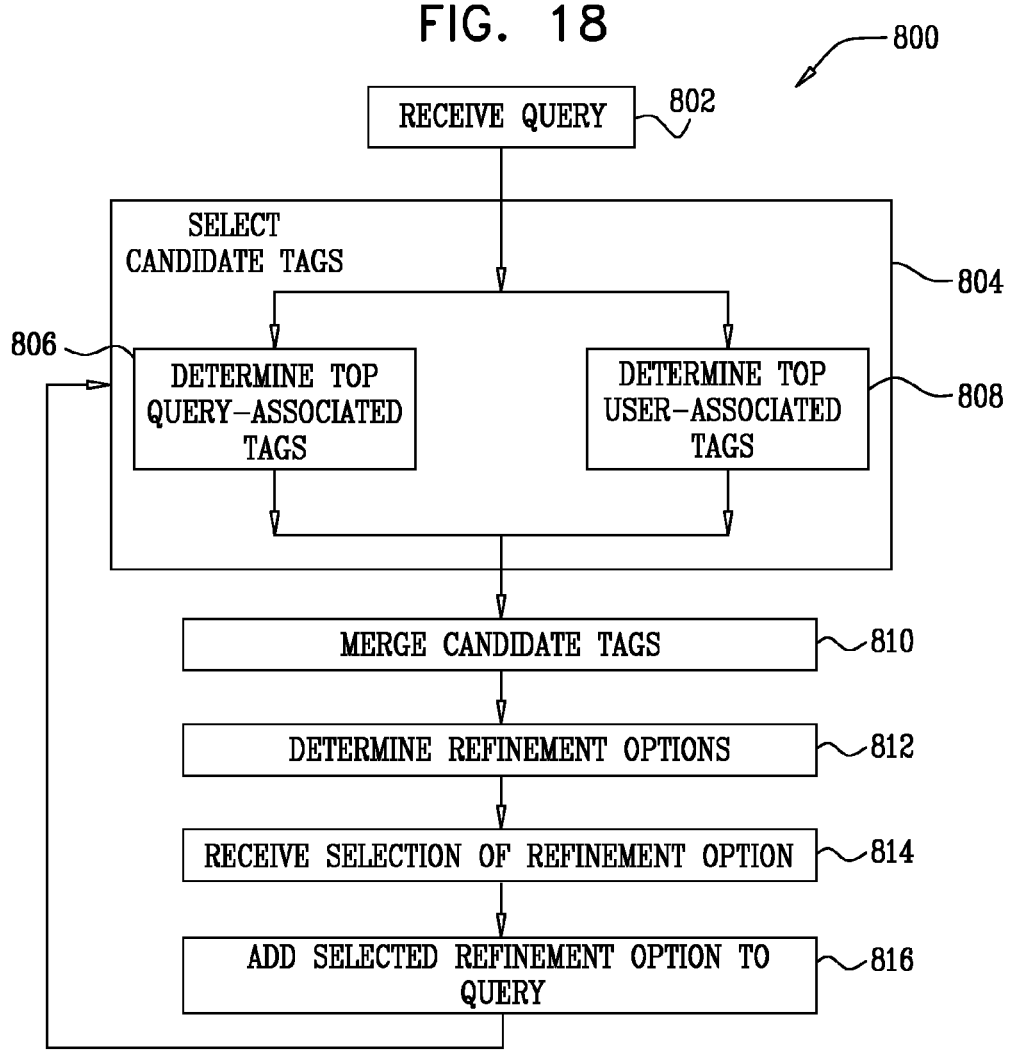
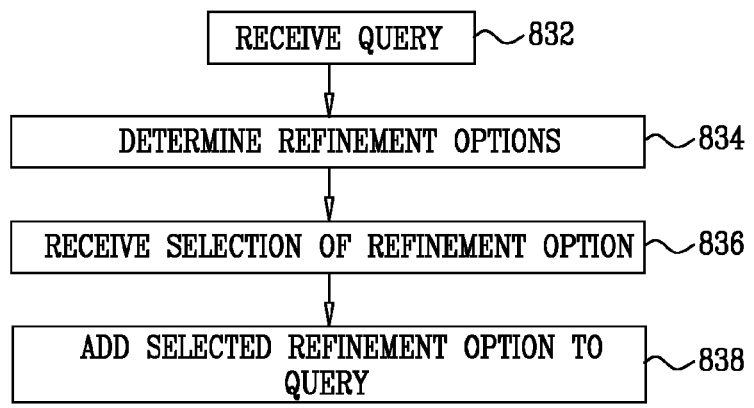

GENERATION OF REFINEMENT TERMS FOR SEARCH QUERIES

CROSS-REFERENCES TO RELATED APPLICATIONS

The present patent application is a continuation of U.S. patent application Ser. No. 12/801,534, filed Jun. 14, 2010, now U.S. Pat. No. 8,429,184, which is (a) a continuation-in-part of U.S. patent application Ser. No. 11/846,213, filed Aug. 28, 2007, now U.S. Pat. No. 7,756,855, and (b) a continuation-in-part of U.S. patent application Ser. No. 12/253,087, filed Oct. 16, 2008.

U.S. patent application Ser. No. 12/253,087 is (a) a continuation-in-part of U.S. patent application Ser. No. 11/633,461, filed Dec. 5, 2006, now abandoned, which claims the benefit of U.S. Provisional Application 60/741,902, filed Dec. 5, 2005, and (b) a continuation of International Patent Application PCT/US07/67103, filed Apr. 20, 2007, which published as PCT Publication WO 07/124,430.

International Patent Application PCT/US07/67103 claims priority from the following provisional patent applications:

U.S. Provisional Patent Application 60/793,253, filed Apr. 20, 2006, entitled, "Methods for using association graphs in search engines";

U.S. Provisional Patent Application 60/796,188, filed May 1, 2006, entitled, "Apparatus and methods thereof for search engine personalization";

U.S. Provisional Patent Application 60/829,136, filed Oct. 11, 2006, entitled, "Apparatus and methods thereof for search phrase refinement";

U.S. Provisional Patent Application 60/829,135, filed Oct. 11, 2006, entitled, "Apparatus and methods thereof for using explicit query refinements to tune search results ranking factors";

U.S. Provisional Patent Application 60/829,132, filed Oct. 11, 2006, entitled, "Apparatus and methods thereof for adaptive ranking mechanism using association graphs and contextual analysis";

U.S. Provisional Patent Application 60/886,193, filed Jan. 23, 2007, entitled, "Multi-directional and auto-adaptive relevance and search system and methods thereof"; and U.S. Provisional Patent Application 60/887,580, filed Jan. 31, 2007, entitled, "Searchable banner display and apparatus that enables exploring destination content prior to reaching it."

All of the above-mentioned applications are assigned to the assignee of the present application and are incorporated herein by reference.

FIELD OF THE INVENTION

The present invention relates generally to improving results returned by search engines, and specifically to techniques for ranking and/or modifying such search results, and/or refining search queries.

BACKGROUND OF THE INVENTION

Internet search engines have become fundamental tools for nearly all users seeking information and sites on the World Wide Web (WWW). Users can find vast amounts of data and select the data that appears to best match specific search criteria. Free-text searches are generally performed by providing a search phrase including one or more keywords, and optionally Boolean operators. The most widely used free-text search engines currently are provided by Google, Inc. and Yahoo, Inc.

Based on the search phrase provided by a user, a search engine generally returns a list of documents from which the user selects those that appear most relevant. The list typically includes a snippet from each of documents that includes one or more of the keywords, and the URL of the document. Typically, the search engine presents the list of documents in descending order according to general, static criteria established by the search engine provider. Numerous techniques have been developed for ranking the list in order to provide the results most likely to be relevant to a typical user. Some of these techniques take into account the order of the keywords provided by the user.

Such static ranking systems often present high-ranking results that do not match the interests or skills of the searcher, or that do not provide results that correctly reflect the intended meaning of keywords having more than one meaning. For example, a software engineer looking for Java (i.e., software) and a traveler looking for Java (i.e., the island) receive the same results for a query that includes the same keywords, even though their searches had different intended meanings.

In an attempt to increase the relevancy of search results, some search engines suggest search refinement options based on the search keywords entered by the searcher. These search engines typically analyze previous searches conducted by other users, in order to identify refinement options that are related to the keywords entered by the searcher. The searcher is able to narrow his search to better express his search intent by selecting one or more of the refinement options. For example, Google Suggest, provided by Google, Inc., displays a drop-down list of additional related search phrases, as the searcher enters a search query in a search text box. The Clusty search engine, provided by Vivisimo, Inc. groups similar results together into clusters. Some search engines, such as Google, upon detecting potential misspelling of search keywords, present a replacement search query including replacement keywords spelled correctly.

U.S. Pat. No. 6,636,848 to Aridor et al., which is incorporated herein by reference, describes a method for searching a corpus of documents, such as the World Wide Web, including defining a knowledge domain and identifying a set of reference documents in the corpus pertinent to the domain. Upon inputting a query, the corpus is searched using the set of reference documents to find one or more of the documents in the corpus that contain information in the domain relevant to the query. The set of reference documents is updated with the found documents that are most relevant to the domain. The updated set is used in searching the corpus for information in the domain relevant to subsequent queries.

U.S. Pat. No. 4,823,306 to Barbic et al., which is incorporated herein by reference, describes a method for searching for library documents that match the content of a given sequence of query words. A set of equivalent words are defined for each query word along with a corresponding word equivalence value assigned to each equivalent word. Target sequences of words in a library document which match the sequence of query words are located according to a set of matching criteria. The similarity value of each target sequence is evaluated as a function of the corresponding equivalence values of words included therein. Based upon the similarity values of its target sequences, a relevance factor is then obtained for each library document.

U.S. Pat. No. 5,987,457 to Ballard, which is incorporated herein by reference, describes a method in which a user views search results and subjectively determines if a document is desirable or undesirable. Only documents categorized by the user are analyzed for deriving a list of prospective keywords. The frequency of occurrence of each word of each document is derived. Keywords that occur only in desirable documents are good keywords. Keywords that occur only in undesirable documents are bad keywords. Keywords that occurs in both types are dirty keywords. The best keywords are the good keywords with the highest frequency of occurrence. The worst keywords are the bad keywords with the highest frequency of occurrence. A new query phrase includes the highest ranked good keywords and performs filtering using the highest ranked bad keywords. Key phrases are derived to clean dirty keywords into good key phrases. A key phrase also is derived from a good keyword and replaces the good keyword to narrow a search.

US Patent Application Publication 2005/0076003 to DuBose et al., which is incorporated herein by reference, describes a process for sorting results returned in response to a search query according to learned associations between one or more prior search query search terms and selected results of said prior search queries.

U.S. Pat. No. 6,732,088 to Glance, which is incorporated herein by reference, describes techniques for facilitating searching a data collection, such as the WWW, that take advantage of the collective ability of all users to create queries to the data collection. First, a node-link graph of all queries submitted to a data collection within a given period of time is constructed. In the case of the WWW, the queries would be to a particular search engine. In the graph, each node is a query. There is a link made between two nodes whenever the two queries are judged to be related. A first key idea is that the determination of relatedness depends on the documents returned by the queries, not on the actual terms in the queries themselves. For example, a criterion for relatedness could be that of the top ten documents returned for each query, the two lists have at least one document in common. A second key idea is that the construction of the query graph transforms single user usage of the data collection (e.g., search) into collaborative usage. As a result, all users can tap into the knowledge base of queries submitted by others, because each of the related queries represents the knowledge of the user who submitted the query.

U.S. Pat. No. 6,513,036 to Fruensgaard et al., which is incorporated herein by reference, describes techniques for searching and presenting electronic information from one or more information sources where the retrieval and presentation of information depends on context representations defined for a user performing the search, other users being similar to the user performing the search, and references to information. The context representation of each object affects/influences all the other objects with which it is in contact during the search process. This is described as ensuring a dynamic update of the relations between the objects and their properties.

US Patent Application Publication 2002/0133483 to Klenk et al., which is incorporated herein by reference, describes a system for automatically determining a characterizing strength which indicates how well a text in a database describes a search query. The system comprises a database storing a plurality of m texts, a search engine for processing the search query in order to identify those k texts from the plurality of m texts that match the search query. The system further comprises a calculation engine for calculating the characterizing strengths of each of the k texts that match the search query. The characterizing strength is calculated by creating a graph with nodes and links, whereby words of the text are represented by nodes and the relationship between words is represented by means of the links; evolving the graph according to a pre-defined set of rules; determining the neighborhood of the word, whereby the neighborhood comprises those nodes that are connected through one or a few links to the word; and calculating the characterizing strength based on the topological structure of the neighborhood.

U.S. Pat. No. 5,926,812 to Hilsenrath et al., which is incorporated herein by reference, describes a method for comparing the contents of two sets of documents, including extracting from a set of documents corresponding sets of document extract entries. The method further includes generating from the sets of document extract entries corresponding sets of word clusters. Each word cluster comprises a cluster word list having N words, an N×N total distance matrix, and an N×N number of connections matrix. The preferred embodiment includes grouping similar word clusters and combining the similar word clusters to form a single word cluster for each group. The grouping comprises evaluating a measure of cluster similarity between two word clusters, and placing them in a common group of similar word clusters if the measure of similarity exceeds a predetermined value. Evaluating the cluster similarity comprises intersecting clusters to form subclusters and calculating a function of the subclusters. In the preferred embodiment, the method is implemented in a system to automatically identify database documents which are of interest to a given user or users. In this implementation, the method comprises automatically deriving the first set of documents from a local data storage device, such as a user's hard disk. The method also comprises deriving the second set of documents from a second data storage device, such as a network machine. These techniques are described as providing fast and accurate searching to identify documents of interest to a particular user or users without any need for the user or users to specify what search criteria to use.

U.S. Pat. No. 6,772,150 to Whitman et al., which is incorporated herein by reference, describes a search engine system that uses information about historical query submissions to a search engine to suggest previously-submitted, related search phrases to users. The related search phrases are preferably suggested based on a most recent set of query submission data (e.g., the last two weeks of submissions), and thus strongly reflect the current searching patterns or interests of users.

U.S. Pat. No. 6,289,353 to Hazlehurst et al., which is incorporated herein by reference, describes an intelligent Query Engine system that automatically develops multiple information spaces in which different types of real-world objects (e.g., documents, users, products) can be represented. Machine learning techniques are used to facilitate automated emergence of information spaces in which objects are represented as vectors of real numbers. The system then delivers information to users based upon similarity measures applied to the representation of the objects in these information spaces. The system simultaneously classifies documents, users, products, and other objects. Documents are managed by collators that act as classifiers of overlapping portions of the database of documents. Collators evolve to meet the demands for information delivery expressed by user feedback. Liaisons act on the behalf of users to elicit information from the population of collators. This information is then presented to users upon logging into the system via Internet or another communication channel. Mites handle incoming documents from multiple information sources (e.g., in-house editorial staff, third-party news feeds, large databases, and WWW spiders) and feed documents to those collators which provide a good fit for the new documents.

US Patent Application Publication 2003/0123443 to Anwar, which is incorporated herein by reference, describes a search engine that utilizes both record based data and user activity data to develop, update, and refine ranking protocols, and to identify words and phrases that give rise to search ambiguity so that the engine can interact with the user to better respond to user queries and enhance data acquisition from databases, intranets, and internets.

The following patents, patent application publications, and other publications, all of which are incorporated herein by reference, may be of interest:

US Patent Application Publication 2005/0055341 to Haahr et al.
U.S. Pat. No. 5,987,457 to Ballard
U.S. Pat. No. 6,363,379 to Jacobson et al.
U.S. Pat. No. 6,347,313 to Ma et al.
U.S. Pat. No. 6,321,226 to Garber et al.
U.S. Pat. No. 6,189,002 to Roitblat
U.S. Pat. No. 6,167,397 to Jacobson et al.
U.S. Pat. No. 5,864,845 to Voorhees et al.
U.S. Pat. No. 5,825,943 to DeVito et al.
US Patent Application Publication 2005/0144158 to Capper et al.
US Patent Application Publication 2005/0114324 to Mayer
US Patent Application Publication 2005/0055341 to Haahr et al.
U.S. Pat. No. 5,857,179 to Vaithyanathan et al.
U.S. Pat. No. 7,139,755 to Hammond
U.S. Pat. No. 7,152,061 to Curtis et al.
U.S. Pat. No. 6,904,588 to Reddy et al.
U.S. Pat. No. 6,842,906 to Bowman-Amuha
U.S. Pat. No. 6,539,396 to Bowman-Amuha
US Patent Application Publication 2004/0249809 to Ramani et al.
US Patent Application Publication 2003/0058277 to Bowman-Amuha
U.S. Pat. No. 6,925,460 to Kummamuru et al.
U.S. Pat. No. 6,920,448 to Kincaid et al.
US Patent Application Publication 2006/0074883 to Teevan et al.
US Patent Application Publication 2006/0059134 to Palmon et al.
US Patent Application Publication 2006/0047643 to Chaman
US Patent Application Publication 2005/0216434 to Havelivwala et al.
US Patent Application Publication 2003/0061206 to Qian
US Patent Application Publication 2002/0073088 to Beckmann et al.

SUMMARY OF THE INVENTION

In some embodiments of the present invention, a search system is provided that clusters users, search topics, and search result documents in multi-layer association graphs in order to return meaningful, focused results to search queries. The search system utilizes the multi-directional transfer of information from users to documents, in addition to the conventional transfer of information from documents to users, in order to provide search results that are based on personal search characteristics of the user, characteristics of communities to which the user implicitly belongs, and/or characteristics of the global community of users. The search system uses clustering-based techniques to rank search results, and to present search refinement options to the users. The search system performs the clustering based on the search terms used by the users, the search terms used by other users, and the terms in documents to which the users are exposed and select for viewing.

In some embodiments of the present invention, the search system provides personalized search results responsively to associations between search terms and documents returned to a user during previous searches. These associations are represented by a unique personal profile for each user, which typically comprises a personal association graph (PAG). The use of a PAG enables the search system to return search results to the user ranked at least in part based on search terms not included in a current search query, but which are associated in the user's PAG with search terms included in the current query. Furthermore, the search system extracts relevant terms from documents selected by the user, and adds these to the user's PAG in association with relevant search terms, thereby providing information that helps the system focus future search results.

In some embodiments of the present invention, the search system provides search results responsively to characteristics of communities to which the user implicitly belongs, as determined by the contribution of the user's PAG to topic profiles of these communities, which typically comprise respective topic association groups (TAGS). Each TAG represents the interactions of a plurality of searches conducted by a plurality of users within a single topic. For example, a physicist, a veterinarian, and a writer may be associated with a TAG regarding "quantum physics," a TAG regarding "animal food," and a TAG regarding "writing," respectively, because their respective PAGs reflect past search interests in these areas. All three users may conduct searches using the same search query term "cat." The physicist, because of his association with the topic "quantum physics," is presented with search results containing the phrase "Schrodinger's cat experiment," the veterinarian with search results regarding cat food, and the writer with information about the musical "Cats." It is noted that each of these users may have first used the specific term "cat" in their current searches. The search engine is nevertheless able to provide meaningful results using the associations of "cat" in the users' respective TAGs.

In some embodiments of the present invention, the search system constructs a document profile for each search result document selected by a user. (The search result documents are typically presented to the user as a list of snippets associated with respective documents.) Each document profile typically comprises a document association graph (DAG), which represents the interactions between a single document and a plurality of searches conducted by a plurality of users, and provides information regarding the associations of key search terms with the document. An important feature of some embodiments of the present invention is that not all of the search terms associated with a given document by its DAG necessarily actually appear in the document's snippet, or even in the entirety of the document. It is often the case that search terms in a DAG do not appear in the associated document's snippet or in the associated document.

In some embodiments of the present invention, the system ranks results and/or offers refinement options based on association scores between (a) DAGs of search result documents and (b) the PAG of the searching user, one or more TAGs associated with the user or the current query, a group association graph (GRAG) that combines the PAGs of multiple associated users of the system, and/or a global association graph (GAG) that combines the strongest interests of multiple users of the system.

In some embodiments of the present invention, the search system clusters users that contributed to a given TAG, based on the users' relative contributions to the strengths of associations within the TAG. Similarly, the search engine clusters documents that contributed to a given TAG, based on the documents' relative contributions to the strengths of association within the TAG.

The techniques of these embodiments of the present invention thus involve users not only as information consumers, but also as significant suppliers of information. This supply of information creates an implicit collaboration between users via the searches they perform, and the communities they thereby implicitly create. Such communities are formed by grouping users responsively to characteristics and interests of users implicit in their searches, rather than based on social networking or explicit tagging of interests by the users.

In some embodiments of the present invention, the system uses profiles that do not comprise association graphs, such as lists (e.g., ranked lists), vectors, sets of sets, and a non-associative multi-dimensional matrix (e.g., three or more dimensions). For example, the system may use personal profiles that do not comprise PAGs, topic profiles that do not comprise TAGs, document profiles that do not comprise DAGs, global profiles that do not comprise GAGs, and/or group profiles that do not comprise GRAGs.

In some embodiments of the present invention, a search system is provided that offers search refinement options to a user, which suggest the replacement of one or more terms of a search query with substitute terms that may better express the user's search interest. When the user selects one of the refinement options, the search system appropriately modifies the user's query, and presents search results based on the modified query.

The system typically identifies substitute terms based on personal search characteristics of the user, characteristics of communities to which the user implicitly belongs, and/or characteristics of the global community of users. For some applications, the system determines which of these characteristics to use responsively to a level of personalization of search results selected by the user. For some applications, the system clusters users, search topics, and search result documents in multi-layer association graphs in order to identify the substitute terms.

Replacement of a search term with a substitute term often results in the broadening of the search query. In contrast, conventional search engine refinement options generally add terms to the search query, which cannot result in a broader search query. The use of the replacement refinement techniques of embodiments of the present invention enable the removal of search terms provided by the user that poorly reflect the user's intended search concept, resulting in suboptimal search results. For example, the user may provide search terms that unnecessarily narrow the search, and/or are different from the words more commonly used to express the user's intended search concept.

For example, a user may want to learn which kinds of food should be avoided during pregnancy according to Chinese medicine. The user may formulate the query "pregnancy abstain food Chinese medicine." The user is unaware that the term "abstain" filters out many good search results because this term is used relatively infrequently in relevant search result documents and/or snippets. The search engine identifies the potential substitute terms "refrain," "forbear," and "avoid" as synonyms of "abstain." Based on a selected level of personalization, the search engine assesses the degree of association of each of these potential substitute terms with the other terms in the search query. The search engine finds that the substitute term "avoid" is most highly associated with the other search terms, and thus suggests to the user the refinement option of replacing "abstain" with "avoid." If the user selects this refinement option, the system performs the search using the modified query "pregnancy avoid food Chinese medicine." In this example, the use of the refined search query may result in more than 200 times as many hits as the initial user-formulated query, effectively broadening the initial query to return many search results that the user otherwise would not have found using his initial query.

There is therefore provided, in accordance with an embodiment of the present invention, a computer-implemented method including:

presenting to a user a range of levels of personalization of search results, including a personalized level, a global level that is not personalized, and a community level between the personalized level and the global level;

receiving from the user an indication of a desired one of the levels;

receiving from a user a search query consisting of one or more query terms;

responsively to the search query, generating a search result listing;

ranking at least a portion of the search result listing at least in part responsively to the indication; and presenting at least a portion of the ranked search result listing to the user.

In an embodiment of the present invention, the desired level of personalization includes the personalized level, receiving the indication includes receiving the indication of the personalized level, and ranking includes:

constructing a personal profile for the user that represents interactions of a plurality of previous searches conducted by the user with a respective plurality of previous search result documents presented to the user during the previous searches;

calculating respective correlation scores between the personal profile and a plurality of search result documents of the at least a portion of search result listing; and ranking the at least a portion of the search result listing at least in part responsively to the correlation scores.

For some applications, the personal profile includes a personal association graph (PAG), each of the previous searches includes one or more previous query terms, and constructing the personal profile includes constructing the PAG including at least a portion of the previous query terms as vertices. For some applications, generating the search result listing includes generating the search result listing responsively to the query terms and at least one of the previous query terms in the PAG linked to all of the query terms in the PAG. Alternatively or additionally, generating the search result listing includes generating the search result listing responsively to the query terms and a high point term of a hotspot of the PAG.

In an embodiment, the user is one of a plurality of users, the desired level of personalization includes the community level, receiving the indication includes receiving the indication of the community level, and ranking includes:

constructing a topic profile that represents interactions of a plurality of previous searches conducted by the plurality of users within a single topic;

calculating respective correlation scores between the topic profile and a plurality of search result documents of the at least a portion of search result listing; and ranking the at least a portion of the search result listing at least in part responsively to the correlation scores.

For some applications, the topic profile includes a topic association graph (TAG), each of the previous searches includes one or more previous query terms, and constructing the topic profile includes constructing the TAG including at least a portion of the previous query terms as vertices.

In an embodiment, the user is one of a plurality of users, the desired level of personalization includes the community level, receiving the indication includes receiving the indication of the community level, and ranking includes:

constructing a plurality of personal profiles for respective users in the plurality of users, each of which personal profiles represents interactions of a plurality of previous searches conducted by one of the users with a respective plurality of previous search result documents presented to the one of the users during the previous searches;

identifying a subset of the personal profiles as correlated with one another;

constructing a group profile by combining at least a portion of each of the personal profiles in the subset;

calculating respective correlation scores between the group profile a plurality of search result documents of the at least a portion of search result listing; and ranking the at least a portion of the search result listing at least in part responsively to the correlation scores.

In an embodiment, the personal profiles include respective personal association graph (PAGs), each of the previous searches includes one or more first query terms, constructing the personal profiles includes constructing the PAGs including at least a portion of the first query terms as vertices, the group profile includes a group association graph (GRAG), and constructing the group profile includes constructing the GRAG by combining at least a portion of each of the PAGs in the subset. For some applications, generating the search result listing includes generating the search result listing responsively to the query terms and at least one of the previous query terms in the GRAG linked to all of the query terms in the GRAG.

In an embodiment, the user is one of a plurality of users, the desired level of personalization includes a global level that is not personalized, receiving the indication includes receiving the indication of the global level, and ranking includes:

constructing a global profile that represents interactions of a plurality of previous searches conducted by the plurality of users with a respective plurality of previous search result documents presented to the users during the searches;

calculating respective correlation scores between the global profile and a plurality of search result documents of the at least a portion of search result listing; and ranking the at least a portion of the search result listing at least in part responsively to the correlation scores.

For some applications, the global profile includes a global association graph (GAG), each of the previous searches includes one or more previous query terms, and constructing the global profile includes constructing the GAG including at least a portion of the previous query terms as vertices. For some applications, generating the search result listing includes generating the search result listing responsively to the query terms and at least one of the previous query terms in the GAG linked to all of the query terms in the GAG.

In an embodiment, the user is one of a plurality of users, and ranking includes:

constructing a plurality of document profiles associated with a respective plurality of search result documents, each of which document profiles represents interactions of (a) a plurality of previous searches conducted by the plurality of users with (b) the respective search result document associated with the document profile; and ranking the at least a portion of the search result listing at least in part responsively to the indication and respective correlation scores between the query terms and at least a portion of the document profiles.

For some applications, the plurality of document profiles includes a respective plurality of document association graphs (DAGs), the previous searches include one or more respective previous query terms, and constructing the plurality of document profiles includes constructing the plurality of DAGs, each of which includes one or more of the previous query terms as vertices.

There is further provided, in accordance with an embodiment of the present invention, a computer-implemented method including:

receiving from a user a first search query consisting of one or more first query terms;

receiving from the user an indication of a desired level of personalization of refinement options for the search query;

responsively to the search query, generating a set of one or more refinement terms at least in part responsively to the indication;

presenting the set of refinement terms to the user;

responsively to a selection of at least one of the refinement terms by the user, adding the selected at least one refinement term to the first search query to generate a second search query; and presenting search results to the user responsively to the second search query.

For some applications, the set of refinement terms includes one or more primary refinement terms, and one or more secondary refinement terms associated with at least one of the one or more primary refinement terms, and presenting the set of refinement terms includes presenting the primary and secondary refinement terms.

For some applications, the desired level of personalization is selected from a range of personalization levels between a personalized level and a global level that is not personalized. For some applications, the range of personalization levels includes a community level between the personalized level and the global level.

In an embodiment, the desired level of personalization includes a personalized level, receiving the indication includes receiving the indication of the personalized level, and generating the set of one or more refinement terms includes:

constructing a personal profile for the user that represents interactions of a plurality of previous searches conducted by the user with a respective plurality of previous search result documents presented to the user during the previous searches, each of previous searches includes one or more previous query terms; and selecting at least one of the previous query terms for inclusion in the set as one of the refinement terms, responsively to a level of association of the previous query term with the first query terms in the personal profile.

For some applications, the personal profile includes a personal association graph (PAG), constructing the personal profile includes constructing the PAG including at least a portion of the previous query terms as vertices, and selecting the previous query term includes selecting the previous query term for inclusion in the set responsively to finding that the previous query term is directly linked to all of the first query terms in the PAG.

In an embodiment, the user is one of a plurality of users, the desired level of personalization includes the community level, receiving the indication includes receiving the indication of the community level, and generating the set of one or more refinement terms includes:

constructing a topic profile that represents interactions of a plurality of previous searches conducted by the plurality of users within a single topic, each of the previous searches includes one or more previous query terms; and selecting at least one of the previous query terms for inclusion in the set as one of the refinement terms, responsively to a level of association of the previous query term with the first query terms in the topic profile.

For some applications, the topic profile includes a topic association graph (TAG), constructing the personal profile includes constructing the TAG including at least a portion of the previous query terms as vertices, and selecting the previous query term includes selecting the previous query term for inclusion in the set responsively to finding that the previous query term is directly linked to all of the first query terms in the TAG.

In an embodiment, the user is one of a plurality of users, the desired level of personalization includes a global level that is not personalized, receiving the indication includes receiving the indication of the global level, and generating the set of one or more refinement terms includes:

constructing a global profile that represents interactions of a plurality of searches conducted by the plurality of users with a respective plurality of previous search result documents presented to the users during the searches, each of the previous searches includes one or more previous query terms; and selecting at least one of the previous query terms for inclusion in the set as one of the refinement terms, responsively to a level of association of the previous query term with the first query terms in the global profile.

For some applications, the global profile includes a global association graph (GAG), constructing the global profile includes constructing the GAG including at least a portion of the previous query terms as vertices, and selecting the previous query term includes selecting the previous query term for inclusion in the set responsively to finding that the previous query term is directly linked to all of the first query terms in the GAG.

There is still further provided, in accordance with an embodiment of the present invention, a computer-implemented method including:

receiving from a plurality of first users a respective plurality of first search queries, each of which consists of one or more first query terms;

presenting to the plurality of first users respective first search result listings, each of which includes one or more first snippets associated with one or more respective search result documents;

constructing a plurality of document profiles, each of which (a) is associated with one of the first snippets selected by one or more of the first users from the respective first search result listings, and (b) represents an interaction of one or more of the first query terms with the first snippet;

receiving from a second user a second search query, which consists of one or more second query terms;

responsively to the second search query, generating a second search result listing, which includes at least a portion of the one or more first snippets;

performing a comparison between (a) the second search query and (b) one or more of the document profiles associated with the first snippets included in the second search result listing;

ranking at least a portion of the second search result listing at least in part responsively to comparison; and presenting at least a portion of the ranked second search result listing to the second user.

In an embodiment, constructing the document profiles includes constructing the document profiles such that at least one of the document profiles includes one or more of the first query terms that do not appear in the first snippet associated with the document profile.

In an embodiment, ranking includes:

presenting to the second user a range of levels of personalization of search results, including a personalized level, a global level that is not personalized, and a community level between the personalized level and the global level;

receiving from the user an indication of a desired one of the levels; and ranking the at least a portion of the second search result listing at least in part responsively to the indication.

In an embodiment, the document profiles include respective document association graphs (DAGs), each of which includes a plurality of the first query terms as DAG vertices. For some applications, constructing the document profiles includes constructing the DAGs such that at least one of the DAGs includes as vertices one or more of the first query terms that do not appear in the first snippet associated with the document profile. For some applications, receiving the second search query includes receiving the second search query, which consists of the one or more second query terms organized linearly, and transforming the second search query into a query association graph including the one or more second query terms as query association graph vertices, and performing the comparison includes performing the comparison between (a) the query association graph and (b) the one or more of the DAGs associated with the first snippets included in the second search result listing.

For some applications, performing the comparison includes constructing a personal association graph (PAG) for the second user that represents interactions of a plurality of previous searches conducted by the second user with a respective plurality of previous search result documents presented to the second user during the previous searches, and includes as vertices at least a portion of one or more previous query terms used in the plurality of previous searches, and the comparison includes a correlation between (a) a subgraph of the PAG consisting of: (i) the one or more second query terms, and (ii) at least one additional previous query term directly linked to all of the one or more second query terms in the PAG and (b) the one or more DAGs associated with the first snippets included in the second search result listing, and ranking includes ranking the at least a portion of the second search result listing at least in part responsively to the correlation.

For some applications, the method includes:

receiving a selection made by the second user of one of the first snippets included in the ranked second search result listing;

calculating a query score for the second search query; and responsively to the query score:

incrementing edge scores of the PAG between vertices of the PAG respectively including the second query terms; and incrementing edge scores of the DAG associated with the selected first snippet between vertices of the DAG respectively including the second query terms.

For some applications, incrementing the edge scores of the PAG includes adding one of the second query terms to the PAG as a new vertex upon finding the second query term is not already included in the PAG. Alternatively or additionally, incrementing the edge scores of the DAG includes adding one of the second query terms to the DAG as a new vertex upon finding the second query term is not already included in the DAG.

In an embodiment, calculating the query score includes calculating the query score responsively to at least one attribute selected from the group consisting of: a query-specific attribute, a second-user-query-interaction attribute, and a second-user-result-interaction attribute.

For some applications, the attribute includes the query-specific attribute, and calculating the query score includes calculating the query score responsively to the query-specific attribute. For example, the query-specific attribute may include a measure of a number of keywords in the second query, and calculating the query score includes calculating the query score responsively to the measure of the number of keywords.

For some applications, the attribute includes the second-user-query-interaction attribute, and calculating the query score includes calculating the query score responsively to the user-query-interaction attribute. For example, the second-user-query-interaction attribute may include an association score of a subgraph of the PAG that consists of the second query terms, and calculating the query score includes calculating the query score responsively to the association score. Alternatively or additionally, the second-user-query-interaction attribute may include a level of focus of the second user regarding the second query, and calculating the query score includes calculating the query score responsively to the level of focus.

For some applications, the attribute includes a second-user-result-interaction attribute, and calculating the query score includes calculating the query score responsively to the second-user-result-interaction attribute. For example, the second-user-result-interaction attribute may include a relative position of the selected first snippet in the ranked second search result listing, and calculating the query score includes calculating the query score responsively to the relative position. Alternatively or additionally, the second-user-result-interaction attribute may include an amount of time spent by the second user after selecting the selected first snippet before returning to the ranked second search result listing to make a subsequent selection from the ranked second search result listing.

In an embodiment, performing the comparison includes constructing a topic association graph (TAG) that represents interactions of a plurality of previous searches conducted within a single topic by a plurality of previous users including the second user, and includes as vertices at least a portion of one or more previous query terms used in the plurality of previous searches, the comparison includes a correlation between (a) a subgraph of the TAG consisting of: (i) the one or more second query terms, and (ii) at least one additional previous query term directly linked to all of the one or more second query terms in the PAG and (b) the one or more DAGs associated with the first snippets included in the second search result listing, and ranking includes ranking the at least a portion of the second search result listing at least in part responsively to the correlation.

In an embodiment, performing the comparison includes constructing a global association graph (GAG) that represents interactions of a plurality of searches conducted by a plurality of previous users including the second user with a respective plurality of previous search result documents presented to the previous users during the searches, and includes as vertices at least a portion of one or more previous query terms used in the plurality of previous searches, the comparison includes a correlation between (a) a subgraph of the GAG consisting of: (i) the one or more second query terms, and (ii) at least one additional previous query term directly linked to all of the one or more second query terms in the GAG and (b) the one or more DAGs associated with the first snippets included in the second search result listing, and ranking includes ranking the at least a portion of the second search result listing at least in part responsively to the correlation.

There is additionally provided, in accordance with an embodiment of the present invention, a computer-implemented method including:

receiving from a user a plurality of first search queries, each of which consists of one or more first query terms;

presenting to the user a plurality of respective first search result listings, each of which includes one or more first snippets associated with one or more respective first search result documents;

constructing a personal association graph (PAG) for the user that represents interactions between the user and a plurality of the first snippets, and includes at least a portion of the one or more first query terms as vertices;

receiving from the user a second search query that consists of one or more second query terms;

responsively to the second search query, generating a second search result listing;

calculating respective correlation scores between the PAG and a plurality of second search result documents of at least a portion of the second search result listing;

ranking the at least a portion of the second search result listing at least in part responsively to the correlation scores; and presenting the ranked second search result listing to the user.

In an embodiment, calculating the respective correlation scores includes:

constructing a PAG matrix representing at least a portion of the PAG;

constructing respective document matrices for the plurality of search result document; and calculating the respective correlation scores using the PAG matrix and the respective document matrices.

In an embodiment, the user is one of a plurality of users, and calculating the respective correlation scores includes:

constructing a plurality of document profiles respectively associated with the plurality of second search result documents, each of which document profiles represents interactions of (a) a plurality of previous searches conducted by the plurality of users with (b) the respective second search result document associated with the document profile; and calculating the respective correlation scores between the PAG and the plurality of document profiles respectively associated with the plurality of second search result documents.

For some applications, each of the plurality of previous searches includes one or more previous query terms, the document profiles include respective document association graphs, each of which includes one or more of the previous query terms as vertices, and calculating the respective correlation scores includes calculating the respective correlation scores between the PAG and the plurality of DAGs respectively associated with the plurality of second search result documents.

In an embodiment, calculating the respective correlation scores includes:

constructing a subgraph of the PAG that consists of the second query terms and one or more additional first query terms of the PAG; and calculating the respective correlation scores between the subgraph and the plurality of the second search result documents.

For some applications, all of the one or more additional first query terms of the PAG are directly linked to all of the second query terms within the PAG, and constructing the subgraph of the PAG includes constructing the subgraph of the PAG that consists of the second query terms and the one or more additional first query terms of the PAG that are directly linked to all of the second query terms within the PAG.

There is still additionally provided, in accordance with an embodiment of the present invention, a computer-implemented method including:

receiving from a user a plurality of first search queries, each of which consists of one or more first query terms;

presenting to the user a plurality of respective first search result listings, each of which includes one or more first snippets associated with one or more respective first search result documents;

constructing a personal association graph (PAG) for the user that represents interactions between the user and a plurality of the first snippets, and includes at least a portion of the one or more first query terms as vertices;

receiving from the user a second search query that consists of one or more second query terms included in a portion of the vertices of the PAG;

responsively to the second search query, generating a set of one or more refinement terms including at least one of the first query terms selected for inclusion in the set responsively to a level of association of the first query term with the second query terms in the PAG;

presenting the set of refinement terms to the user;

responsively to a selection of at least one of the refinement terms by the user, adding the selected at least one refinement term to the second search query to generate a third search query; and presenting search results to the user responsively to the third search query.

For some applications, generating the set includes selecting the first query term for inclusion in the set responsively to finding that the first query term is directly linked to all of the second query terms in the PAG.

For some applications, the set of refinement terms includes one or more primary refinement terms, and one or more secondary refinement terms associated with at least one of the one or more primary refinement terms, and presenting the set of refinement terms includes presenting the primary and secondary refinement terms.

There is yet additionally provided, in accordance with an embodiment of the present invention, a computer-implemented method including:

receiving from a plurality of users a respective plurality of first search queries, each of which consists of one or more first query terms, the plurality of users including a plurality of first users, and a second user;

constructing a topic association graph (TAG) that represents interactions of a portion of the users with (a) a portion of the first queries conducted within a single topic and (b) respective first search result listings generated responsively to the portion of the first search queries, and includes as vertices at least a portion of the first query terms;

receiving from the second user a second search query, which consists of one or more second query terms included in a portion of the vertices of the TAG;

responsively to the second search query, generating a second search result listing including a plurality of documents;

ranking at least a portion of the second search result listing at least in part responsively to a comparison between (a) the TAG and (b) at least a portion of the documents of the second search result listing; and presenting at least a portion of the ranked second search result listing to the second user.

For some applications, constructing the TAG includes:

constructing respective personal profiles for each of the users of the portion of the users, each of which profiles represents interactions of a plurality of previous searches conducted by the user with a respective plurality of previous search result documents presented to the user during the previous searches; and combining respective portions of the personal profiles, which portions are associated with the topic, to form the TAG.

For some applications, the personal profiles include respective personal association graphs (PAGs), each of the previous searches includes one or more query terms, and constructing the respective personal profiles includes constructing the respective PAGs including at least a portion of the query terms as vertices.

For some applications, constructing the TAG includes extracting one or more hotspots from each of the PAGs, and combining the hotspots to form the TAG.

In an embodiment, ranking includes:

constructing a subgraph of the TAG that consists of the second query terms and one or more additional first query terms of the TAG, the comparison includes a comparison between (a) the subgraph of TAG and (b) the at least a portion of the documents; and ranking the at least a portion of the second search result listing at least in part responsively to the comparison.

For some applications, all of the one or more additional first query terms of the TAG are directly linked to all of the second query terms within the TAG, and constructing the subgraph of the TAG includes constructing the subgraph of the TAG that consists of the second query terms and the one or more additional first query terms of the TAG that are directly linked to all of the second query terms within the TAG.

There is also provided, in accordance with an embodiment of the present invention, a computer-implemented method including:

receiving from a plurality of users a respective plurality of first search queries, each of which consists of one or more first query terms, the plurality of users including a plurality of first users, and a second user;

constructing a topic association graph (TAG) that represents interactions of a portion of the users with (a) a portion of the first queries conducted within a single topic and (b) respective first search result listings generated responsively to the portion of the first search queries, and includes as vertices at least a portion of the first query terms;

receiving from the second user a second search query, which consists of one or more second query terms included in a portion of the vertices of the TAG;

responsively to the second search query, generating a set of one or more refinement terms including at least one of the first query terms selected for inclusion in the set responsively to a level of association of the first query term with the second query terms in the TAG;

presenting the set of refinement terms to the second user;

responsively to a selection of at least one of the refinement terms by the second user, adding the selected at least one refinement term to the second search query to generate a third search query; and presenting search results to the second user responsively to the third search query.

For some applications, generating the set includes selecting the first query term for inclusion in the set responsively to finding that the first query term is directly linked to all of the second query terms in the TAG.

For some applications, the set of refinement terms includes one or more primary refinement terms, and one or more secondary refinement terms associated with at least one of the one or more primary refinement terms, and presenting the set of refinement terms includes presenting the primary and secondary refinement terms.

In an embodiment, constructing the TAG includes:

constructing respective personal profiles for each of the users of the portion of the users, each of which profiles represents interactions of a plurality of previous searches conducted by the user with a respective plurality of previous search result documents presented to the user during the previous searches; and combining respective portions of the personal profiles, which portions are associated with the topic, to form the TAG.

For some applications, the personal profiles include respective personal association graphs (PAGs), each of the previous searches includes one or more query terms, and constructing the respective personal profiles includes constructing the respective PAGs including at least a portion of the query terms as vertices. For some applications, constructing the TAG includes extracting one or more hotspots from each of the PAGs, and combining the hotspots to form the TAG.

There is further provided, in accordance with an embodiment of the present invention, a computer-implemented method including:

receiving from a user a first search query consisting of one or more first query terms;

responsively to the search query, generating and presenting to the user a search result listing that includes at least a first snippet associated with a first search result document, and a second snippet associated with a second search result document;

presenting, in association with the first snippet, a first set of one or more refinement terms, and, in association with the second snippet, a second set of one or more refinement terms, the first set is different from the second set;

responsively to a selection of one of the refinement terms of the first set or second set, adding the selected one of the refinement terms to the search query to generate a refined second search query; and responsively to the refined second search query, generating and presenting to the user a refined search result listing.

In an embodiment, generating the first set of refinement terms includes generating the first set of refinement terms by:

constructing a personal profile for the user that represents interactions of a plurality of previous searches conducted by the user with a respective plurality of previous search result documents presented to the user during the previous searches, each of previous searches includes one or more previous query terms, and selecting at least one of the previous query terms for inclusion in the first set as one of the refinement terms, responsively to a level of association of the previous query term with the first query terms in the personal profile.

For some applications, the personal profile includes a personal association graph (PAG), constructing the personal profile includes constructing the PAG including at least a portion of the previous query terms as vertices, and selecting the previous query term includes selecting the previous query term for inclusion in the first set responsively to finding that the previous query term is directly linked to all of the first query terms in the PAG.

In an embodiment, the user is one of a plurality of users, and generating the first set of refinement terms includes generating the first set of refinement terms by:

constructing a topic profile that represents interactions of a plurality of previous searches conducted by the plurality of users within a single topic, each of the previous searches includes one or more previous query terms, and selecting at least one of the previous query terms for inclusion in the first set as one of the refinement terms, responsively to a level of association of the previous query term with the first query terms in the topic profile.

For some applications, the topic profile includes a topic association graph (TAG), constructing the personal profile includes constructing the TAG including at least a portion of the previous query terms as vertices, and selecting the previous query term includes selecting the previous query term for inclusion in the first set responsively to finding that the previous query term is directly linked to all of the first query terms in the TAG.

In an embodiment, the user is one of a plurality of users, and generating the first set of refinement terms includes generating the first set of refinement terms by:

constructing a global profile that represents interactions of a plurality of searches conducted by the plurality of users with a respective plurality of previous search result documents presented to the users during the searches, each of the previous searches includes one or more previous query terms, and selecting at least one of the previous query terms for inclusion in the first set as one of the refinement terms, responsively to a level of association of the previous query term with the first query terms in the global profile.

For some applications, the global profile includes a global association graph (GAG), constructing the global profile includes constructing the GAG including at least a portion of the previous query terms as vertices, and selecting the previous query term includes selecting the previous query term for inclusion in the first set responsively to finding that the previous query term is directly linked to all of the first query terms in the GAG.

There is still further provided, in accordance with an embodiment of the present invention, a computer-implemented method including:

constructing a plurality of personal profiles for a respective plurality of users, each of which personal profiles represents interactions of a plurality of first searches conducted by one of the users with a respective plurality of first search result documents presented to the user during the first searches;

identifying a subset of the personal profiles as correlated with one another;

constructing a group profile by combining at least a portion of each of the personal profiles in the subset;

receiving a second search query from one of the users whose personal profile is included in the subset;

responsively to the second search query, generating a search result listing;

calculating respective correlation scores between the group profile and a plurality of second search result documents of at least a portion of the second search result listing;

ranking the at least a portion of the second search result listing at least in part responsively to the correlation scores; and presenting the ranked second search result listing to the one of the users.

In an embodiment, the personal profiles include respective personal association graph (PAGs), each of the first searches includes one or more first query terms, constructing the personal profiles includes constructing the PAGs including at least a portion of the first query terms as vertices, the group profile includes a group association graph (GRAG), and constructing the group profile includes constructing the GRAG by combining at least a portion of each of the PAGs in the subset.

There is additionally provided, in accordance with an embodiment of the present invention, apparatus including:

an interface for communicating with a user; and a processor, which is configured to present to the user, via the interface, a range of levels of personalization of search results, including a personalized level, a global level that is not personalized, and a community level between the personalized level and the global level; receive from the user, via the interface, an indication of a desired one of the levels; receive from a user, via the interface, a search query consisting of one or more query terms; responsively to the search query, generate a search result listing; rank at least a portion of the search result listing at least in part responsively to the indication; and present at least a portion of the ranked search result listing to the user via the interface.

There is still additionally provided, in accordance with an embodiment of the present invention, apparatus including:

an interface for communicating with a user; and a processor, configured to receive from the user, via the interface, a first search query consisting of one or more first query terms; receive from the user, via the interface, an indication of a desired level of personalization of refinement options for the search query; responsively to the search query, generate a set of one or more refinement terms at least in part responsively to the indication; present the set of refinement terms to the user via the interface; responsively to a selection of at least one of the refinement terms by the user, add the selected at least one refinement term to the first search query to generate a second search query; and present to the user, via the interface, search results responsively to the second search query.

There is yet additionally provided, in accordance with an embodiment of the present invention, apparatus including:

an interface for communicating with a plurality of first users and with a second user; and a processor, which is configured to receive from the plurality of first users, via the interface, a respective plurality of first search queries, each of which consists of one or more first query terms; present to the plurality of first users, via the interface, respective first search result listings, each of which includes one or more first snippets associated with one or more respective search result documents; construct a plurality of document profiles, each of which (a) is associated with one of the first snippets selected by one or more of the first users from the respective first search result listings, and (b) represents an interaction of one or more of the first query terms with the first snippet; receiving from the second user, via the interface, a second search query, which consists of one or more second query terms; responsively to the second search query, generate a second search result listing, which includes at least a portion of the one or more first snippets; perform a comparison between (a) the second search query and (b) one or more of the document profiles associated with the first snippets included in the second search result listing; rank at least a portion of the second search result listing at least in part responsively to comparison; and present at least a portion of the ranked second search result listing to the second user via the interface.

There is yet additionally provided, in accordance with an embodiment of the present invention, apparatus including:

an interface for communicating with a user; and a processor, which is configured to receive from the user, via the interface, a plurality of first search queries, each of which consists of one or more first query terms; present to the user, via the interface, a plurality of respective first search result listings, each of which includes one or more first snippets associated with one or more respective first search result documents; construct a personal association graph (PAG) for the user that represents interactions between the user and a plurality of the first snippets, and includes at least a portion of the one or more first query terms as vertices; receive from the user, via the interface, a second search query that consists of one or more second query terms; responsively to the second search query, generate a second search result listing; calculate respective correlation scores between the PAG and a plurality of second search result documents of at least a portion of the second search result listing; rank the at least a portion of the second search result listing at least in part responsively to the correlation scores; and present the ranked second search result listing to the user via the interface.

There is also provided, in accordance with an embodiment of the present invention, apparatus including:

an interface for communicating with a user; and a processor, configured to receive from the user, via the interface, a plurality of first search queries, each of which consists of one or more first query terms; present to the user, via the interface, a plurality of respective first search result listings, each of which includes one or more first snippets associated with one or more respective first search result documents; constructing a personal association graph (PAG) for the user that represents interactions between the user and a plurality of the first snippets, and includes at least a portion of the one or more first query terms as vertices; receiving from the user, via the interface, a second search query that consists of one or more second query terms included in a portion of the vertices of the PAG; responsively to the second search query, generate a set of one or more refinement terms including at least one of the first query terms selected for inclusion in the set responsively to a level of association of the first query term with the second query terms in the PAG; present the set of refinement terms to the user via the interface; responsively to a selection of at least one of the refinement terms by the user, add the selected at least one refinement term to the second search query to generate a third search query; and present to the user, via the interface, search results responsively to the third search query.

There is further provided, in accordance with an embodiment of the present invention, apparatus including:

an interface for communicating with a plurality of users, which includes a plurality of first users, and a second user; and a processor, configured to receive from the plurality of users, via the interface, a respective plurality of first search queries, each of which consists of one or more first query terms; construct a topic association graph (TAG) that represents interactions of a portion of the users with (a) a portion of the first queries conducted within a single topic and (b) respective first search result listings generated responsively to the portion of the first search queries, and includes as vertices at least a portion of the first query terms; receive from the second user, via the interface, a second search query, which consists of one or more second query terms included in a portion of the vertices of the TAG; responsively to the second search query, generate a second search result listing including a plurality of documents; rank at least a portion of the second search result listing at least in part responsively to a comparison between (a) the TAG and (b) at least a portion of the documents of the second search result listing; and presenting at least a portion of the ranked second search result listing to the second user via the interface.

There is still further provided, in accordance with an embodiment of the present invention, apparatus including:

an interface for communicating with a plurality of users, which includes a plurality of first users, and a second user; and a processor, configured to receive from the plurality of users, via the interface, a respective plurality of first search queries, each of which consists of one or more first query terms; construct a topic association graph (TAG) that represents interactions of a portion of the users with (a) a portion of the first queries conducted within a single topic and (b) respective first search result listings generated responsively to the portion of the first search queries, and includes as vertices at least a portion of the first query terms; receive from the second user, via the interface, a second search query, which consists of one or more second query terms included in a portion of the vertices of the TAG; responsively to the second search query, generate a set of one or more refinement terms including at least one of the first query terms selected for inclusion in the set responsively to a level of association of the first query term with the second query terms in the TAG; present the set of refinement terms to the second user via the interface; responsively to a selection of at least one of the refinement terms by the second user, add the selected at least one refinement term to the second search query to generate a third search query; and present to the second user, via the interface, search results responsively to the third search query.

There is additionally provided, in accordance with an embodiment of the present invention, apparatus including:

an interface for communicating with a user; and a processor, which is configured to receive from the user, via the interface, a first search query consisting of one or more first query terms; responsively to the search query, generate and present to the user, via the interface, a search result listing that includes at least a first snippet associated with a first search result document, and a second snippet associated with a second search result document; present, in association with the first snippet, a first set of one or more refinement terms, and, in association with the second snippet, a second set of one or more refinement terms, the first set is different from the second set; responsively to a selection of one of the refinement terms of the first set or second set, add the selected one of the refinement terms to the search query to generate a refined second search query; and responsively to the refined second search query, generate and present to the user, via the interface, a refined search result listing.

There is still additionally provided, in accordance with an embodiment of the present invention, apparatus including:

an interface for communicating with a plurality of users; and a processor, configured to construct a plurality of personal profiles for the respective plurality of users, each of which personal profiles represents interactions of a plurality of first searches conducted by one of the users with a respective plurality of first search result documents presented to the user during the first searches; identify a subset of the personal profiles as correlated with one another; construct a group profile by combining at least a portion of each of the personal profiles in the subset; receive, via the interface, a second search query from one of the users whose personal profile is included in the subset; responsively to the second search query, generate a search result listing; calculate respective correlation scores between the group profile and a plurality of second search result documents of at least a portion of the second search result listing; rank the at least a portion of the second search result listing at least in part responsively to the correlation scores; and present the ranked second search result listing to the one of the users via the interface.

There is yet additionally provided, in accordance with an embodiment of the present invention, a computer software product, including a tangible computer-readable medium in which program instructions are stored, which instructions, when read by a computer, cause the computer to present to a user a range of levels of personalization of search results, including a personalized level, a global level that is not personalized, and a community level between the personalized level and the global level; receive from the user an indication of a desired one of the levels; receive from a user a search query consisting of one or more query terms; responsively to the search query, generate a search result listing; rank at least a portion of the search result listing at least in part responsively to the indication; and present at least a portion of the ranked search result listing to the user.

There is also provided, in accordance with an embodiment of the present invention, a computer software product, including a tangible computer-readable medium in which program instructions are stored, which instructions, when read by a computer, cause the computer to receive from a user a first search query consisting of one or more first query terms; receive from the user an indication of a desired level of personalization of refinement options for the search query; responsively to the search query, generate a set of one or more refinement terms at least in part responsively to the indication; present the set of refinement terms to the user; responsively to a selection of at least one of the refinement terms by the user, add the selected at least one refinement term to the first search query to generate a second search query; and present to the user search results responsively to the second search query.

There is further provided, in accordance with an embodiment of the present invention, a computer software product, including a tangible computer-readable medium in which program instructions are stored, which instructions, when read by a computer, cause the computer to receive from a plurality of first users a respective plurality of first search queries, each of which consists of one or more first query terms; present to the plurality of first users respective first search result listings, each of which includes one or more first snippets associated with one or more respective search result documents; construct a plurality of document profiles, each of which (a) is associated with one of the first snippets selected by one or more of the first users from the respective first search result listings, and (b) represents an interaction of one or more of the first query terms with the first snippet; receiving from a second user a second search query, which consists of one or more second query terms; responsively to the second search query, generate a second search result listing, which includes at least a portion of the one or more first snippets; perform a comparison between (a) the second search query and (b) one or more of the document profiles associated with the first snippets included in the second search result listing; rank at least a portion of the second search result listing at least in part responsively to comparison; and present at least a portion of the ranked second search result listing to the second user.

There is still further provided, in accordance with an embodiment of the present invention, a computer software product, including a tangible computer-readable medium in which program instructions are stored, which instructions, when read by a computer, cause the computer to receive from a user a plurality of first search queries, each of which consists of one or more first query terms; present to the user a plurality of respective first search result listings, each of which includes one or more first snippets associated with one or more respective first search result documents; construct a personal association graph (PAG) for the user that represents interactions between the user and a plurality of the first snippets, and includes at least a portion of the one or more first query terms as vertices; receive from the user a second search query that consists of one or more second query terms; responsively to the second search query, generate a second search result listing; calculate respective correlation scores between the PAG and a plurality of second search result documents of at least a portion of the second search result listing; rank the at least a portion of the second search result listing at least in part responsively to the correlation scores; and present the ranked second search result listing to the user.

There is additionally provided, in accordance with an embodiment of the present invention, a computer software product, including a tangible computer-readable medium in which program instructions are stored, which instructions, when read by a computer, cause the computer to receive from a user a plurality of first search queries, each of which consists of one or more first query terms; present to the user a plurality of respective first search result listings, each of which includes one or more first snippets associated with one or more respective first search result documents; constructing a personal association graph (PAG) for the user that represents interactions between the user and a plurality of the first snippets, and includes at least a portion of the one or more first query terms as vertices; receiving from the user a second search query that consists of one or more second query terms included in a portion of the vertices of the PAG; responsively to the second search query, generate a set of one or more refinement terms including at least one of the first query terms selected for inclusion in the set responsively to a level of association of the first query term with the second query terms in the PAG; present the set of refinement terms to the user; responsively to a selection of at least one of the refinement terms by the user, add the selected at least one refinement term to the second search query to generate a third search query; and present to the user search results responsively to the third search query.

There is still additionally provided, in accordance with an embodiment of the present invention, a computer software product, including a tangible computer-readable medium in which program instructions are stored, which instructions, when read by a computer, cause the computer to receive from a plurality of users a respective plurality of first search queries, each of which consists of one or more first query terms, the plurality of users including a plurality of first users, and a second user; construct a topic association graph (TAG) that represents interactions of a portion of the users with (a) a portion of the first queries conducted within a single topic and (b) respective first search result listings generated responsively to the portion of the first search queries, and includes as vertices at least a portion of the first query terms; receive from the second user a second search query, which consists of one or more second query terms included in a portion of the vertices of the TAG; responsively to the second search query, generate a second search result listing including a plurality of documents; rank at least a portion of the second search result listing at least in part responsively to a comparison between (a) the TAG and (b) at least a portion of the documents of the second search result listing; and presenting at least a portion of the ranked second search result listing to the second user.

There is yet additionally provided, in accordance with an embodiment of the present invention, a computer software product, including a tangible computer-readable medium in which program instructions are stored, which instructions, when read by a computer, cause the computer to receive from a plurality of users a respective plurality of first search queries, each of which consists of one or more first query terms, the plurality of users including a plurality of first users, and a second user; construct a topic association graph (TAG) that represents interactions of a portion of the users with (a) a portion of the first queries conducted within a single topic and (b) respective first search result listings generated responsively to the portion of the first search queries, and includes as vertices at least a portion of the first query terms; receive from the second user a second search query, which consists of one or more second query terms included in a portion of the vertices of the TAG; responsively to the second search query, generate a set of one or more refinement terms including at least one of the first query terms selected for inclusion in the set responsively to a level of association of the first query term with the second query terms in the TAG; present the set of refinement terms to the second user; responsively to a selection of at least one of the refinement terms by the second user, add the selected at least one refinement term to the second search query to generate a third search query; and present to the second user search results responsively to the third search query.

There is also provided, in accordance with an embodiment of the present invention, a computer software product, including a tangible computer-readable medium in which program instructions are stored, which instructions, when read by a computer, cause the computer to receive from the user a first search query consisting of one or more first query terms; responsively to the search query, generate and present to the user a search result listing that includes at least a first snippet associated with a first search result document, and a second snippet associated with a second search result document; present, in association with the first snippet, a first set of one or more refinement terms, and, in association with the second snippet, a second set of one or more refinement terms, the first set is different from the second set; responsively to a selection of one of the refinement terms of the first set or second set, add the selected one of the refinement terms to the search query to generate a refined second search query; and responsively to the refined second search query, generate and present to the user a refined search result listing.

There is further provided, in accordance with an embodiment of the present invention, a computer software product, including a tangible computer-readable medium in which program instructions are stored, which instructions, when read by a computer, cause the computer to construct a plurality of personal profiles for the respective plurality of users, each of which personal profiles represents interactions of a plurality of first searches conducted by one of the users with a respective plurality of first search result documents presented to the user during the first searches; identify a subset of the personal profiles as correlated with one another; construct a group profile by combining at least a portion of each of the personal profiles in the subset; receive a second search query from one of the users whose personal profile is included in the subset; responsively to the second search query, generate a search result listing; calculate respective correlation scores between the group profile and a plurality of second search result documents of at least a portion of the second search result listing; rank the at least a portion of the second search result listing at least in part responsively to the correlation scores; and present the ranked second search result listing to the one of the users.

There is further provided, in accordance with an embodiment of the present invention, a computer-implemented method including:

receiving a plurality of first search queries, each of which comprises one or more first query terms;

constructing at least one association graph that includes at least a portion of the first query terms as vertices;

receiving from a user a second search query consisting of a plurality of second query terms;

using the at least one association graph, identifying one or more suggested replacement terms for one or more of the second query terms;

presenting the suggested replacement terms to the user;

responsively to a selection of one of the suggested replacement terms by the user, substituting the selected suggested replacement term for the corresponding one of the second query terms, to generate a refined search query; and presenting search results to the user responsively to the refined search query.

For some applications, identifying the suggested replacement terms for the one or more of the second query terms includes identifying the suggested replacement terms for exactly one of the second query terms. Alternatively, identifying the suggested replacement terms for the one or more of the second query terms includes identifying at least one first suggested replacement term for a first one of the one or more of the second query terms, and at least one second suggested replacement term for a second one of the one or more of the second query terms.

For some applications, presenting the one or more suggested replacement terms includes presenting one or more candidate replacement queries, each of which includes at least one of the suggested replacement terms and the plurality of second query terms other than the second query terms that respectively correspond to the at least one of the suggested replacement terms. Alternatively or additionally, presenting the one or more suggested replacement terms includes presenting each of the one or more suggested replacement terms in association with the one of the second query terms that corresponds to the suggested replacement term.

In an embodiment, receiving the plurality of first search queries includes receiving the plurality of first search queries from the user, and constructing the at least one association graph includes constructing a personal association graph (PAG) for the user that represents interactions of the plurality of first search queries with a respective plurality of search result documents presented to the user in response to the first search queries.

In an embodiment, receiving the plurality of first search queries includes receiving the plurality of first search queries conducted within a single topic, from a plurality of users including the user, and constructing the at least one association graph includes constructing a topic association graph (TAG) that represents interactions of the plurality of first search queries with a respective plurality of search result documents presented to the users in response to the first search queries.

In an embodiment, receiving the plurality of first search queries includes receiving the plurality of first search queries from a plurality of users including the user, and constructing the at least one association graph includes constructing a global association graph (GAG) that represents interactions of the plurality of first search queries with a respective plurality of search result documents presented to the users in response to the first search queries.

In an embodiment, identifying the one or more suggested replacement terms for the one or more of the second query terms includes identifying synonyms of the one or more of the second query terms as the one or more suggested replacement terms. For some applications, identifying the synonyms includes: using the at least one association graph, calculating respective strengths of association of each of the identified synonyms with the plurality of second query terms other than the one of the second query terms corresponding to the identified synonym; and responsively to the calculated strengths of association, selecting as the suggested replacement terms a portion of the identified synonyms including one or more of the identified synonyms. For some applications, calculating the respective strengths of association includes calculating a strength of association of at least two of the identified synonyms with the plurality of second query terms other than the at least two of the second query terms respectively synonymous with the identified synonyms.

For some applications, identifying the synonyms of the one or more of the second query terms includes: retrieving, from a lexical database, respective measures of strength of synonymy between each of the synonyms and its synonymous second query term; and selecting only the synonyms having the greatest measures of strength as the identified synonyms.

In an embodiment, identifying the one or more suggested replacement terms includes: designating one or more of the second query terms as anchor terms, and the remaining second query terms as non-anchor terms; and identifying the one or more suggested replacement terms for one or more of the non-anchor terms and not for any of the anchor terms. For some applications, designating as the anchor terms includes determining a part of speech of each of the second query terms, and considering for designation as the anchor terms only those of the second query terms that are a particular part of speech. For example, considering for designation as the anchor terms may include considering for designation as the anchor terms only those of the second query terms that are determined to be nouns. For some applications, designating as the anchor terms includes determining how many synonyms each of the second query terms has in a lexical database, and designating as the anchor terms one or more of the second query terms having the fewest synonyms. For some applications, designating as the anchor terms includes designating as the anchor terms responsively to respective association scores of each of the second query terms within the at least one association graph.

In an embodiment, receiving the initial search second query includes receiving from the user an indication of a desired level of personalization of the suggested replacement terms, and identifying the suggested replacement terms includes selecting the at least one association graph for use at least in part responsively to the indication. For some applications, receiving the indication of the desire level of personalization includes presenting to the user a range of levels of personalization, including a personalized level, a global level that is not personalized, and a community level between the personalized level and the global level, and receiving from the user the indication of a desired one of the levels.

There is further provided, in accordance with an embodiment of the present invention, a computer-implement method including:

receiving from a user an initial search query consisting of a plurality of query terms;

designating one or more of the query terms as anchor terms, and the remaining query terms as non-anchor terms;

identifying one or more suggested replacement terms for one or more of the non-anchor terms and not for any of the anchor terms;

presenting the suggested replacement terms to the user;

responsively to a selection of one of the suggested replacement terms by the user, substituting the selected suggested replacement term the corresponding one of the query terms, to generate a refined search query; and presenting search results to the user responsively to the refined search query.

For some applications, identifying the suggested replacement terms for the one or more of the query terms includes identifying the suggested replacement terms for exactly one of the query terms. Alternatively, identifying the suggested replacement terms for the one or more of the query terms includes identifying at least one first suggested replacement term for a first one of the one or more of the query terms, and at least one second suggested replacement term for a second one of the one or more of the query terms.

For some applications, presenting the one or more suggested replacement terms includes presenting one or more candidate replacement queries, each of which includes at least one of the suggested replacement terms and the plurality of query terms other than the query terms that respectively correspond to the at least one of the suggested replacement terms. Alternatively or additionally, presenting the one or more suggested replacement terms includes presenting each of the one or more suggested replacement terms in association with the one of the query terms that corresponds to the suggested replacement term.

In an embodiment, identifying the one or more suggested replacement terms for the one or more of the query terms includes identifying synonyms of the one or more of the query terms as the one or more suggested replacement terms.

In an embodiment, designating as the anchor terms includes determining how many synonyms each of the query terms has in a lexical database, and designating as the anchor terms one or more of the query terms having the fewest synonyms.

In an embodiment, designating as the anchor terms includes designating as the anchor terms responsively to respective association scores of each of the query terms within at least one association graph that includes as vertices respective previous query terms.

In an embodiment, designating as the anchor terms includes determining a part of speech of each of the query terms, and considering for designation as the anchor terms only those of the query terms that are a particular part of speech. For example, considering for designation as the anchor terms may include considering for designation as the anchor terms only those of the query terms that are determined to be nouns.

There is still further provided, in accordance with an embodiment of the present invention, apparatus including:
an interface; and
a processor, which is configured to receive a plurality of first search queries, via the interface, each of which comprises one or more first query terms; construct at least one association graph that includes at least a portion of the first query terms as vertices; receive from a user, via the interface, a second search query consisting of a plurality of second query terms; using the at least one association graph, identify one or more suggested replacement terms for one or more of the second query terms; present the suggested replacement terms to the user, via the interface; responsively to a selection of one of the suggested replacement terms by the user, substitute the selected suggested replacement term for the corresponding one of the second query terms, to generate a refined search query; and present, via the interface, search results to the user responsively to the refined search query.

There is additionally provided, in accordance with an embodiment of the present invention, apparatus including:
an interface for communicating with a user; and
a processor, which is configured to receive from the user, via the interface, an initial search query consisting of a plurality of query terms; designate one or more of the query terms as anchor terms, and the remaining query terms as non-anchor terms; identify one or more suggested replacement terms for one or more of the non-anchor terms and not for any of the anchor terms; present the suggested replacement terms to the user, via the interface; responsively to a selection of one of the suggested replacement terms by the user, substitute the selected suggested replacement term the corresponding one of the query terms, to generate a refined search query; and present, via the interface, search results to the user responsively to the refined search query.

There is yet additionally provided, in accordance with an embodiment of the present invention, a computer software product, including a tangible computer-readable medium in which program instructions are stored, which instructions, when read by a computer, cause the computer to receive a plurality of first search queries, each of which comprises one or more first query terms; construct at least one association graph that includes at least a portion of the first query terms as vertices; receive from a user a second search query consisting of a plurality of second query terms; using the at least one association graph, identify one or more suggested replacement terms for one or more of the second query terms; present the suggested replacement terms to the user; responsively to a selection of one of the suggested replacement terms by the user, substitute the selected suggested replacement term for the corresponding one of the second query terms, to generate a refined search query; and present search results to the user responsively to the refined search query.

There is still additionally provided, in accordance with an embodiment of the present invention, a computer software product, including a tangible computer-readable medium in which program instructions are stored, which instructions, when read by a computer, cause the computer to receive from a user an initial search query consisting of a plurality of query terms; designate one or more of the query terms as anchor terms, and the remaining query terms as non-anchor terms; identify one or more suggested replacement terms for one or more of the non-anchor terms and not for any of the anchor terms; present the suggested replacement terms to the user; responsively to a selection of one of the suggested replacement terms by the user, substitute the selected suggested replacement term the corresponding one of the query terms, to generate a refined search query; and present search results to the user responsively to the refined search query.

The present invention will be more fully understood from the following detailed description of embodiments thereof, taken together with the drawings, in which:

BRIEF DESCRIPTION OF THE DRAWINGS

FIG. 4 shows an exemplary association adjacency matrix that represents the same association information represented by the association graph of FIG. 3, in accordance with an embodiment of the present invention;

FIGS. 12A-B show an exemplary topic index, in accordance with an embodiment of the present invention;

FIG. 18 is a flowchart schematically illustrating a method for presenting refinement options pursuant to a community-based preference, in accordance with an embodiment of the present invention;

FIG. 19 is a flowchart schematically illustrating a method for presenting refinement options pursuant to a global-based preference, in accordance with an embodiment of the present invention;

DETAILED DESCRIPTION OF EMBODIMENTS

System Overview

Figure 1:
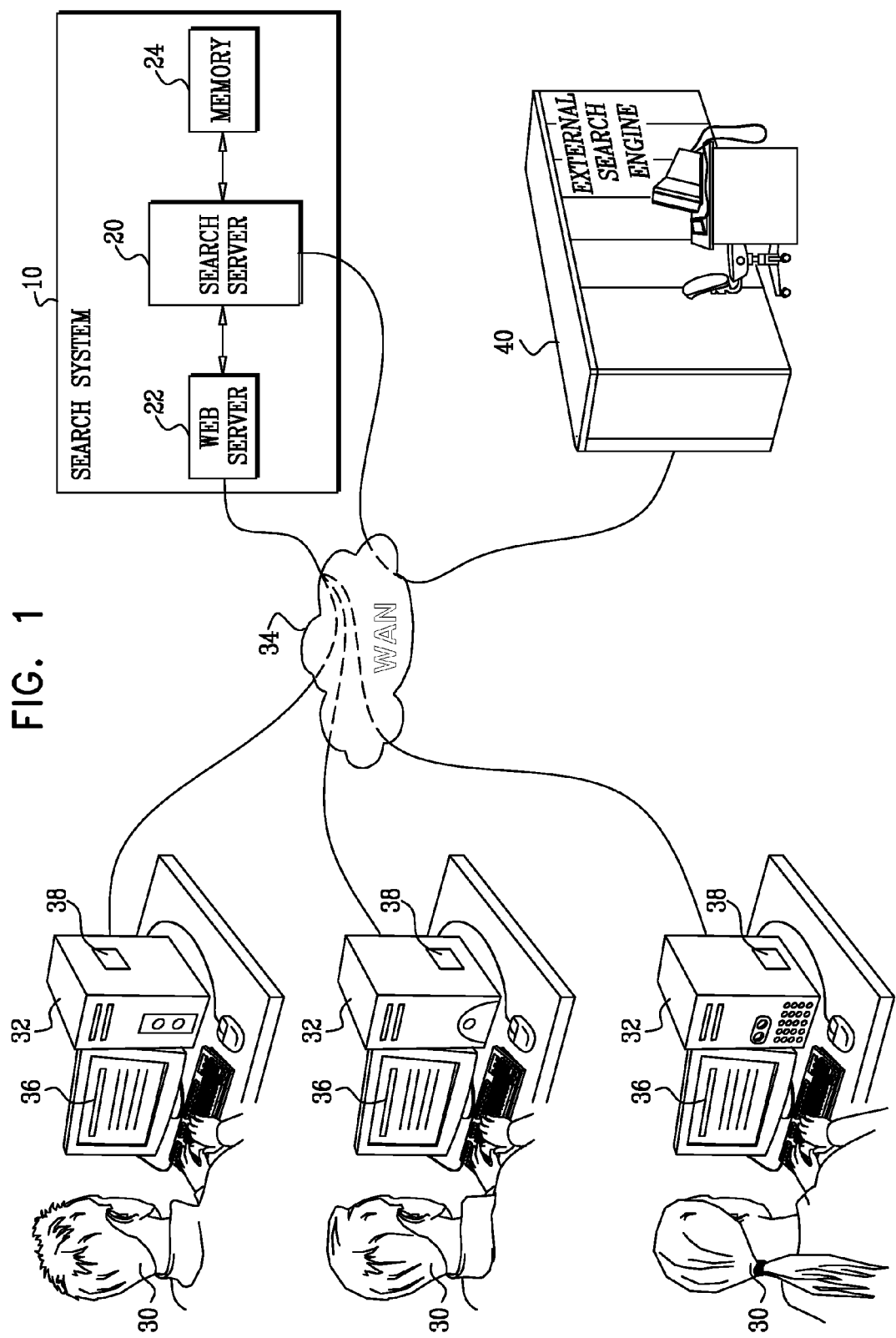
FIG. 1 is a schematic, pictorial illustration of a search system, in accordance with an embodiment of the present invention.

FIG. 1 is a schematic, pictorial illustration of a search system 10, in accordance with an embodiment of the present invention. Search system 10 comprises a search server 20, an interface, such as a web server 22, and a memory 24. Typically, search system 10 comprises one or more standard computer servers with appropriate memory, communication interfaces and software for carrying out the functions prescribed by the present invention. This software may be downloaded to the system in electronic form over a network, for example, or it may alternatively be supplied on tangible media, such as CD-ROM. Memory 24 comprises a non-volatile memory, such as one or more hard disk drives, and/or a volatile memory, such as random-access memory (RAM).

A plurality of users 30 use respective workstations 32, such as a personal computers, to remotely access search system 10 via a wide-area network (WAN) 34, such as the Internet. Alternatively, one or more of users 30 access search system 10 via a local area network (LAN), or both a LAN and a WAN. Typically, a web browser 36 running on each workstation 32 communicates with web server 22. The web browser facilitates entry and refinement of search queries, and displays search results returned from web server 22. Each of workstations 32 comprises a central processing unit (CPU), system memory, a non-volatile memory such as a hard disk drive, a display, input and output means such as a keyboard and a mouse, and a network interface card (NIC). For some applications, workstation 32 implements an agent 38, typically in software. Agent 38 executes certain processes locally at workstation 32, for example such as described hereinbelow with reference to FIG. 9. Typically, the software of agent 38 is downloaded over WAN 34. Workstations 32 comprises software for carrying out the functions prescribed by the present invention. This software may be downloaded to the system in electronic form over a network, for example, or it may alternatively be supplied on tangible media, such as CD-ROM.

In an embodiment of the present invention, search server 20 utilizes search results obtained from an external search engine 40, as described hereinbelow with reference to FIG. 15. For some applications, external search engine 40 is publicly accessible, such as via the Internet. For other applications, the external search engine is a dedicated search engine that provides searching of a particular website or domain, of resources on a private network, such as an intranet and/or enterprise network, or of a particular computer, such as one of workstations 32. Alternatively, search system 10 comprises a search engine that performs the search functionality of external search engine 40, such as mining and crawling the resources to be searched (configuration not shown).

Figure 2:
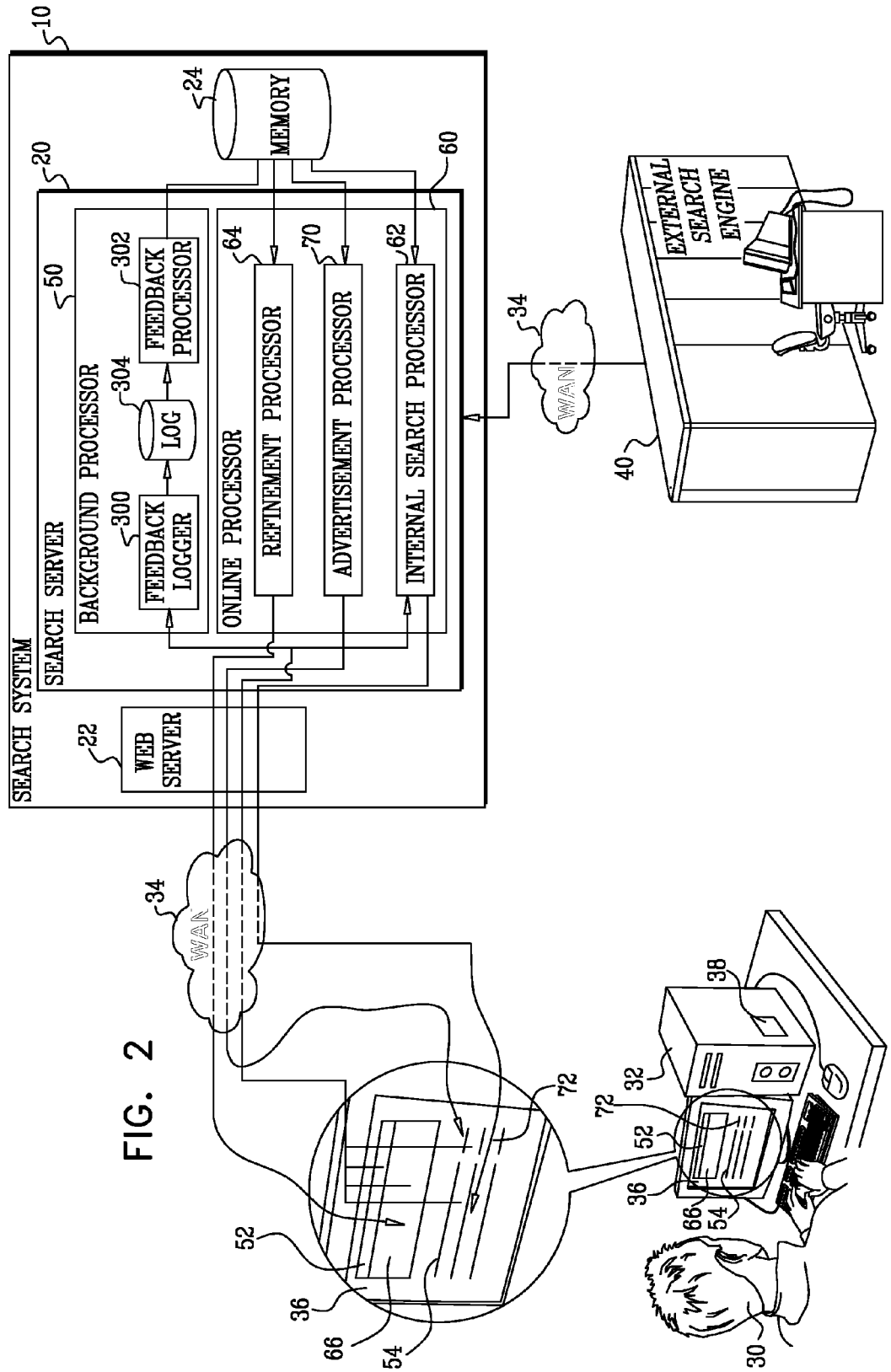
FIG. 2 is a more detailed schematic, pictorial illustration of the search system of FIG. 1, in accordance with an embodiment of the present invention.

Reference is made to FIG. 2, which is a more detailed schematic, pictorial illustration of search system 10, in accordance with an embodiment of the present invention. Search server 20 comprises a background processor 50, which collects and analyzes interactions between users 30 and search system 10, as described in detail hereinbelow with reference to FIGS. 7-13. Such interactions typically include: (a) search queries entered by a user in a search field 52 of browser 36, or populated using the search refinement techniques described hereinbelow with reference to FIGS. 16-20; and (b) clicks on search results 54 by a user.

Search server 20 further comprises an online processor 60, which provides online services to users 30. These services include one or more of:

search services, which are provided by an internal search processor 62 of online processor 60, as described hereinbelow with reference to FIGS. 14-15. Internal search processor 62 typically provides search results via web server 22 as search results 54 in browser 36;

refinement services, which are provided by a refinement processor 64 of online processor 60, as described hereinbelow with reference to FIGS. 16-19. Refinement processor 64 typically provides refinement suggestions via web server 22 as refinement options 66 in browser 36. (In the art, and in the applications assigned to the assignee of the present application that are incorporated hereinbelow by reference, a "refinement option" is sometimes referred to as an "advisory" or as "advisory information."); and advertising services, which are provided by an advertising processor 70 of online processor 60, as described hereinbelow. Advertisement processor 60 typically provides advertisements via web server 22 in an advertisement area 72 in browser 36. Alternatively or additionally, the advertisements are integrated with search results 54, and/or displayed in a popup window, as is known in the art, or using other advertising display techniques known in the art.

Search system 10 generally performs gives higher priority to the processes performed by online processor 60 than to those performed by background processor 50, in order to avoid an interruption of the online services. System 10 typically implements background and online services in a well-balanced parallel and distributed environment, as is known in the art.

Association Graph Overview

Figure 3:
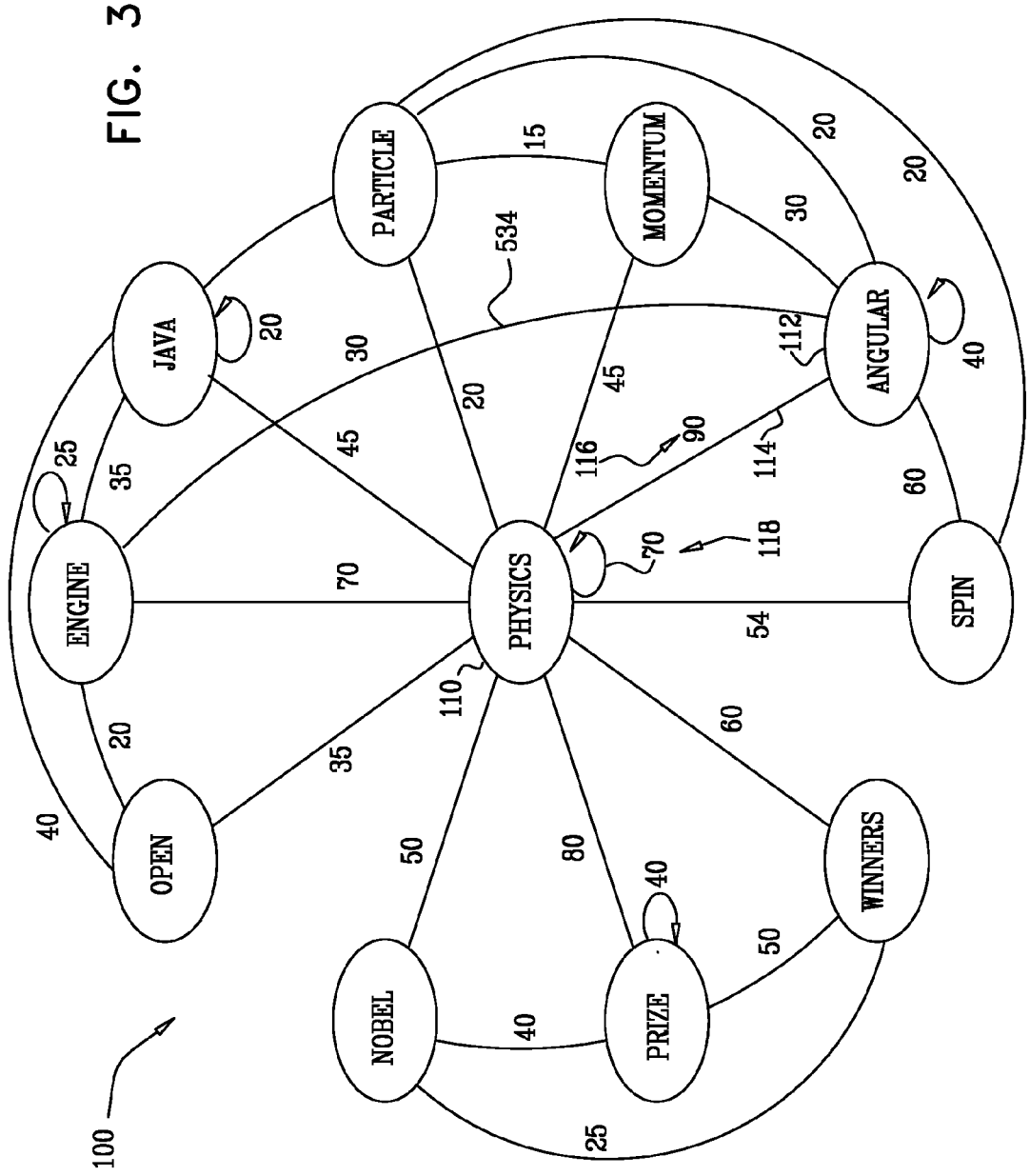
FIG. 3 shows an exemplary association graph, in accordance with an embodiment of the present invention.

Reference is made to FIG. 3, which shows an exemplary association graph 100, in accordance with an embodiment of the present invention. Many of the techniques of embodiments of the present invention utilize association graphs such as illustrated by association graph 100. These association graphs are typically generated and maintained by background processor 50, as described hereinbelow with reference to FIGS. 7-13. Although exemplary association graph 100 includes only limited degrees of association, search system 10 often develops larger and more complex association graphs, which may include degrees of association greater than two.

Search system 10 uses association graphs to cluster users, their search interests and patterns, and information regarding search result documents in respective clusters. Search system 10 creates and maintains one or more of the following association graphs:

a personal association graph (PAG), which is created for each user 30, as described hereinbelow with reference to FIGS. 7-9. In general, each PAG represents the interactions of a plurality of documents with a single user;

a hotspot association graph (generally referred to herein simply as a "hotspot"), one or more of which are extracted from each PAG, as described hereinbelow with reference to FIGS. 10-11. In general, a hotspot includes a portion of a PAG that represents an area of particular importance to the user of the PAG;

a topic association graph (TAG), which is created for each topic identified by background processor 50, as described hereinbelow with reference to FIGS. 12-13. In general, a TAG represents the interactions of a plurality of searches conducted by a plurality users within a single topic;

a document association graph (DAG), which is created for each document (typically represented by a unique URL) selected from search results 54 by any user 30, as described hereinbelow with reference to FIGS. 7-8. In general, a DAG represents the interactions with a single document of a plurality of searches conducted by a plurality of users;

a global association graph (GAG), which represents a merger of all or a large portion of the PAGs or their hotspots, as described hereinbelow with reference to FIGS. 7-8. In general, a GAG represents the interactions of a plurality of users with all or a large portion of the document set of a particular deployment of search system 10; and a group association graph (GRAG), which represents a merger of a plurality of correlated PAGs or their hotspots, as described hereinbelow.

Each association graph comprises one or more vertices, each of which is linked to one or more other vertices by respective edges. Furthermore, a vertex may be linked to itself by an edge in some instances, as described hereinbelow. In the art, and in the applications assigned to the assignee of the present application that are incorporated hereinbelow by reference, "vertices" are sometimes referred to as "nodes," and "edges" are sometimes referred to as "arcs" or "links."

An association graph can be represented visually as a plurality of vertices linked (i.e., connected) by lines representing edges, as shown in FIG. 3, or as an adjacency matrix, as described hereinbelow with reference to FIG. 4. Search system 10 stores association graphs using one or more data structures, such as described hereinbelow with reference to FIG. 5. The phrase "association graph," as used herein, including in the claims, includes any data structure that conceptually includes vertices linked by edges, regardless of the nomenclature used to describe the data structure, or how it may be represented, stored, structured, and/or manipulated in memory and/or another storage medium. For some applications, the association graph comprises a hypergraph, i.e., more than one edge links some pairs of vertices. For some applications, the association graph is not directed, i.e., the edges do not include a direction, while for other applications, the association graph is at least partly directed, i.e., at least a portion of the edges include a direction. For some applications, by linking a plurality of directed edges, the search system develops multi-vertex paths of connectivity among vertices.

Each vertex of an associate graph includes a single term, which comprises one or more keywords. Typically, when a term includes a plurality of keywords, the keywords are order-sensitive. In exemplary association graph 100 shown in FIG. 3, a first vertex 110 includes the single-keyword term "physics," while a second vertex 112 includes the single-keyword term "angular." Each edge has a score that represents the strength of the association of the vertices linked by the edge. For example, an edge 114 that links vertices 110 and 112 has a score 116 equal to 90. As mentioned above, a vertex may be linked to itself; for example, vertex 110 has a self-referential score 118 equal to 70. Association scores are typically, but not necessarily, symmetric, i.e., are not directed.

FIG. 4 shows an exemplary association adjacency matrix 150 that represents the same association information represented by association graph 100 of FIG. 3, in accordance with an embodiment of the present invention. Each value of matrix 150 represents the association score of the vertices listed on the corresponding vertical and horizontal labels of the matrix. For example, score 116 of edge 114 of association graph 100 of FIG. 3 is found at the intersection of vertex 110 ("physics") and vertex 112 ("angular"), and self-referential score 118 is found at the intersection of vertex 110 with itself. Typically, but not necessarily, the matrix is symmetric, so it need only specify values on the diagonal (for self-referential scores) and on one side of the diagonal.

Figure 5:
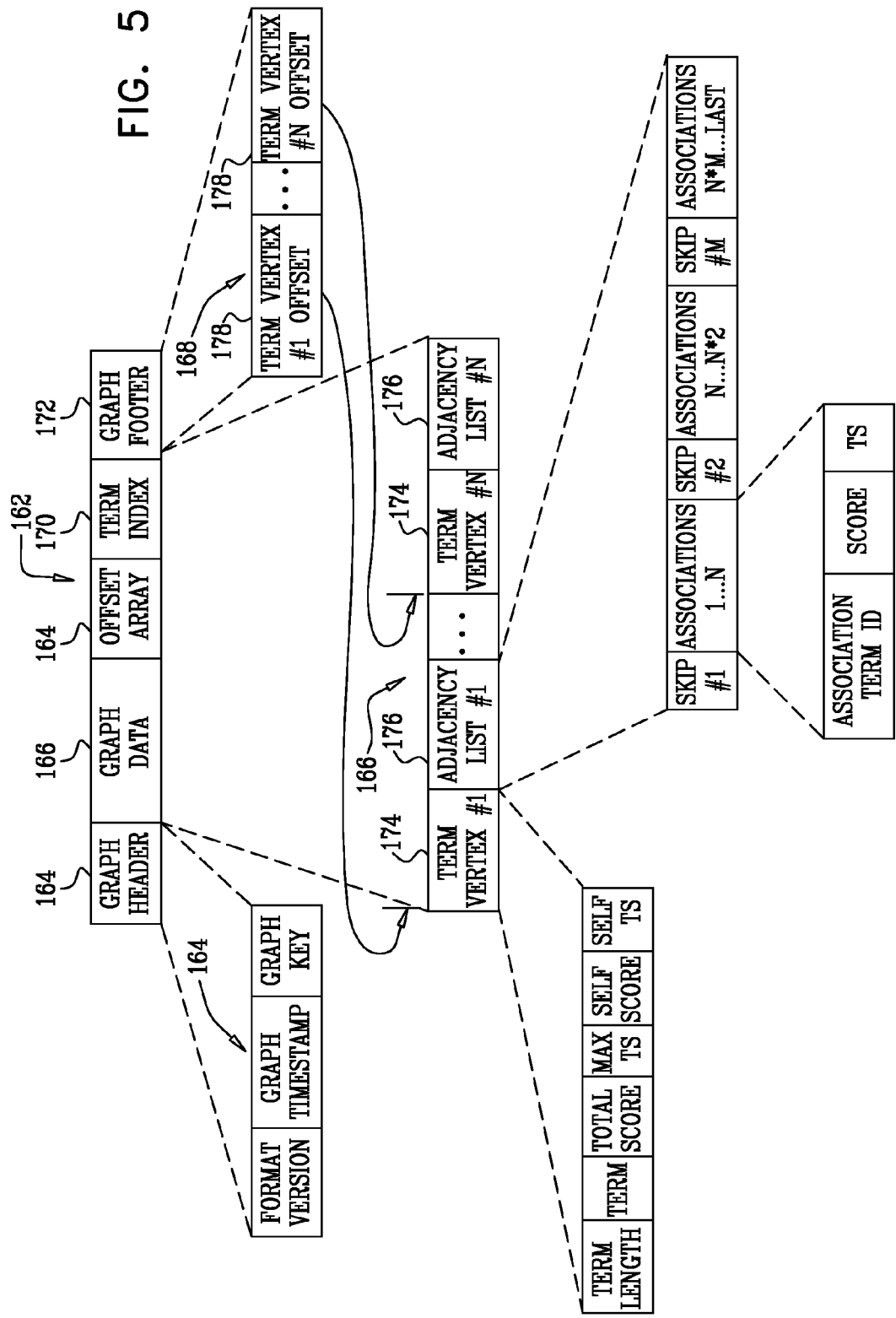
FIG. 5 shows an exemplary data structure used by the search system of FIG. 1 to store the association graph of FIG. 3, in accordance with an embodiment of the present invention.

FIG. 5 shows an exemplary data structure 160 used by search system 10 to store association graph 100 in memory 24, in accordance with an embodiment of the present invention. Numerous other data structures for storing association graphs will be evident to those skilled in the art, and are considered within the scope of the present invention. Data structure 160 comprises a persistent graph 162, which comprises a graph header 164, a graph data section 166, an offset array 168, a term index 170, and a graph footer 172. Graph data section 166 comprises a sequence of data for terms. The data for each term includes a term vertex 174 and an adjacency list 176. Offset array 168 comprises a sequence of offsets 178, which indicate the offsets of corresponding term vertices 174. Term index 170 typically comprises a hash table (e.g., a dense hash table) of the term and the offset. Graph footer typically comprises the graph data length. Additional details regarding data structure 160 are shown in the figure. In the table, "time stamp" is abbreviated "TS."

In an embodiment of the present invention, search system 10 uses timestamp to provide decay over time within the different types of association graphs, such that the weight given to older associations decreases gradually over time. The association graphs thus reflect the users' current interests, which typically change over time.

For clarity of presentation, in the present application, including in the claims, a vertex of an association graph including a term is sometimes referred to simply as the term itself. For example, it may be stated that a first term of an association graph is linked to a second term of the association graph, rather than more verbosely stating that a first vertex of an association graph containing a first term is linked to a second vertex of the association graph containing a second term.

Association Scores

Figure 6:
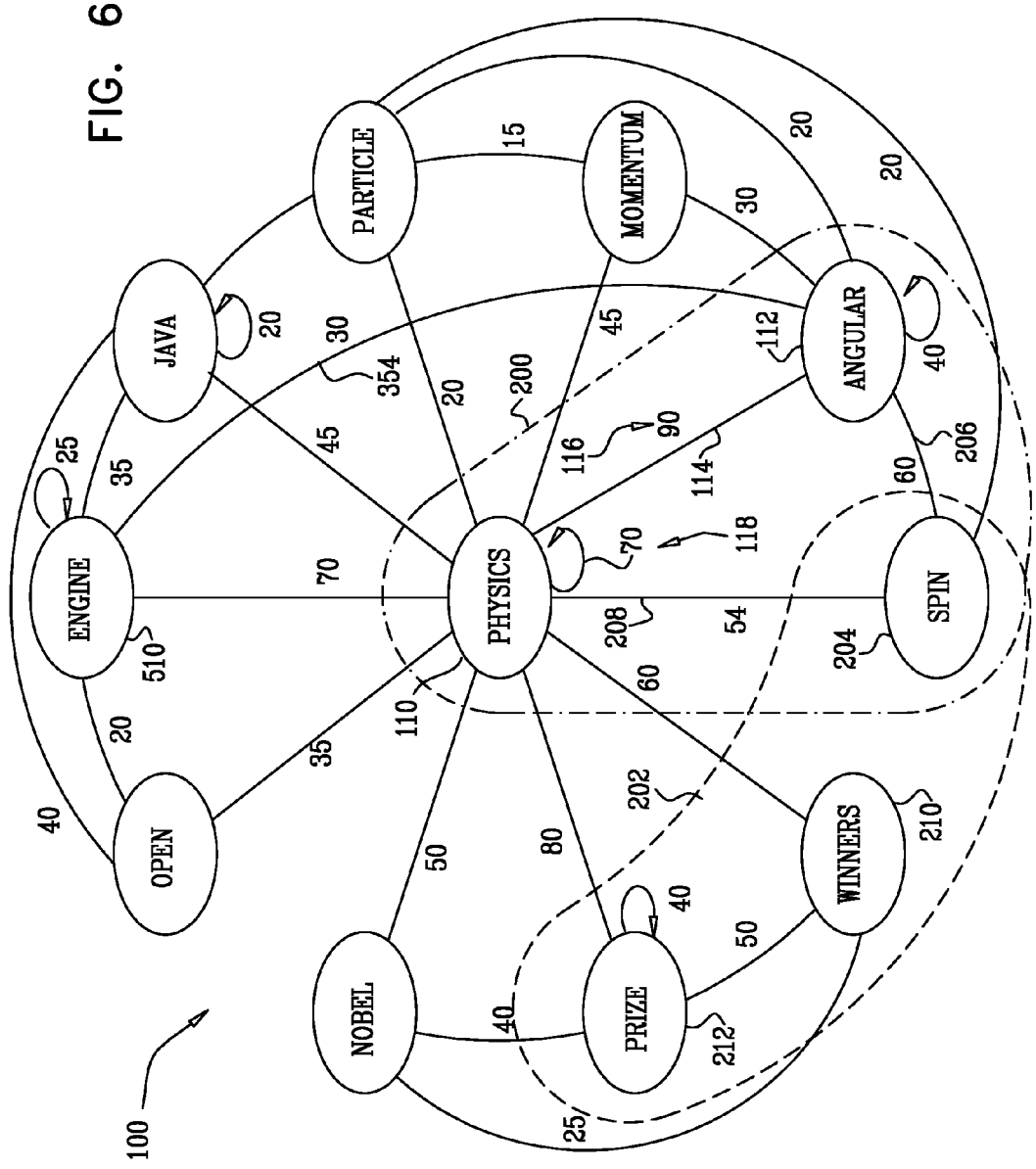
FIG. 6 shows two subgraphs of the association graph of FIG. 3, in accordance with an embodiment of the present invention.

Reference is made to FIG. 6, which shows two subgraphs of association graph 100 of FIG. 3, in accordance with an embodiment of the present invention. Numerous embodiments of the present invention utilize an association score that represents the strength of association among one or more vertices of a subgraph of an association graph. The association score typically takes into consideration both the scores of the edges within the subgraph, and a measure of balance among the scores. Subgraphs having greater balance are considered to have a greater strength of association, ceteris paribus.

In an embodiment of the present invention, the association score of a subgraph of an association graph is (a) positively related to a measure of an average of the edge scores linking the vertices within the subgraph, and (b) inversely related to a measure of variability of the edge scores. For example, the association score of the subgraph may be equal to the quotient of (a) the measure of the average, and (b) the measure of the variability. Optionally, the divisor (b) equals the sum of the measure of the variability and a constant, such as 1. For example, the measure of the average may be an arithmetic mean, a geometric mean, a median, or a mode, and the measure of variability may be a standard deviation or a variance.

For some applications, search system 10 uses the following equation to calculate the association score of a subgraph:

$$\text{association\_score} = \frac{\text{average\_edge\_score}}{\left(1 + \sqrt{\text{var(edge\_score)}}\right)} \quad \text{(Equation 1)}$$

In FIG. 6, exemplary association graph 100 includes first and second subgraphs 200 and 202. Subgraph 200 includes vertices 110 ("physics"), 112 ("angular"), and 204 ("spin"), linked by edges 114, 206, and 208. Applying Equation 1, the association score of subgraph 200 is calculated as:

$$\frac{(90 + 60 + 54)/3}{1 + sqrt[(90-68)^2 + (60-68)^2 + (54-68)^2]} = 68/[1 + sqrt(248)] = 4.06$$

If, for example, score 116 of edge 114 were 57 instead of 90, the association score would be 16.52. This higher score reflects the greater balance of subgraph 200, which outweighs the lower average than in the earlier example.

For some applications, the edge scores of the subgraph are normalized before applying Equation 1, typically by dividing each of the edge scores by a normalization factor equal to the greatest edge score in the subgraph, such that each edge score receives a normalized value of between 0 and 1. The result returned by Equation 1 is typically multiplied by the normalization factor. This normalization technique is reflected by the following equation:

$$\text{association\_score} = \text{normalization\_factor} \cdot \frac{\text{average\_normalized\_edge\_score}}{\left(1 + \sqrt{\text{var(edge\_score)}}\right)} \quad \text{(Equation 2)}$$

Application of Equation 2 to the exemplary values given above yields the following calculation of the association score of subgraph 200:

$$90 \cdot \frac{(90/90 + 60/90 + 54/90)/3}{1 + sqrt[(1-0.756)^2 + (0.667-0.756)^2 + (0.6-0.756)^2]} =$$

$$90 \cdot 0.756/[1 + sqrt(0.175)] = 57.9$$

Typically, the association score of a subgraph is defined to be zero if not all vertices of the subgraph are linked to all other vertices of the subgraph. The association score of subgraph 202 is thus zero, because vertex 204 ("spin") is linked to neither a vertex 210 ("winners") nor a vertex 212 ("prize") of the subgraph. Alternatively, for some applications, this condition is less rigid. For example, the association score may be non-zero if all of the vertices of the subgraph are linked to at least one other vertex of the subgraph, but not necessarily all of the other vertices of the subgraph.

The Background Processor

Reference is again made to FIG. 2. As mentioned above, background processor 50 collects and analyzes interactions between users 30 and search system 10. Background processor 50 comprises a feedback logger 300 and a feedback processor 302. Search-related events generated by user 30 enter feedback logger 300 in real-time, and the logger appends them to log files stored in at least one log 304, typically with no or minimal processing of the events. Such events include the entry of a search query consisting of one or more search terms into search field 52 of browser 36, selection of search results 54 of browser 36, selection of refinement options 66 of browser 36, and selection of advertisements in advertisement area 72 of browser 36.

Feedback processor 302 retrieves and processes the events stored in log 304. Such processing typically uses a pipeline architecture, in which packages of event data move in the pipeline from processing station to processing station, and are converted and/or integrated into various knowledge components, as described hereinbelow. Typically, the volume of data and the frequency of data transition/computation are reduced as the event data moves along the pipeline. For some applications, feedback processor 302 processes the events using techniques described in Dean J et al., "MapReduce: Simplified Data Processing on Large Clusters," USENIX Association OSDI '04: 6th Symposium on Operating System Design and Implementation, pp. 137-150 (2004), which is incorporated herein by reference.

Figure 7:
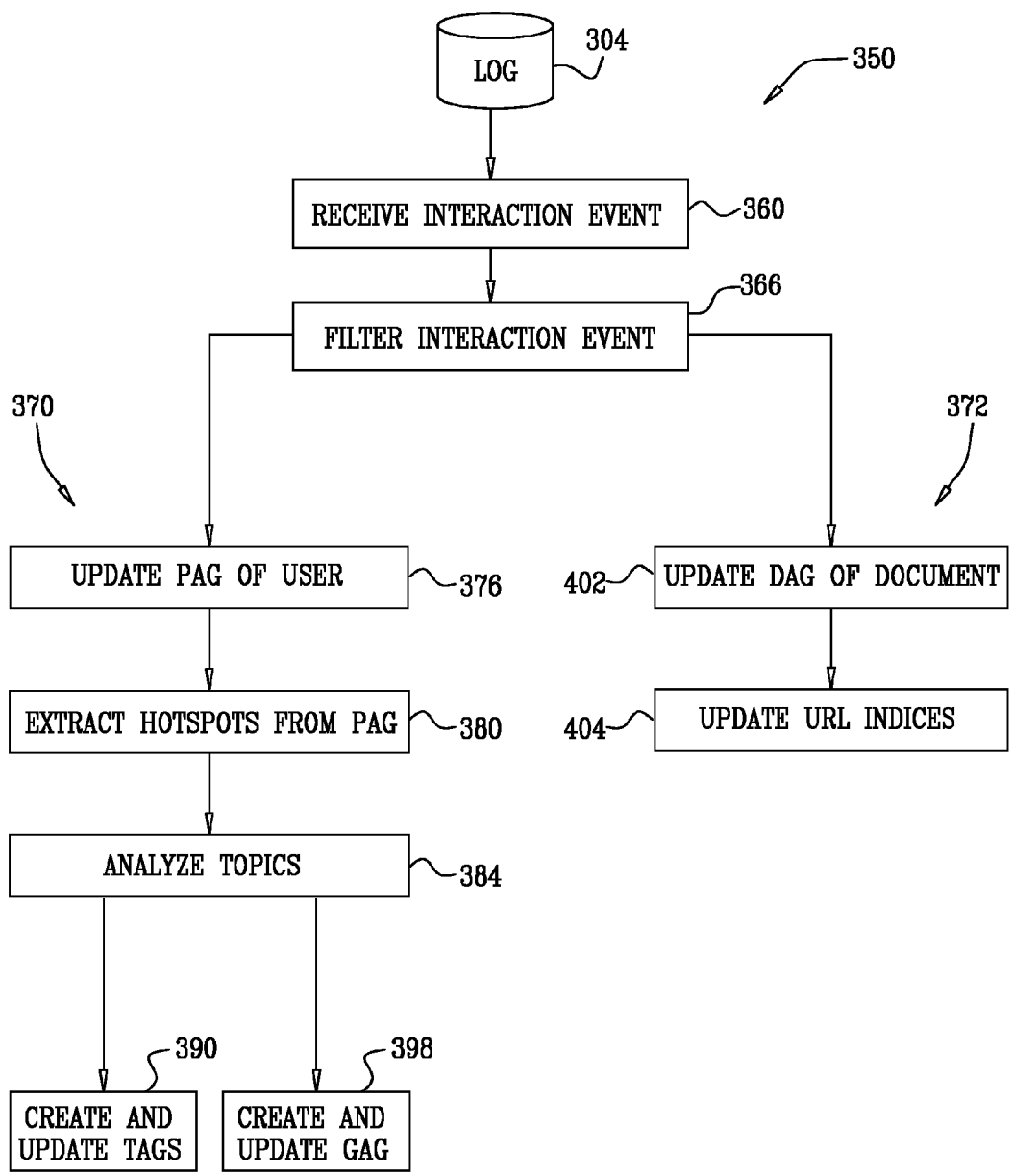
FIG. 7 is a flowchart schematically illustrating a method for processing interaction events, in accordance with an embodiment of the present invention.
Figure 8:
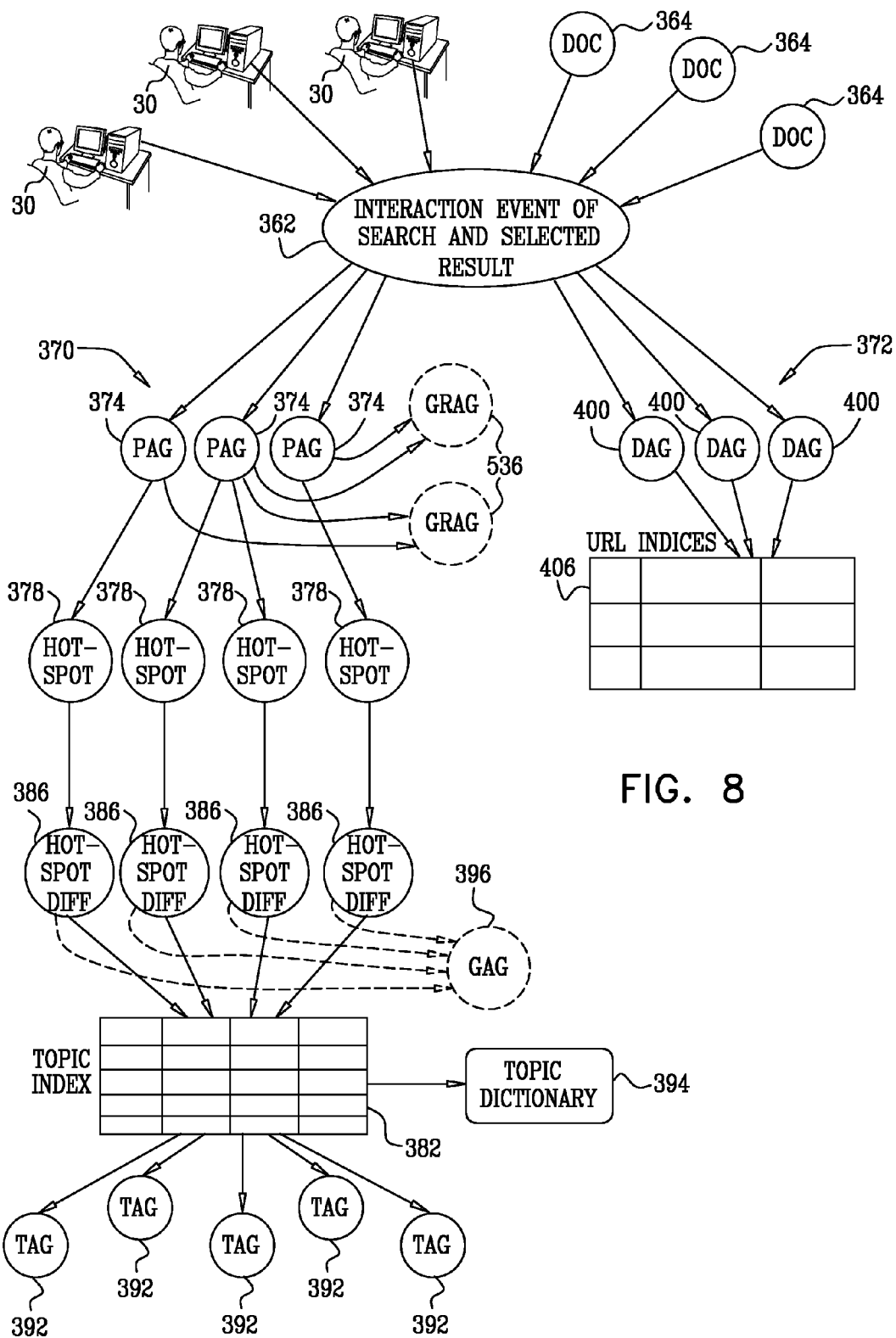
FIG. 8 is a schematic illustration of data flow associated with the method of FIG. 7, in accordance with an embodiment of the present invention.

Reference is made to FIGS. 7 and 8, which are a flowchart schematically illustrating a method 350 for processing interaction events, and a schematic illustration of data flow associated with the method, respectively, in accordance with an embodiment of the present invention. Method 350 begins with the receipt of an interaction event by feedback processor 302, at an event receipt step 360. Typically, an interaction event 362 (FIG. 8) is generated each time one of users 30 selects a document 364 (often associated with a URL) presented by search system 10 in response to a search query entered by the user. A single interaction event 362 thus represents a single interaction between a single query of a single user 30 and a single selected document 364. Typically, each document 364 is represented by a snippet that includes one or more of the keywords of the query, and the URL of the document.

A search query comprises one or more keywords, and, optionally, operators, such as Boolean operators and quotation marks. As mentioned above, the association graphs of embodiments of the present invention (e.g., PAGs, TAGs, DAGs, GRAGs, and the GAG) include vertices, each of which contains a single term. A term comprises one or more keywords, in a particular order. For some applications, feedback processor 302 attempts to resolve the keywords of a search query entered by user 30 into one or more multi-keyword terms, in order to find the best matches between the keywords of the query and the terms stored in the associations graphs. To perform such resolution, the feedback processor checks whether combinations of two or more of adjacent keywords in the query, preserving their order, match any of the vertices in the relevant association graph(s). Optionally, in making this determination, the feedback processor also takes into consideration the association score of the possible multi-keyword term with the other keywords and/or terms of the query.

Optionally, feedback processor 302 begins processing of events retrieved from log 304 by filtering out low quality events and adding information to valuable events, at a filtering step 366.

Feedback processor 302 passes each interaction event to two channels: a personal processing channel 370, and a document processing channel 372. Upon entrance to personal processing channel 370, feedback processor 302 updates a personal association graph (PAG) 374 (FIG. 8) of user 30, at an update PAG step 376. If the current interaction event is the first for the user, the feedback processor creates a new PAG for the user. A detailed description of the PAG updating process is provided hereinbelow with reference to FIG. 9.

Processing in personal processing channel 370 continues with the extraction of one or more hotspots 378 (FIG. 8) from the respective PAGs of each of users 30, at a hotspot extraction step 380. Hotspots 378 are subgraphs of a PAG that represent areas of particular importance to the user of the PAG. A detailed description of the hotspot extraction process is provided hereinbelow with reference to FIGS. 10 and 11.

Feedback processor 302 analyzes hotspots 378 of a plurality of users 30, such as all users 30 of a particular deployment of search system 10, to build a topic index 382 (FIG. 8), at a topic analysis step 384. For some applications, to more efficiently analyze changes in hotspots 378, feedback processor 302 calculates a hotspot difference graph 386 (FIG. 8) for each hotspot 378, which reflects changes to the hotspot since the feedback processor last analyzed the hotspot. Topic index 382 is updated based on hotspot difference graph 386, rather than directly based on hotspot 378. A detailed description of the topic index creation and maintenance process is provided hereinbelow with reference to FIGS. 12A-B.

At a topic association graph (TAG) processing step 390, feedback processor 302 analyzes topic index 382 to create and/or update one or more TAGs 392 (FIG. 8). TAGs 392 represent respective topics in which a plurality of users 30 have expressed, and, for some applications, continue to express, a strong interest. A detailed description of the TAG creation and maintenance process is provided hereinbelow with reference to FIG. 13.

For some applications, feedback processor 302 merges all hotspots 378 or hotspot difference graphs 386 of a particular deployment of search system 10, to create and maintain a global association graph (GAG) 396 (FIG. 8), at a global association processing step 398. The GAG represents the combined strongest interests of all users 30 of search system 10. (Alternatively, the feedback processor merges all or a large portion of the PAGs of a particular deployment of search system 10 to generate the GAG.)

As mentioned above, feedback processor 302 passes each interaction event to two channels: personal processing channel 370, and document processing channel 372. Upon entrance to document processing channel 372, feedback processor 302 updates a document association graph (DAG) 400 (FIG. 8) of the particular document 364 associated with interaction event 362, at an update DAG step 402. Generally, the same vertices, edge scores, and/or edge score updates generated from a given interaction event 362 are added to the DAG of the associated document as are added to the associated PAG of the user at update PAG step 376 above. Typically, such DAG updates include the same addition of terms from search results added to PAGs and/or incrementing of scores of such search results already included in the association graph, as described at steps 470 and 472 of method 450, described hereinbelow with reference to FIG. 9.

In an embodiment of the present invention, at update DAG step 402 the feedback processor additionally updates the DAG to reflect associations not directly included in the query terms, by adding relevant terms to the DAG. For example, such associations may be derived from the user's associations, associations of one or more communities to which the user belongs (either TAG-based or GRAG-based), or global associations reflected in the GAG. It is noted that the use of these techniques results in the inclusion of search terms in a DAG that do not appear in the associated document's snippet or in the associated document.

For some applications, feedback processor 302 uses one or more of the following techniques for adding such associations not directly included in the query terms:

the feedback processor adds at least a portion of at least one of the hotspots of user 30 to the DAG, such as the entire hotspot or the high point of the hotspot;

the feedback processor adds at least a portion of at least one of the topic IDs associated with user 30, as described hereinbelow with reference to FIGS. 12A-B and 13. For some applications, the feedback processor also adds one or more vertices directly connected to the topic ID in the associated TAG thereof; and the feedback processor adds one or more terms directly connected to all of the search terms in the user's PAG, at least one of the TAGs, at least one of the GRAGs, or the GAG.

Typically, the feedback processor damps the edge scores of these terms when adding them to the DAG, for example using damping techniques similar to those described hereinbelow at steps 470 and 42 of method 450, described hereinbelow with reference to FIG. 9.

At a URL indices step 404, feedback processor 302 updates one or more URL indices 406 (FIG. 8) associated with DAGs 400. URL indices 406 comprise a collection of inverted lists that are used by internal search processor 62 to efficiently locate appropriate URLs. The indices are built and updated based on data from the DAGs, or, alternatively or additionally, based on data from documents 364.

Typically, feedback processor 302 performs update PAG step 376 and update DAG step 402 at a high frequency, and the other steps of method 350 at a lower frequency.

Personal Association Graphs (PAGs)

Figure 9:
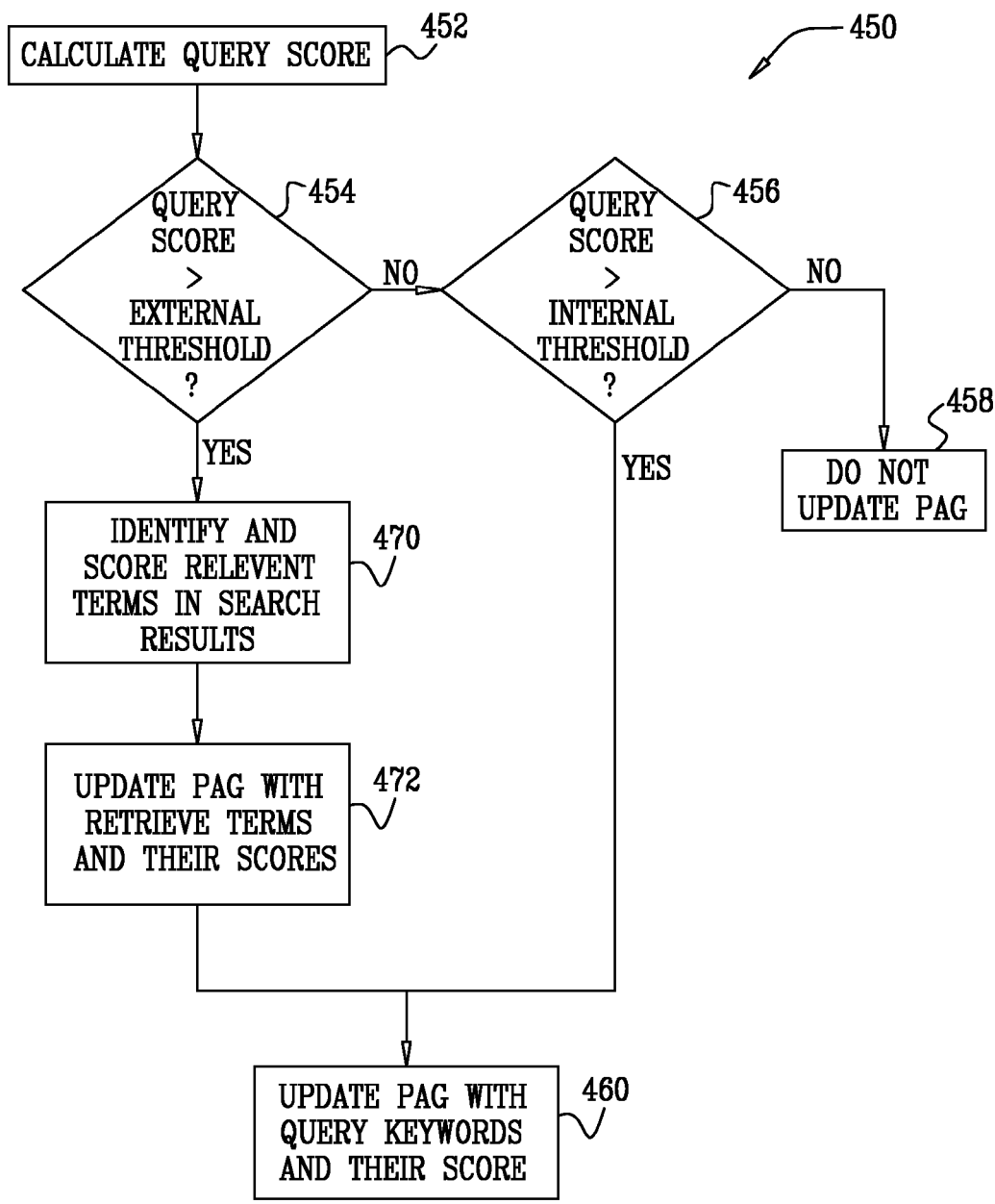
FIG. 9 is a flowchart schematically illustrating a method for creating and updating a personal association graph (PAG), in accordance with an embodiment of the present invention.

Reference is made to FIG. 9, which is a flowchart schematically illustrating a method 450 for creating and updating a PAG, in accordance with an embodiment of the present invention. Method 450 is performed at step 376 of method 350, described hereinabove with reference to FIG. 7.

Method 450 begins at a query score calculation step 452, at which feedback processor 302 calculates a query score for interaction event 362 (FIG. 8). The query score represents a level of relevance to the user of the query and its respective search results. Techniques for calculating the query score are described hereinbelow.

Feedback processor 302 checks whether the calculated query score exceeds an external threshold, at an external threshold check step 454. The external threshold is set at a level that reduces the likelihood of search information that is important to a particular user, but not to the search community, entering TAGs 392 and GAG 396 (FIG. 8). If the feedback processor finds that the query score does not exceed the external threshold, the feedback processor checks whether the query score exceeds an internal threshold, at an internal threshold check step 456. The internal threshold is set to a level that reduces the likelihood of search information entering the PAG for searches that are relatively unimportant for the user. If the feedback processor finds that the query score does not exceed the internal threshold, method 450 concludes at a non-update step 458, at which the feedback processor does not update the PAG.

If, on the other hand, feedback processor 302 finds at check step 456 that the query score does exceed the internal threshold, the feedback processor updates the PAG with the search terms of the query and the query score, at an update PAG step 460 (as mentioned above, each term includes one or more keywords). Any search terms not already included to the PAG are added thereto as vertices. The edge scores between the vertices holding the search terms of the query (whether the vertices were already included in the PAG, or newly added) are incremented by an increment value calculated based on the query score. For some applications, feedback processor 302 sets the increment amount equal to the quotient of the query score and the number of search terms in the query. If the query includes only a single search term, the entire increment value (which equals the query score) is added to the self-referential score of the vertex of the PAG including the search term. If the query includes exactly two search terms, the increment value (which equals half of the query score) is added to the score of the edge between the two vertices respectively containing the two search terms. If the query includes three or more search terms, the score of each of the edges between each pair of vertices containing the search terms is incremented by the increment value.

For example, assume that association graph 100 shown in FIG. 3 is a PAG; the query includes the search terms "physics" and "angular," neither of which were previously added to the PAG; and the query score is 90. The feedback processor adds vertices 110 ("physics") and 112 ("angular") to the PAG, and sets edge score 116 equal to 45, which equals the query score (90) divided by the number of search terms (2).

In an embodiment of the present invention, the query score of a given query is dependent upon one or more of the following attributes:

query-specific attributes, such as a measure of the number of keywords in the query, such as the number itself, or the number after subtracting the number of stop words in the query;

user-query-interaction attributes, such as the association score of the query within the user's PAG, or a level of focus of the user regarding the query; and user-result-interaction attributes, such as a relative position of a selected document in the search results for the query, or an amount of time spent by the user after selecting a document before returning to the same search results to select a subsequent document from the search results.

It is noted that the collection of these attributes by feedback processor 302 generally does not require any active user participation in generating the query score.

Query-specific attributes characterize aspects of the query that are often positively correlated with the quality of the interaction between the query and the results. These attributes include, but are not limited to:

the number of keywords in the query. In general, more specific queries include a greater number of keywords, and thus are more indicative of a higher quality of interaction between the query and the results; and the number of stop words in the query (i.e., keywords that are so commonly used that they cannot contribute to relevancy of the query, such as conjunctions, prepositions, and articles). In general, the inclusion of stop words in a query is indicative a low level of user expertise in the topic of the query. Typically, the number of keywords in the number-of-keyword attribute mentioned above is counted after removing stop words.

User-query-interaction attributes characterize aspects of the user's interaction with the query that are often positively correlated with the quality of the interaction between the query and the results. These attributes include, but are not limited to:

the association score of the query within the user's PAG. A higher association score generally correlates with a higher level of user expertise in the topic of the search. The association score is calculated using techniques described hereinabove with reference to FIG. 6. For example, using exemplary association graph 100 of FIG. 6 as a PAG, and Equation 2 to calculate the association score, the association score of the query consisted of the keywords "physics," "angular," and "spin" (representing subgraph 200) would be 57.9. For some applications, the association score is capped by a constant, such as 3; and a level of focus of the user regarding the query. A focused search within a specific topic is more indicative of a high-quality interaction than a quick search in which the user is just browsing the topic. The level of focus is typically represented by a focal grade.

In an embodiment of the present invention, feedback processor 302 calculates the focal grade of a query responsively to: (a) a measure of intersection of the set of terms of the query with a set of terms of a previous query conducted by the user, and (b) an association score of the previous query within the PAG of the user, calculated using the techniques described hereinabove with reference to FIG. 6. For some applications, the feedback processor calculates the focal grade by calculating a product of (a) and (b).

For some applications, the feedback processor uses the following equation to calculate the focal grade of a query (q2):

$$\text{focal grade } (q2) = \frac{1}{\lambda} \text{cosine}(q1, q2) \cdot (q1 score) \quad \text{(Equation 3)}$$

wherein q1 is the previous query, q1 score is the association score of the previous query within the PAG of the user, and $\lambda$ is a constant that serves as a normalization factor, so that $0 \leq \text{focal grade} \leq 1$. For example, $\lambda$ may between about 5 and about 10, e.g., about 7. For some applications, the cosine, i.e., measure of intersection, of q1 and q2, is calculated as:

$$\text{cosine}(q1,q2) = \text{set\_size}(q1 \cap q2)/\text{set\_size}(q1) \quad \text{(Equation 4)}$$

Typically, in order to identify the previous query (q1), feedback processor 302 considers the cosine (q1, q2) for all previous queries within the past t minutes, beginning with the most recent previous query. The feedback processor uses the first previous query identified that has at least one term in the intersection set. Alternatively, the feedback processor uses the previous query in the past t minutes that has the greatest cosine. t is typically between about 15 minutes and about 1 hour, e.g., about 30 minutes. Typically, feedback processor 302 eliminates stop words from the current query and the previous queries before determining the measure of intersection.

User-result-interaction attributes characterize aspects of the user's interaction with the search results of the query that are often positively correlated with the quality of the interaction between the query and the results. These attributes include, but are not limited to:

- a relative position of a selected document in the search results for the query. Typically, search results 54 (FIG. 2) are displayed as a list of snippets from each of documents in the search results. Each snippet typically includes one or more of the keywords of the query, and the URL of the document. In general, the selection by the user of a document lower on the list provides more information regarding the quality of the match between the selected document and the search query than the selection of the same document would provide if the document were located higher on the list, because the user decided to skip more documents not deemed to be relevant in order to arrive at the selected document; and
- an amount of time spent by the user after selecting a document before returning the same search results to select a subsequent document from the search results. For example, if the user returns to a Web page containing the search results within less than a threshold amount of time after selecting one of the results, this indicates that the user did not find the document meaningful for his search, and therefore did not interact with the document. For example, the threshold may be less than 5 seconds, such as less than 2 seconds.

In an embodiment of the present invention, feedback processor 302 uses the following equation for determining the query score:

$$\text{query score} = \log\left(\frac{(\text{real keyword no.}) \cdot \log(1 + \text{clicked } URL \text{ position})}{(1 + \text{stop words}/2)}\right. \\ \left. (1 + \text{focal grade}) + 1\right) \cdot (PAGscore(\text{query}) + 1) \quad \text{(Equation 5)}$$

For some applications, the log of (1+the clicked URL position on the list of documents) is capped by a constant, such as 3 (such that all results beyond position 999 on the list of results receive the same score).

Reference is again made to FIG. 9. For some applications, if feedback processor 302 finds at check step 454 of method 450 that the query score exceeds the external threshold, based on the search results the feedback processor adds one or more terms to the user's PAG that were not included in the user's query, and/or increments the scores of one or more terms already in the user's PAG that were not included in the user's query. Each such term includes one or more keywords. Such terms were implicitly included in the topic of the user's search, and thus may be of benefit for characterizing the user's search for future searches by the user or other users, and/or for characterizing the document(s) selected by the user in response to the query.

In order to add such terms and/or increment the scores thereof in the user's PAG, at an identification and scoring step 470 feedback processor 302 identifies one or more terms (each of which includes one or more keywords) that occur most often (and, typically, cross a threshold level of occurrence) in the documents of the search results for the query, or the displayed snippets of the document. (The use of snippets rather than entire documents generally is more meaningful, because the user's selection of a document is based on the words that appear in the snippet, rather than those that appear in the entire document.) To identify these terms, the feedback processor typically uses a "bag of words" approach, as is known in the search engine art. The feedback processor considers each of the terms (which includes one or more keywords) to be a category. The feedback processor assigns a score to each of the categories, which is indicative of the likelihood that the category is meaningful to the topic being searched. The score is typically based on the frequency with which the category appears in the search result snippets, optionally weighted by the position on the list of results of the snippets in which the category is found. This category identification and scoring is typically performed before the user selects one of the documents. For some applications, the category scores are further adjusted based on information from the DAGs of the snippets in which the categories are found, or based on information from a cluster of related DAGs in which each of the DAGs is found.

When the user selects a document from the search results, the feedback processor identifies the categories that appear in the snippet of the document, or, alternatively, the document itself. Optionally, the score of each of the categories is further weighted based on the position of the selected snippet on the results list, typically giving a greater weight for later positions of the selected snippet on the list. At an update PAG step 472, the feedback processor adds new vertices to the PAG for any of the terms of these categories that do not already have vertices in the PAG. The feedback processor identifies vertices between (a) each the vertices of the PAG holding the search terms of the query, on the one hand, and (b) each of the vertices of the PAG holding the terms of the categories (whether the vertices were already included in the PAG, or newly added). The edges scores of these vertices are incremented based on respective increment values for each of the categories. For some applications, the category having the greatest category score of those categories in the snippet (or the sole category) is given an increment value equal to a percentage of the increment value calculated at update PAG step 460 hereinabove, such as between about 25% and about 75%, e.g., about 50%. Each of the other categories (if any) is given a respective increment value equal to the increment value of the greatest category, times the category score of the other category, divided by the category score of the greatest category.

For example, assume exemplary association graph 100 of FIG. 6 is a PAG including a query consisting of the user-entered terms "physics," "angular," and "spin" (comprising subgraph 200), and the edge scores therebetween were incremented by an increment value of 30 at update PAG step 460 hereinabove. The feedback processor identifies that a snippet selected by the user in response to this query includes the term "particle," which has a category score of 20, and the term "momentum," which has a category score of 10. If not already present, new vertices are added to the PAG for "particle" and "momentum," both of which include edges with vertices 110 ("physics"), 112 ("angular"), and 204 ("spin"). Each of the three edges between "particle" and each of "physics," "angular," and "spin" is incremented by 15, which equals 50% of the increment value of 30 determined at update PAG step 460, and each of the three edges between "momentum" and each of "physics," "angular," and "spin" is incremented by 7.5, which equals 50% times 30 times the category score of "particle" (20), divided by the category score of "momentum" (10). If the identified category term includes a plurality of keywords (e.g., "nobel prize"), a new vertex is added to the PAG which includes the entire multi-keyword term as a single unit.

Typically, edges between the category terms (e.g., between "particle" and "momentum" in the example immediately above) are not incremented. Alternatively, they are incremented, typically after further damping their increment values.

This 25%-75% factor mentioned above serves to dampen the contribution of the terms added by inference to the PAG in comparison to those terms added to the PAG by explicit inclusion by the user in a query. Typically, if the query score is later adjusted, the increment values of the category terms are adjusted appropriately. Alternatively, the feedback processor otherwise dampens the edge scores of the added terms, such as by multiplying them by a value less than one.

In an embodiment of the present invention, the feedback processor adjusts the score of a category based on the frequency with which the keywords of the category are included in snippets appearing earlier (i.e., higher) on the list of snippets than the selected snippet appears. The feedback processor increases the score of the category based on how infrequently the keywords of the category appear in the earlier, non-selected snippets, and decreases the score of the category based on how frequently the keywords of the category appear in the earlier, non-selected snippets. In other words, the processor applies an adjustment factor that is inversely related to a frequency of appearance of the category keywords in earlier, non-selected snippets. The assumption motivating these adjustments is that the user is more likely to have chosen the selected snippet (rather than an earlier snippet) because of the presence of the category keywords if the category keywords do not also appear in earlier snippets.

After, before, or in parallel with performing step 472, the feedback processor performs update PAG step 460, described hereinabove, to update the PAG with the query keywords and their score.

Although feedback processor 302 is described hereinabove as performing the steps of method 450, for some applications, all or a portion of these steps are performed by agent 38, described hereinabove with reference to FIG. 1. For example, agent 38 may create and maintain a single user's PAG locally on workstation 32. Alternatively or additionally, agent 38 performs data collection for creating and maintaining the user's PAG, such as to secure the user's privacy, and transfers only relevant parameters for clustering to feedback processor 302 over WAN 34.

In an embodiment of the present invention, feedback processor 302 performs steps 460 and 470-472 for all queries, regardless of whether their query scores exceed the internal and external thresholds described hereinabove at steps 454 and 456. Alternatively, the feedback processor performs steps 460 and 470-472 for queries whose query scores exceed a single threshold. Alternatively, the feedback processor uses another test to determine whether to perform step 460 and/or steps 470-472.

Hotspots

Figure 10:
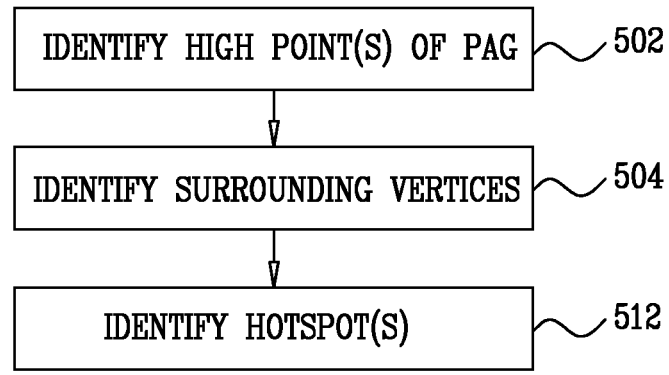
FIG. 10 is a flowchart schematically illustrating a method for extracting hotspots from a PAG, in accordance with an embodiment of the present invention.

Reference is now made to FIG. 10, which is a flowchart schematically illustrating a method 500 for extracting hotspots from a PAG, in accordance with an embodiment of the present invention. Method 500 is performed at step 380 of method 350, described hereinabove with reference to FIG. 7. At a high point identification step 502, feedback processor 302 identifies one or more high points of each PAG. The number of hotspots and/or high points identified per PAG is typically based on the size of the PAG. A high point is a vertex of a PAG that is more prominent than other vertices of the PAG, typically because: (a) the vertex has many edges, (b) the degree of the vertex (equal to the sum of the scores of its edges and any self-referential score) is high, and/or (c) the association score of a subgraph consisting of the vertex and its edges is high (as calculated using techniques described hereinabove with reference to FIG. 6). For some applications, such prominence is calculated relative to other vertices of the PAG. For some applications, such prominence is established only if threshold values for these criteria are met. For example, if exemplary association graph 100 of FIG. 6 is used as a PAG, vertex 110 ("physics") may represent a high point, e.g., because it has many edges, because its degree is high, and/or because its surrounding association score is high.

For each high point identified at step 502, feedback processor 302 identifies zero or more surrounding vertices within n degrees of separation of the high point, at a surrounding vertices identification step 504. For some applications, n is 1, while for other applications, n is greater than 1, such as 2 or 3. For some applications, the feedback processor includes only those surrounding vertices whose edges with the high point have scores exceeding a threshold score. For example, the feedback processor may identify surrounding vertices 112 ("angular"), 212 ("prize"), and 510 ("engine"), because the edge score of each of these vertices is at least 70.

At a hotspot identification step 512, the feedback processor identifies the combination of each identified high point of the PAG and its surrounding vertices as a hotspot. Each high point is considered a primary term, each surrounding vertex having one degree of separation from the high point is considered a secondary term, each surrounding vertex having two degrees of separation from the high point is considered a tertiary term, and so forth. Typically, when calculating the edge scores of the hotspot, the feedback processor includes all of the edge scores between all vertices of the hotspot. Alternatively, edge scores between secondary terms of the vertex are not included unless they have at least a certain statistically-important strength. For some applications, when the feedback processor identifies two directly linked high points in a PAG, a single hotspot is constructed from both high points and all other vertices of the PAG within a certain number of degrees of either high point, e.g., within one degree.

Alternatively or additionally, feedback processor 302 identifies hotspots of a PAG using graph partitioning techniques, as are known in the art (although not for the purpose of identifying hotspots), such as isoperimetric techniques or spectral techniques. These techniques are used to identify clusters with the PAG, which the feedback processor considers to be hotpots. For some applications, to identify hotspots, the feedback processor uses both these techniques and the hotspot-identification techniques described above in combination.

Figure 11:
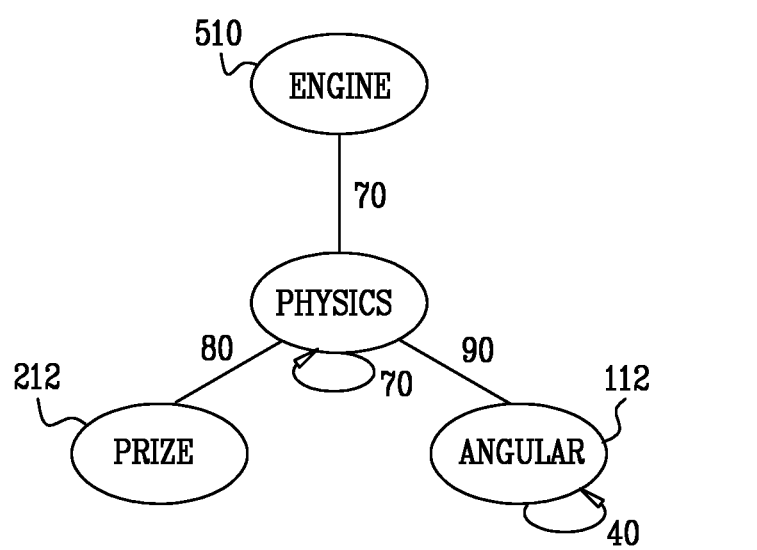
FIG. 11 is an exemplary hotspot, in accordance with an embodiment of the present invention.

Reference is made to FIG. 11, which is an exemplary hotspot 520, in accordance with an embodiment of the present invention. As mentioned hereinabove, each hotspot is an association graph, which can be represented, for example, as a graph or an adjacency matrix, and can be stored in an appropriate data structure, such as described hereinabove with reference to FIG. 5. Exemplary hotspot 520, shown in FIG. 11, is an association graph of the hotspot described by way of example at steps 502, 502, and 512 hereinabove.

For some applications, feedback processor 302 eliminates secondary edges that are not statistically significant, e.g., that have a score that is beyond a certain number of standard deviations from the average score of the hotspot, such as one standard deviation.

Topic Index

Reference is made to FIGS. 12A-B, which show an exemplary topic index 530, in accordance with an embodiment of the present invention. Feedback processor 302 creates and maintains topic index 382 (FIG. 8) at topic analysis step 384 of method 350, described hereinabove with reference to FIG. 7. As best seen in FIG. 8, topic index 382 is populated using information from a plurality of hotspots 378 generated from a plurality of PAGs 374 of a plurality of users 30. Typically, these pluralities respectively include all hotspots 378, all PAGs 374, and all users 30 of a particular deployment of search system 10.

As shown in FIG. 12A, each row of topic index 530 holds a primary index and, optionally, a secondary index, the terms of which are extracted from hotspots 378, together with the user identification code of the user 30 associated with the hotspot, the association score between the vertices of the hotspot holding the terms of the primary and secondary indices, and a list one the IDs of the one or more search results documents that contributed to the entry. The topic index thus serves to cluster related documents via their IDs.

The primary index consists of one more terms, each of which consists of one or more keywords. For example, using the data from hotspot 520 of FIG. 11, and assuming it was generated from a user 30 having an ID "001" who interacted with documents having the IDs 24, 26, and 123, the first row of topic index 530 indicates that, for user 001, the primary index includes the term "physics," which is linked to the term "engine" of the secondary index by an edge having a score of 70, and the primary and secondary terms have one degree of separation. The second row of topic index 530 indicates that, for a second user having ID "002" who interacted with documents having IDs 25, 27, and 123, the primary index has a term "physics" that is linked to the term "engine" of the secondary index by an edge having a score of 80, and the primary and secondary terms have one degree of separation.

When a term (which may include more than one keyword) is first added to the topic index, the term is added as a new primary index. If the term is added without any associated terms, the association score is simply the self-referential score of the term. When a term associated with the term(s) of a primary index in the topic index is added to the topic index from a hotspot (or hotspot difference graph), the new term is added as a secondary index.

For some applications, when a number of entries (each representing a different user) in the topic index containing the same primary and secondary indices crosses a threshold value, the term of the secondary index is combined with the term(s) of the primary index in order to create a multi-term primary index. The association score of the entry is equal to the association score of the terms of the primary index. The secondary index of the term is cleared. FIG. 12B shows the addition of the term "engine" to "physics" in the primary index, because the number of users (including user IDs 001, 002, and 004) reached the threshold value of three. For some applications, feedback processor 302 sets the threshold number of users separately for each primary index. For example, the threshold may be inversely related to the frequency with which the search terms are used by users of a particular deployment of search system 10, e.g., based on the scores of the search terms in GAG 396.

The cleared secondary index is later populated when a term is added to the topic index that is associated with all of the terms of the primary index. Such an additional term is also moved to the primary index when a threshold number of users having the same multi-term primary index also have the same secondary index. A topic index thus generally includes a mix of terms having different degrees of separation. For some applications, feedback processor 302 adds tertiary indices to provide second-degree associations even before the respective secondary terms have been promoted to be added to their respective primary indices.

It will be appreciated that the structure of topic index 530 is exemplary only, and that feedback processor 302 may use numerous data structures to store, organize, and retrieve the information stored in topic index 530, as will be evident to those skilled in the art who have read the present application.

As mentioned above regarding step 384 of method 350, described hereinabove with reference to FIG. 7, for some applications feedback processor 302 maintains topic index 382 by calculating a hotspot difference graph 386 (FIG. 8) for each hotspot 378. Each hotspot difference graph 386 reflects changes to the associated hotspot since the feedback processor last analyzed the hotspot. Topic index 382 is updated based on hotspot difference graph 386, rather than directly based on hotspot 378. The edge scores of the hotspot difference graphs are added to the appropriate values stored in topic index 382. Similarly, terms and groups of terms newly added to a hotspot difference graph are added to topic index 382. Since most values in the hotspot difference graphs will be null or zero at any given iteration, the use thereof enables feedback processor 302 to more efficiently analyze changes in hotspots 378 and update topic index 382.

In an embodiment of the present invention, topic index 382 includes a timestamp for each row, indicating when it was last updated. For some applications, feedback processor 302 uses the timestamp to provide decay over time, such that the weight given to older associations decreases gradually over time, until the associations are eventually removed from the topic index.

Topic Association Graphs (TAGs)

Figure 13:
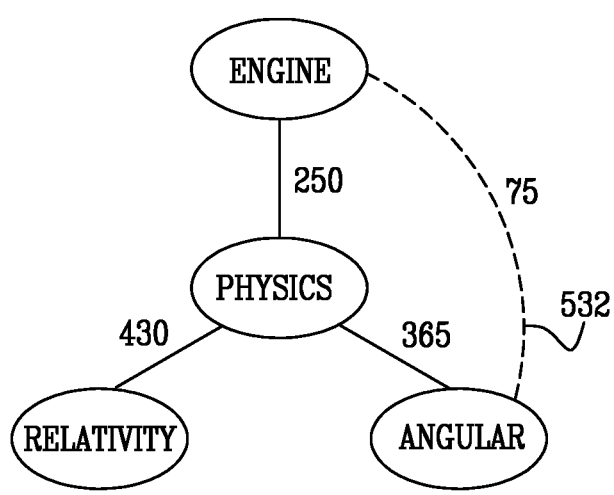
FIG. 13 shows an exemplary topic association graph (TAG), in accordance with an embodiment of the present invention.

Reference is made to FIG. 13, which shows an exemplary topic association graph (TAG) 540, in accordance with an embodiment of the present invention. Feedback processor 302 creates and maintains TAGs at step 390 of method 350, described hereinabove with reference to FIG. 7. In general, a TAG represents the interactions of a plurality of searches conducted by a plurality of users within a single topic. A TAG thus associates its topic with keywords, terms, pairs of words, and clusters of words, based on the search interactions of a plurality of users 30. The TAG is often a source of terms relevant to a user associated with the TAG, even thought the user has not explicitly identified such relevant terms by incorporating them in a search query.

For each primary index of topic index 382 the association score of which crosses a threshold value (for single-term threshold values), or receives multiple terms, as described above with reference to FIG. 12B, feedback processor: (a) creates a topic ID, which consists of the terms of the primary index, (b) adds the topic ID to a topic dictionary 394 (FIG. 8), and creates a new TAG 392 for the topic ID. As mentioned above, primary indices sometimes contain a single term (which may include a plurality of keywords), and sometimes contain a plurality of terms (each of which may include a plurality of keywords). Search system 10 uses the topic dictionary to efficiently access and track topic IDs, without having to extract this information from individual TAGs or the topic index. For some applications, the threshold number of users is set according to a frequency of utilization of the term in searches, e.g., is inversely related to the frequency of utilization. The threshold is thus lower for uncommonly used search terms than commonly used search terms.

In an embodiment of the present invention, each TAG 392 is a summation of all of the hotpots that contributed the topic of the TAG. Alternatively, in another embodiment, each TAG 392 is a summation of all associations within one degree of the topic ID of the TAG within all PAGs that contributed to the topic of the TAG.

In either embodiment, the resulting TAG sometimes includes vertices and/or secondary edges that were not necessarily members of any term-groups of topic index 382. A secondary edge of a TAG is an edge not included in a topic ID, such as an edge between two non-primary vertices for a TAG that has only primary and secondary vertices. For example, in TAG 540 of FIG. 13, an edge 532 is secondary. The score of edge 532 is typically the sum of the scores of this edge in all hotspots in which it appears, or the sum of the scores of this edge in all associations within one degree of the topic ID of the TAG within all PAGs that contributed to the topic of the TAG. For example, if we assume that association graph 100 of FIG. 3 represents the PAG of user ID 001, the score 75 of edge 532 of TAG 540 is the sum of the score 30 of an edge 534 of the PAG and one or more matching edges of PAGs of other users that have a sum of 45 (other PAGs not shown). In an embodiment of the present invention, instead of deriving topic index 382 and TAGs 392 from hotspots 378 (or hotspot difference graphs 386), feedback processor 302 derives the TAGs directly from PAGs 374 (or PAG difference graphs, which are analogous to hotspot difference graphs).

Group Association Graphs (GRAGs)

In an embodiment of the present invention, feedback processor 302 creates one or more GRAGs 536 by merging a plurality of correlated PAGs or their hotspots. For some applications, the feedback processor determines measures of association (e.g., correlations) among PAGs by building respective adjacency matrices for the PAGs, and determining measures of association (e.g., correlations) of the matrices.

For some applications, the feedback processor calculates the measures of association using techniques described hereinbelow at matrix correlation calculation step 572 of method 560, described hereinbelow with reference to FIG. 15. The same user 30 is often a member of a plurality of GRAGs based on the user's plurality of search interests.

The Online Processor

Reference is again made to FIG. 2. As mentioned above, online processor 60 provides online services to users 30, including search services, refinement services, and advertising services. Each of these services is now described in detail.

The Internal Search Processor

Figure 14:
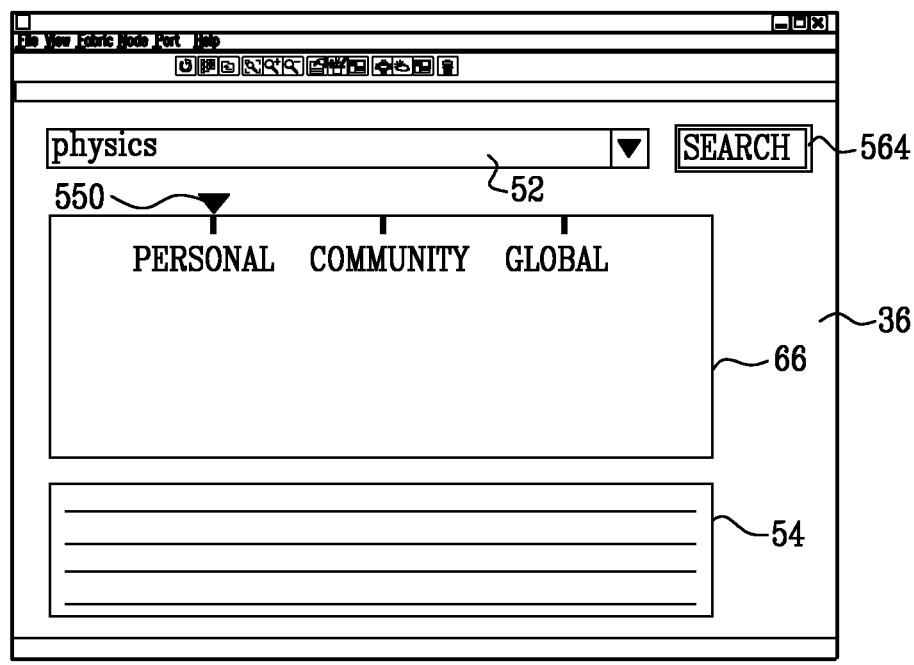
FIG. 14 is a schematic illustration of an exemplary screenshot of a browser including a search field and search results, in accordance with an embodiment of the present invention.

Reference is made to FIG. 14, which is a schematic illustration of an exemplary screenshot of browser 36 including search field 52 and search results 54, in accordance with an embodiment of the present invention. In general, internal search processor 62 of online processor 60 (FIG. 2) receives a search query in search field 52, and, responsively to the query, presents search results 54, typically as snippets from each of the documents in the search results. The search query typically includes one or more terms that are initially organized linearly in search field 52 (each of the terms includes one or more keywords).

Each snippet includes one or more of the keywords of the query, and the URL of the document. Using the techniques described herein, internal search processor 62 ranks and orders the results based on characteristics of the particular user, one or more communities to which the user belongs, and/or global characteristics of all of the users of the particular deployment of search system 10. For some applications, user 30 selects a desired preference regarding which of these characteristics should be used for ranking, such as by using a sliding pointer 550, or other means that will be evident to those skilled in the art who have read the present application.

Such preferences typically include one or more of:
  a personal-based preference—internal search processor 62
    determines the ranking of search results based at least in
    part on user-specific information, typically as reflected
    in PAG 374 of the user, as described hereinbelow with
    reference to FIG. 15;
  a community-based preference—internal search processor
    62 determines the ranking of search results based at least
    in part on community-specific information, typically as
    reflected in one or more TAGs 392 associated with the
    user and/or the query, as described hereinbelow; and
  a global-based preference—internal search processor 62
    determines the ranking of search results based at least in
    part on information regarding all or a large portion of the
    users of the particular deployment of search system 10,
    typically as reflected in GAG 396.

In an embodiment of the present invention, user 30 is able to select, a mixture of two or more of the preferences, for example by positioning sliding pointer 550 between two of the preferences. Internal search processor 62 ranks the search results based on a combination of the selected preferences, typically weighted by the position of the slider. For some applications, internal search processor 62 combines the selected preferences by normalizing the scores calculated below at matrix correlation calculation step 572 at least partially responsively to the position of the slider.

For some applications, internal search processor 62 stores and indexes snippets from documents that were selected from search results, typically together with the search query from which the search results were generated. For example, the internal search processor may use the Apache Lucene search engine (distributed by the Apache Software Foundation) for such storing and indexing.

Figure 15:
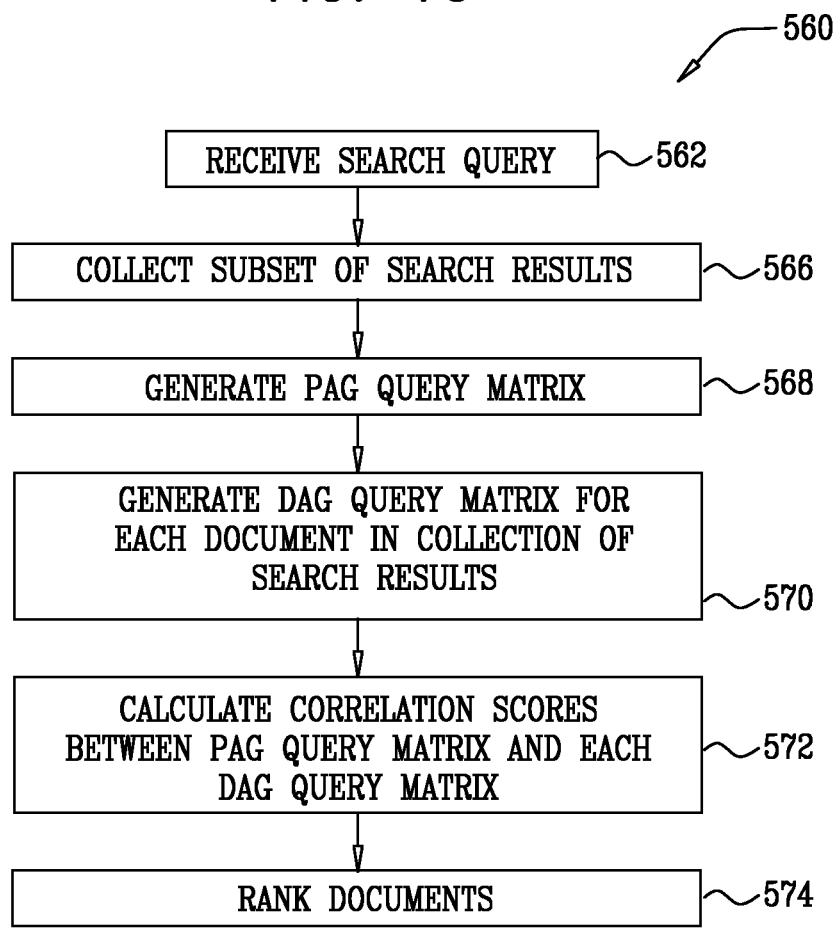
FIG. 15 is a flowchart schematically illustrating a method for performing a search and ranking the results thereof pursuant to a personal-based preference, in accordance with an embodiment of the present invention.

Reference is made to FIG. 15, which is a flowchart schematically illustrating a method 560 for performing a search and ranking the results thereof pursuant to a personal-based preference, in accordance with an embodiment of the present invention. At a query receipt step 562, internal search processor 62 receives a search query from user 30, typically via search field 52. Typically, the user 30 types in the keywords, and/or selects refinement options for addition to the query, such as described hereinbelow with reference to FIGS. 16-19. For some applications, the query is only searched when the user gives an instruction to execute the search, such as by clicking on a search button 564 (FIG. 14). Alternatively, preliminary search results are displayed to the user in real time as the user enters keywords into the search field.

Internal search processor 62 collects a subset of all search results for the search query, at a subset result collection step 566. As mentioned hereinabove, for some applications, search server 20 utilizes search results obtained from an external search engine 40, while for other applications, search system 10 comprises a search engine that performs the search functionality of external search engine 40. In either case, for most typical queries, the search engine returns thousands, or even millions, of results. At step 566 internal search processor 62 collects a portion of these results expected to be potentially of particular relevance to the query, and then ranks this portion for presentation to user 30.

In order to collect the portion of the search results, internal search processor 62 generates a plurality of search engine search queries based on the search query of user 30, and separately sends each of these search engine search queries to the search engine (e.g., external search engine 40). The internal search processor adds to the collection the top n results of each of these searches, as ranked by the search engine. Typically, n is between about 50 and about 150, such as about 100. For some applications, n is different for each of the search engine search queries.

The search engine search queries based on the search query include one or more of the following:
- the search query of user 30 itself, i.e., without any further processing;
- one or more PAG-based search engine search queries— each of which consists of the search query of user 30, with the separate addition of each of the terms in the user's PAG 374 that are directly linked to all of the terms in the search query. (As mentioned above, each term consists of one or more keywords.) In other words, the internal search processor creates a separate expanded search engine search query for each of these terms in the user's PAG, and separately sends each of these expanded search engine search queries to the search engine. Alternatively, if two or more of these terms in the user's PAG are highly associated with one another, these two or more terms are together added to the search query to generate a single expanded search engine search query for the terms. For some applications, the internal search processor creates expanded search engine search queries for only the portion of the linked terms within the PAG which have the greatest association scores with the search query of user 30; and
- one or more user-hotspot-based search engine search queries—each of which consists of the search query of user 30, with the separate addition of the high point term of each hotspot of the user's PAG 374. (As mentioned above, each term consists of one or more keywords.) In other words, the internal search processor creates a separate search engine search query for each of these high point terms, and separately sends each of these expanded search engine search queries to the search engine. Alternatively, the internal search processor creates expanded search engine search queries for only the portion of the high point terms whose hotspots have the greatest association scores within the PAG. For some applications, the internal search processor creates an expanded search engine search query only for each of the high point terms that the internal search processor validates against GAG 396 and/or one or more query-related TAGs 392. The internal search processor typically performs such validation by checking that all of the terms of the query and the high point term are linked in the GAG and/or query-related TAGs.

At a PAG query matrix generation step 568, internal search processor 62 generates one or more subgraphs of the user's PAG, each of which consists of all of the terms of the search query plus one or more terms of the PAG that are most highly linked in the PAG to all of the terms of the search query, typically as determined using the association scores of the subgraph consisting of the query terms plus each candidate term directly linked to all of the query terms in the PAG. The internal search processor determines the number of such terms to add to the subgraphs based on the strength of the association scores of each of the terms with the terms of the search query. If the user's PAG does not include all of the terms of the search query, internal search processor 62 typically cannot perform a personal ranking of the search results. This generally occurs when a search query represents an interest of the user not expressed in previous searches conducted by the user using the particular deployment of the search system 10.

Internal search processor 62 represents each of the subgraphs as an adjacency matrix, using techniques described hereinabove with reference to FIG. 4. Typically, the internal search processor establishes an order of the terms of the matrix beginning with the terms of the search query entered by the user, followed by the other remaining terms of the subgraph in descending order of their association scores with the terms of the search query.

At a DAG query matrix generation step 570, internal search processor 62 generates a matrix for each DAG 400 associated with each of the search result documents collected at step 566 above, for each of the PAG adjacency matrices generated at step 568 above. The size of each of the DAG matrices is set to match the size of the respective PAG matrix generated at step 568 above. The strongest terms of the DAG are included in the DAG matrix.

At a matrix correlation calculation step 572, internal search processor 62 calculates respective correlation scores between each of the PAG matrices generated at step 568 and each of the DAG matrices generated at step 570. Numerous techniques for calculating such scores will be evident to those skilled in the art who have read the present application. For example, such scores may be based on the scalar product of the PAG and DAG matrices. For some applications, when calculating the scores, greater weight is given to diagonals or values near the main diagonal. For some applications, terms that are absent from the PAG or DAG matrix are given reduced weights. For some applications, influence weights are assigned to the terms of PAG matrices responsively to a maturity of the PAG, calculated for example using Equation 9, mutatis mutandis.

For some applications, internal search processor 62 uses the following equation to the correlation score between a PAG matrix and a DAG matrix:

$$\text{Correlation score} = \sum_{\forall i,j} DAGM_{ij} * PAGM_{i,j} \alpha^{|i-j+1|} \quad \text{(Equation 6)}$$

wherein DAGM is the DAG matrix, and PAGM is the PAG matrix.

In an embodiment of the present invention, internal search processor 62 calculates a DAG query score for each DAG 400 associated with each of the search result documents collected at step 566 above. These DAG query scores are used at ranking step 574 hereinbelow. The DAG query score is a measure of correlation between the terms of the search query and the DAG. For some applications, the DAG query score is calculated responsively to an association score of the terms of the search query (as a subgroup) within the DAG, for example calculated using techniques described hereinabove with reference to FIG. 6. For other applications, the internal search processor calculates the DAG query score by building a matrix that represents the association scores between every two query terms in the DAG. For example, internal search processor 62 may use the following equation for calculating the DAG query score:

$$DAG \text{ query score} = \sum_{\forall i,j} W_{i,j} * \alpha^{|i-j+1|} \quad \text{(Equation 7)}$$

$$(0 \le i < n), (i \le j < n)$$

wherein $W_{i,j}$ is the association score between query terms $q_1$ and $q_2$, and $\alpha$ is constant, typically between 0 and 1, such as about 0.5.

For some applications, the resulting DAG query score is multiplied by a scaling factor $\beta$. For example, the scaling factor may be calculated using the following equation:

$$\beta = AQT/MS*(DAG \text{ maturity}) \quad \text{(Equation 8)}$$

wherein AQT is an average query term (the average to total score in the DAG of the query terms), MS is a maximum total score (the highest total score (of the strongest term) in the DAG), and DAG maturity reflects a level of maturity of the DAG. For example, if it is assumed that a mature DAG has about 500 vertices, the DAG maturity may be calculated using the following equation:

$$DAG \text{ maturity} = \sqrt{1 + \frac{\text{\# of terms in the } DAG}{500}} \quad \text{(Equation 9)}$$

At a ranking step 574, internal search processor 62 assigns a ranking score to each of the search result documents collected at step 568 above. The ranking scores typically are based on a combination of one or more of the following elements:
- a voting score, typically how many times a given document has been selected for viewing by any user of the particular deployment of search system 10;
- the DAG query score, as described hereinabove; and
- the PAG/DAG matrix correlation scores calculated at step 572 above.

For some applications, internal search processor 62 calculates the ranking score of each of the search result documents collected at step 566 above by summing the voting score, DAG query score, and PAG/DAG matrix correlation scores for the document.

Alternatively, only one or two of these scores are included in the sum. Typically, before summing the scores, internal search processor 62 normalizes the scores by:
- calculating the average of all voting scores for the top n documents;
- calculating the average of all DAG query score for the top n documents;
- calculating the average of all PAG/DAG matrix correlation scores for the top n documents;
- finding the maximum value of the three averages;
- finding a coefficient for the other two average values, equal to the maximum value divided by each of the respective other two averages; and
- normalizing the values of the two scores having the coefficients by multiplying these values by their respective coefficients.

Internal search processor 62 typically combines these internal rankings with the rankings generated by the search engine (e.g., external search engine 40) in response to the user's search query. In some deployments (particularly early in the deployment), only a portion of the search result documents generated by the external search engine have sufficiently mature DAGs to generate the ranking scores described above. The internal search processor therefore relies on a combination of the ranking scores assigned by the external search engine, and, for those documents assigned a ranking score as described, a combination of the external ranking score and this assigned ranking score.

For some applications, the internal search processor performs this combining by taking the external rankings and modifying the ranking of those that have internal rankings (calculated as described above) responsively to such internal rankings. For example, the internal search processor may use the following method to perform such re-ranking:
- normalizing the internal scores calculated as described above. For example, if the search result document with the highest score has a score of x, the normalized score of each other page may be set to (k/x*non-normalized score), where k is a constant such as 100;
- getting the positional rank of each search result document in the list of search result documents (or portion of thereof being used) generated by the external search engine; and
- for each document on the externally-generated list having an internal score, re-ranking the document responsively to the normalized internal score, such as by using the following equation:

new rank (i.e., position in search result list) = (Equation 10)

$$(\text{external position}) - \frac{(\text{external position})}{2} *$$
$$\left(\frac{\text{internal normalized score}}{100}\right) = (EP)\left(1 - \frac{(IS)}{200}\right)$$

For some applications, if two documents receive the same re-ranking position, the document with the highest original position on the externally-generated list is positioned earlier on the newly ranked list.

In an embodiment of the present invention, internal search processor 62 determines a community-based ranking of the search results using the techniques of method 560, described hereinabove with reference to FIG. 15, except that the internal search processor substitutes one or more TAGs 392 for the PAG used in method 560. The internal search processor selects one or more TAGs that may be a good source of ranking information. Minimally, in order for a TAG to be a candidate, the TAG must include all of the terms in the query. Typically, to select the candidate TAGs, internal search processor 62 determines one or both of top query-associated TAGs, and top user-associated TAGs. Typically, the internal search processor determines the top query-associated TAGs using techniques described hereinbelow at query-associated TAG determination step 806 of method 800, described with reference to FIG. 18, and the top user-associated TAGs using techniques described hereinbelow at user-associated TAG determination step 808 of method 800, mutatis mutandis. For some applications, these TAGs are used separately to generate search results from the search engine, while for other applications they are combined, such as described at step 810 of method 800, described hereinbelow with reference to FIG. 18. For some applications, internal search processor 62 substitutes one or more the above-mentioned TAGs for the PAG at PAG query matrix generation step 568.

In an embodiment of the present invention, to determine the community-based ranking using the techniques of method 560, the search engine queries performed by internal search processor 62 include one or more GRAG-based search engine search queries. Each of these queries consists of the search query of user 30, with the separate addition of each of the terms in each of the GRAGs to which user 30 belongs that are directly linked to all of the terms in the search query. (As mentioned above, each term consists of one or more keywords.) In other words, the internal search processor creates a separate expanded search engine search query for each of these terms in the GRAGs, and separately sends each of these expanded search engine search queries to the search engine.

For some applications, the internal search processor creates expanded search engine search queries for only the portion of the linked terms within the GRAG which have the greatest association scores with the search query of user 30. The addition of terms from GRAGs is particularly useful when the user's search query includes terms not in the user's PAG. In this case, the GRAGs may provide additional terms that are relevant to users who have similar PAGs to the PAG of the searching user. For some applications, terms are added from GRAGs only when the user's PAG cannot adequately provide additional terms. For some applications, internal search processor 62 substitutes one or more the above-mentioned GRAGs, or TAGs mentioned in the previous paragraph, for the PAG at PAG query matrix generation step 568.

In an embodiment of the present invention, internal search processor 62 determines a global-based ranking of the search results using the techniques of method 560, described hereinabove with reference to FIG. 15, except that the internal search processor substitutes a subgraph of GAG 396 for the PAG used in method 560. The subgraph typically consists of the search terms of the user's search query plus all or a portion of the terms of the GAG that are directly linked to all of the search terms. For some applications, internal search processor 62 substitutes the subgraph of the GAG for the PAG at PAG query matrix generation step 568.

The Refinement Processor

Figure 16:
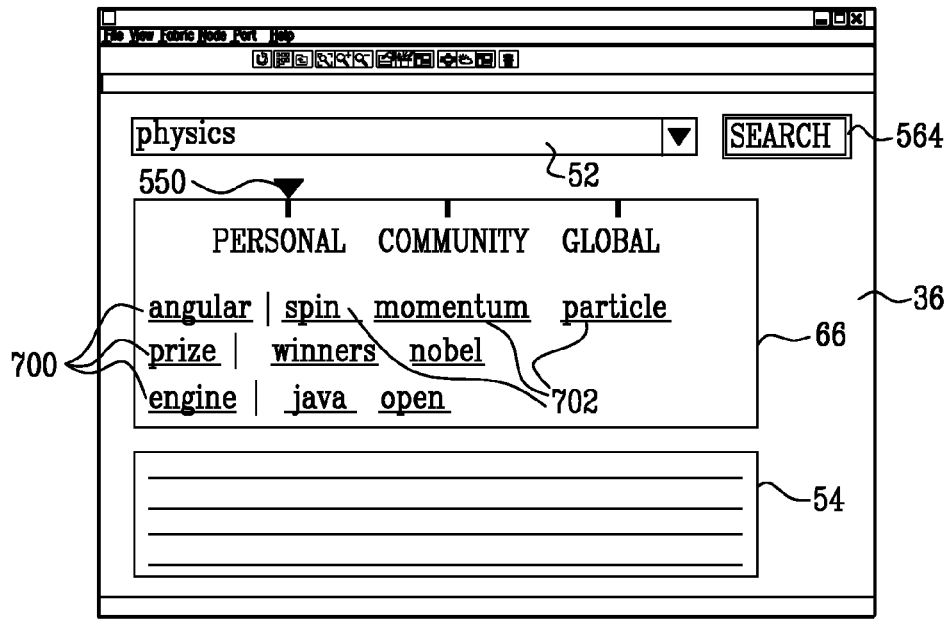
FIG. 16 is a schematic illustration of an exemplary screenshot of a browser including refinement options, in accordance with an embodiment of the present invention.

Reference is made to FIG. 16, which is a schematic illustration of an exemplary screenshot of browser 36 including refinement options 66, in accordance with an embodiment of the present invention. As mentioned above, refinement processor 64 of online processor 60 (FIG. 2) provides refinement options 66 in browser 36. Refinement options 66 are displayed on the main web page in the browser, in a dropdown list, in a window or frame in the browser, in a popup window, or otherwise as is known in the art.

As keywords or terms are added to search field 52 (either by user 30 typing in the keywords, or selecting previously presented refinement options for addition to the query), refinement processor 64 provides refinement options 66 in real-time or close to real-time. For some applications, refinement options comprise primary refinement options 700, and secondary refinement options 702 for at least a portion of the primary refinement options. The primary refinement options are those options that are most closely related to the search query, and the secondary refinement options are those options that are more distantly related to the search query, and are also related to their associated primary refinement option. For some applications, the refinement options comprise additional levels, which are typically hierarchical. For example, the refinement options may include tertiary refinement options for at least a portion of the secondary refinement options, which are still more distantly related to the search query, and are also related to the their associated primary and secondary refinement options. For some applications, refinement processor 64 drives web server 22 to display the secondary, tertiary, and any additional levels of refinement options using a hierarchical presentation structure, such as a tree.

In the exemplary screenshot shown in FIG. 16, the search query consists of "physics," and primary refinement options 700 consist of "angular," "prize," and "engine." Secondary refinement options 702 for "angular" consist of "spin," "momentum," and "particle."

In an embodiment of the present invention, search system 10 provides user 30 with a plurality of preferences for how refinement processor 64 determines which refinement options 66 to provide, and the ordering of the options. For some applications, user 30 selects the desired preference using sliding pointer 550, or other means that will be evident to those skilled in the art who have read the present application. Typically, the same sliding pointer 550 is provided for selecting refinement preferences as for selecting ranking preferences, as described hereinabove with reference to FIG. 14. Alternatively, separate sliding pointers are provided for indicating these preferences separately.

Such preferences typically include one or more of:
- a personal-based preference—refinement processor 64 determines which refinement options 66 to provide based on user-specific information, typically as reflected in PAG 374 of the user, as described hereinbelow with reference to FIG. 17;
- a community-based preference—refinement processor 64 determines which refinement options 66 to provide based on community-specific information, typically as reflected in one or more TAGs 392 associated with the user and/or the query, as described hereinbelow with reference to FIG. 18; and
- a global-based preference—refinement processor 64 determines which refinement options 66 to provide based on information regarding all or a large portion of the users of the particular deployment of search system 10, typically as reflected in GAG 396, as described hereinbelow with reference to FIG. 19.

In an embodiment of the present invention, user 30 is able to select a mixture of two or more of the preferences, for example by positioning sliding pointer 550 between two of the preferences. Refinement processor 64 provides refinement options 66 based on a combination of the selected preferences, typically weighted by the position of the slider. For some applications, the weighting is performed by setting the number of refinement options contributed by each of the preferences responsively to the relative position of the slider between the preferences.

Figure 17:
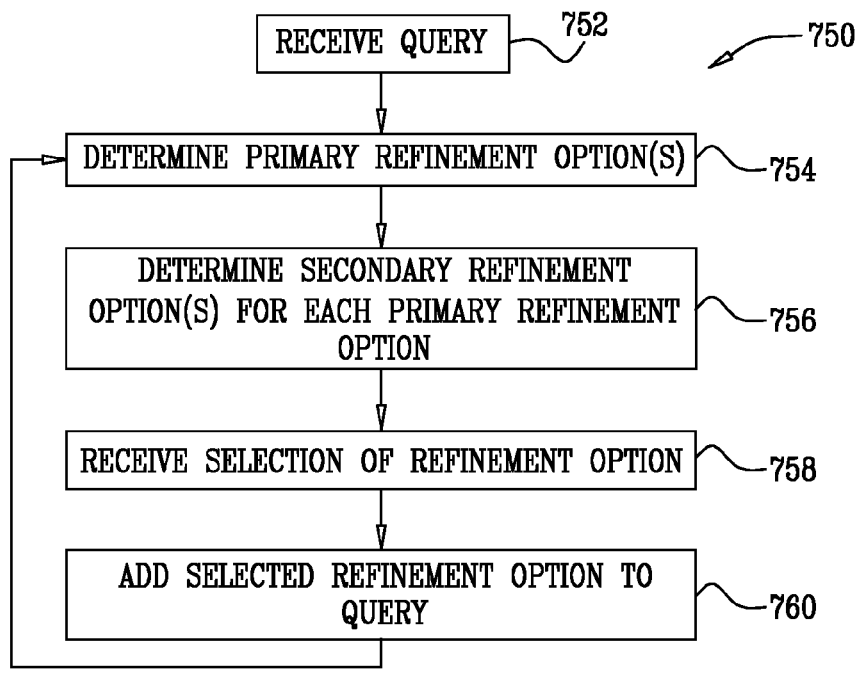
FIG. 17 is a flowchart schematically illustrating a method for presenting refinement options pursuant to a personal-based preference, in accordance with an embodiment of the present invention.

Reference is made to FIG. 17, which is a flowchart schematically illustrating a method 750 for presenting refinement options 66 pursuant to a personal-based preference, in accordance with an embodiment of the present invention. In this embodiment, refinement processor 64 determines which refinement options 66 to provide based on user-specific information, typically as reflected in PAG 374 of the user. Method 750 begins with the receipt of a search query by refinement processor 64, at a query receipt step 752. As mentioned above, a query consists of a one or more terms, each of which consists of one or more keywords. Although the query is typically displayed as a list of keywords, search system 10 typically stores the query as a collection of terms, each of which may include more than one keyword. For some applications, before refinement processor 64 presents the refinement options, internal search processor 62 automatically executes a search of the query, while for other applications, the query is searched only if the user gives an instruction to execute the search, such as by clicking on search button 564.

At a primary refinement options determination step 754, refinement processor 64 determines which primary options 700 (FIG. 16) to present to the user. Typically, refinement processor 64 determines a set of candidate refinement options by identifying all vertices of PAG 374 of the user that are directly linked to all of the terms of the query. For example, if we assume that association graph 100 of FIG. 3 represents the PAG of the user, and the query consists of "physics," refinement processor 64 would determine the following candidate refinement options: "spin," "angular," "momentum," "particle," "java," "engine," "open," "nobel," "prize," and "winners." Refinement processor 64 ranks these candidates, typically by: (a) creating respective subgraphs of the PAG consisting of the search terms (in this example, "physics") and the respective candidate refinement option, and (b) calculating an association score for each of the subgraphs, typically using techniques described hereinabove with reference to FIG. 6. The refinement processor typically selects as primary refinement options 700 the candidates with the top n scores, e.g., n equals 1, 2, 3, 4, or 5. In example shown in FIG. 16, n=3 and the candidates "angular," "prize," and "engine" have the top three scores, and are thus selected as primary refinement options 700. Alternatively, the refinement processor selects as primary refinement options 700 the candidates that have at least a threshold association score, or the candidates with the top n scores that also have at least the threshold association score.

The refinement options (primary and secondary) sometimes include at least one multi-keyword term, which, for some applications, is presented to the user as a unified term (e.g., the multiple keywords are underlined together), and, for other applications, is presented to the user as separate keywords.

At a secondary refinement options determination step 756 (which is optional), refinement processor 64 determines which secondary options 702 (FIG. 16) to present to the user for each of primary refinement options 700 determined at step 754. Typically, for each given primary refinement option 700, refinement processor 64 determines a set of candidate secondary refinement options by identifying all vertices of PAG 374 of the user that are directly linked to all of the terms of the query and the given primary refinement option. For example, if we assume that association graph 100 of FIG. 3 represents the PAG of the user, the query consists of "physics," and the given primary refinement option is "angular," refinement processor 64 would determine the following candidate secondary refinement options: "spin," "momentum," and "particle," and "engine." Refinement processor 64 ranks these candidates, typically by: (a) creating respective subgraphs of the PAG consisting of the search terms (in this example, "physics"), the given primary refinement option (in this example, "angular"), and the respective candidate secondary refinement option, and (b) calculating an association score for each of the subgraphs, typically using techniques described hereinabove with reference to FIG. 6. The refinement processor typically selects as primary refinement options 700 the candidates with the top m scores, e.g., m equals 1, 2, 3, 4, or 5. In example shown in FIG. 16, m=2 and the candidates "spin" and "momentum" have the top two scores, and are thus selected as secondary refinement options 702 for the primary refinement option "angular." Alternatively, the refinement processor selects as secondary refinement options 702 the candidates that have at least a threshold association score, or the candidates with the top m scores that also have at least the threshold association score.

User 30 selects one of the refinement options (typically by clicking on it), at a refinement option selection step 758. The selected refinement option is added to the query, at a query refinement step 760. Multi-keyword term refinement options are typically added to the query as a single term. For some applications, internal search processor 62 automatically executes a search of the refined query, while for other applications, the refined query is only searched if the user gives an instruction to execute the search, such as by clicking on search button 564. In either case, method 750 generates new refinement options responsively to the refined query, by returning to step 754.

Reference is made to FIG. 18, which is a flowchart schematically illustrating a method 800 for presenting refinement options 66 pursuant to a community-based preference, in accordance with an embodiment of the present invention. In this embodiment, refinement processor 64 determines which refinement options 66 to provide based on community-specific information, typically as reflected in one or more TAGs 392 associated with the user and/or the query. Method 800 begins with the receipt of a query by refinement processor 64, at a query receipt step 752. For some applications, before refinement processor 64 presents the refinement options, internal search processor 62 automatically executes a search of the query, while for other applications, the query is only searched if the user gives an instruction to execute the search, such as by clicking on search button 564.

At a candidate TAG selection step 804, refinement processor 64 selects one or more TAGs 392 that may be a good source of refinement options 66. Minimally, in order for a TAG to be a candidate, the TAG must include all of the terms in the query. Typically, to select the candidate TAGs, refinement processor 64 determines one or both of top query-associated TAGs, at a query-associated TAG determination step 806, and top user-associated TAGs, at a user-associated TAG determination step 808.

In an embodiment of the present invention, to determine the top query-associated TAGs, refinement processor 64 identifies all TAGs that contain all of the terms of the query. The refinement processor ranks the identified TAGs. For example, the ranking may be based on a comparison of the query with the term-group (topic ID) of each of the TAGs, or the association score of the subgraph of each of the TAGs which subgraph includes the terms of the query. The refinement processor selects the top n ranked TAGs (e.g., 5), and/or TAGs having at least a threshold comparison score with the query.

In an embodiment of the present invention, to determine the top user-associated TAGs, refinement processor 64 identifies all TAGs that contain all of the terms of the query, and to which the user contributed (i.e., terms and/or edge scores from the user's PAG were added to the TAG, typically via topic index 382, as described hereinabove with reference to FIG. 13). The refinement processor scores each of the identified TAGs, typically based on: (a) the user's contribution to the TAG's term-group (topic ID) score in relation to the TAG's total term-group score; (b) the association score of the TAG's term-group (topic ID) in the user's PAG; or (c) a combination of (a) and (b). For example, the combination may be calculated by taking the product of (a) and (b), the product of (b) and the square root of (a), or the product of (a) and the square root of (b). The refinement processor selects the top m ranked TAGs (e.g., 5), and/or TAGs having at least a threshold score.

At a TAG merger step 810, refinement processor 64 merges all of the candidate TAGs identified at candidate TAG selection step 804, to generate a merged community association graph. Alternatively, for each TAG the refinement processor generates a subgraph that consists of all terms in the TAG that are directly linked to all of the terms of the query. The refinement processor merges these subgraphs to generate the community association graph.

At a refinement option determination step 812, refinement processor 64 determines one or more primary refinement options 700, and, optionally, one or more secondary refinement options 702. The refinement processor typically uses the techniques described hereinabove at steps 754 and 756 of method 750, described with reference to FIG. 17, except that the refinement processor analyzes the merged community association graph instead of the user's PAG.

User 30 selects one of the refinement options (typically by clicking on it), at a refinement option selection step 814. The selected refinement option is added to the query, at a query refinement step 816. For some applications, internal search processor 62 automatically executes a search of the refined query, while for other applications, the refined query is only searched if the user gives an instruction to execute the search, such as by clicking on search button 564. In either case, method 800 generates new refinement options responsively to the refined query, by returning to step 804.

In an embodiment of the present invention, the refinement processor performs method 800 using one or more GRAGs instead of TAGs.

Reference is made to FIG. 19, which is a flowchart schematically illustrating a method 830 for presenting refinement options 66 pursuant to a global-based preference, in accordance with an embodiment of the present invention. In this embodiment, refinement processor 64 determines which refinement options 66 to provide based on information regarding all or a large portion of the users of the particular deployment of search system 10, typically as reflected in GAG 396.

Method 830 begins with the receipt of a query by refinement processor 64, at a query receipt step 832. For some applications, before refinement processor 64 presents the refinement options, internal search processor 62 automatically executes a search of the query, while for other applications, the query is only searched if the user gives an instruction to execute the search, such as by clicking on search button 564.

At a refinement option determination step 834, refinement processor 64 determines one or more primary refinement options 700, and, optionally, one or more secondary refinement options 702. The refinement processor typically uses the techniques described hereinabove at steps 754 and 756 of method 750, described with reference to FIG. 17, except that the refinement processor analyzes GAG 396 instead of the user's PAG.

User 30 selects one of the refinement options (typically by clicking on it), at a refinement option selection step 836. The selected refinement option is added to the query, at a query refinement step 838. For some applications, internal search processor 62 automatically executes a search of the refined query, while for other applications, the refined query is only searched if the user gives an instruction to execute the search, such as by clicking on search button 564. In either case, method 800 generates new refinement options responsively to the refined query, by returning to step 834.

Figure 20:
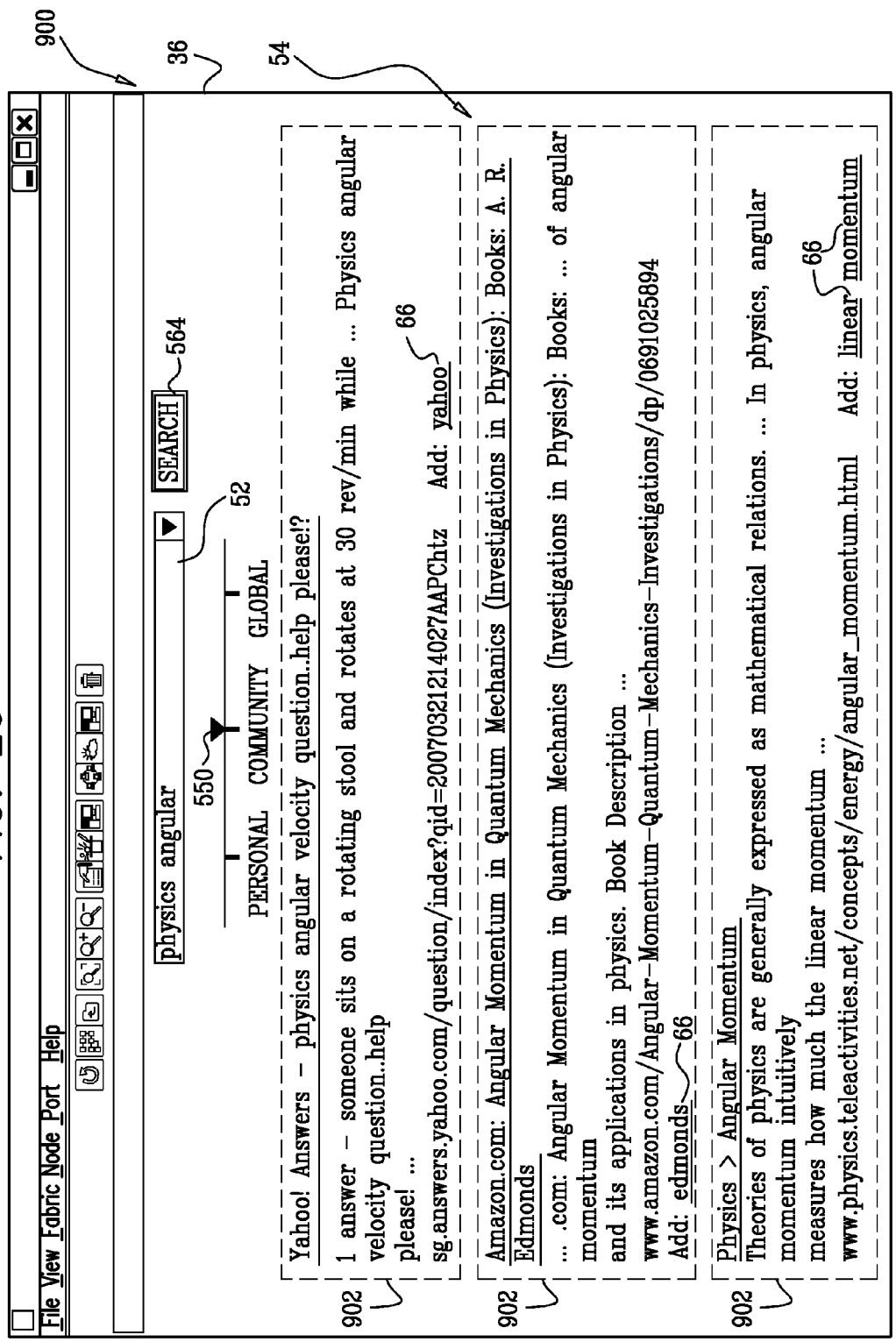
FIG. 20 is a schematic illustration of an exemplary screenshot of a browser including search results integrated with refinement options, in accordance with an embodiment of the present invention.

Reference is made to FIG. 20, which is a schematic illustration of an exemplary screenshot 900 of browser 36 including search results 54 integrated with refinement options 66, in accordance with an embodiment of the present invention. In this embodiment, online processor 60 drives web server 22 to display refinement options 66 (either primary refinement options 700 or secondary refinement options 702) in association with respective snippets 902 of search results 54. For display in association with each displayed snippet 902, refinement processor 64 selects one or more refinement terms that are of particular relevance to the snippet. Selecting one of the refinement terms by user 30 (typically by clicking on it) causes the online processor to add the selected term to search query 52, such as described hereinabove with at step 758 of method 750, described hereinabove with reference to FIG. 17.

For some applications, refinement processor 64 selects as refinement terms for each snippet 902 those terms in DAG 400 of the document associated with the snippet that have the greatest association scores with the terms of the search query in the DAG. Alternatively or additionally, the refinement processor selects as refinement terms one or more terms from one or more hotspots of DAG 400, which may be determined using techniques described hereinabove with reference to FIGS. 10-11, mutatis mutandis. For some applications, the refinement processor identifies candidate refinement terms from the one or more hotspots of DAG 400, and compares these terms to refinement options identified as described hereinabove with reference to FIGS. 16-19. As mentioned above, these refinement options may be identified responsively to a level of personalization selected by the user.

For some applications, techniques of this embodiment are used in combination with search engine techniques otherwise known in the art, without necessarily using the association-based clustering techniques of embodiments of the present invention. For example, the refinement options may be identified using techniques known in the art for generating refinement options, including, but not limited to, those described in some of the patent or non-patent references incorporated by reference in the Background of the Invention section.

In an embodiment of the present invention, refinement processor 64 uses one or more of the refinement terms to create a tag cloud, which presents additional search queries that may be of interest to the user, as is known in the art. The refinement processor identifies terms that are most closely associated with the search query, using techniques described herein.

Figure 21:
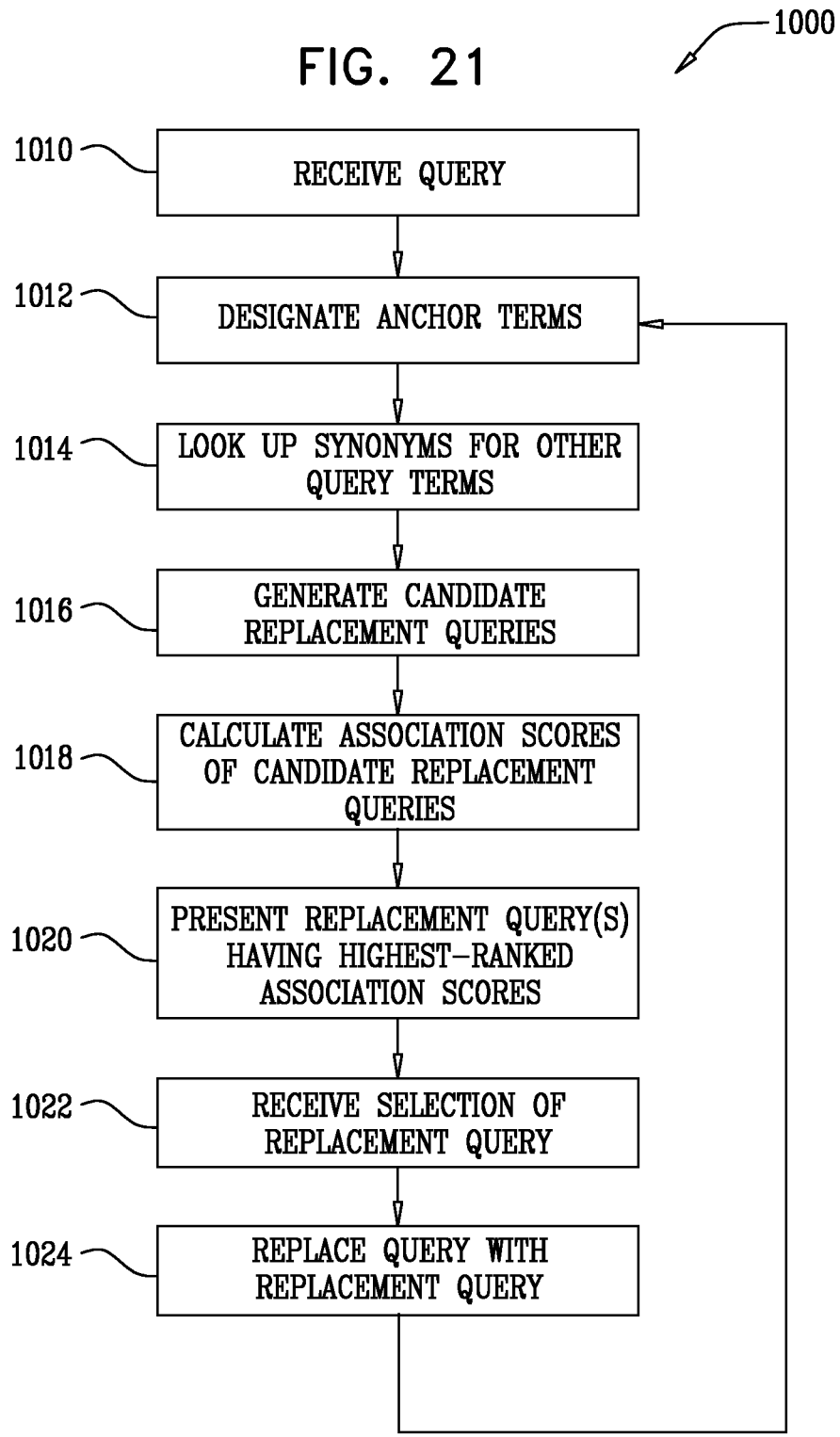
FIG. 21 is a flowchart schematically illustrating a method for presenting refinement options that include search term replacements, in accordance with an embodiment of the present invention.

Reference is made to FIG. 21, which is a flowchart schematically illustrating a method 1000 for presenting refinement options that include search term replacements, in accordance with an embodiment of the present invention. In this embodiment, refinement processor 64 is configured to present suggested replacements of one or more terms of the search query with substitute terms that may better express the intended search interest of user 30. Replacement of a search term with a substitute term often results in the broadening of the search query.

Method 1000 begins with the receipt of a search query by refinement processor 64, at a query receipt step 1010. As mentioned above, a query consists of a one or more terms, each of which consists of one or more keywords. Although the query is typically displayed as a list of keywords, search system 10 typically stores the query as a collection of terms, each of which may include more than one keyword. For some applications, method 1000 processes multiple-keyword terms as term units, while for other applications, the method processes the individual keywords of the terms, without regard to their membership in terms. For some applications, before refinement processor 64 presents the refinement options, internal search processor 62 automatically executes a search of the query, while for other applications, the query is searched only if the user gives an instruction to execute the search, such as by clicking on search button 564 (FIG. 14 hereinabove, and FIGS. 22 and 23 hereinbelow).

At an anchor term designation step 1012, refinement processor 64 designates one or more of the terms of the query as anchors. The anchors are generally particularly meaningful terms in the query, for which the refinement processor does not offer replacement options. According to a first technique for designating the anchor terms, the refinement processor looks up the part of speech of each term in a lexical database, such as a dictionary or thesaurus, e.g., WordNet® (Princeton University, Princeton, N.J.). If the query includes at least one noun, the refinement processor designates one or more of the nouns as anchors. Typically, the refinement processor designates as anchors one or more nouns having the fewest number of synonyms in the lexical database, such as exactly one noun or exactly two nouns. For some applications, the refinement processor sets the number of anchors for a given query based on the number of terms in the query. Alternatively or additionally, the refinement processor identifies a first anchor, and decides whether to designate a second anchor based on the number of synonyms of the noun in the query have the second-fewest number of synonyms. The second noun is included as a second anchor only if the second noun has no more than a threshold number of synonyms, e.g., no more than one synonym, or no synonyms.

For some applications, for queries that include no nouns, the refinement processor identifies one or more verbs of the query as anchors, using the techniques described above for identifying nouns as anchors. For some applications, for queries that include neither nouns nor verbs, the refinement processor identifies one or more adjectives of the query as anchors, using the techniques described above for identifying nouns as anchors. Alternatively, the refinement processor has no preference for any part of speech, and identifies one or more terms of the query as anchors based on the number of synonyms, as described above for nouns. Further alternatively, the refinement processor ranks the parts of speech in another order of preference, such as first verbs, or first adjectives.

According to a second technique for designating the anchors, the refinement processor designates the anchors based on the number of hits returned by external search engine 40 (FIG. 1) for each of the terms individually. Typically, those terms returning the fewest number of hits are designated as anchors. As in the first technique described above, the refinement processor typically has an order of preference for different parts of speech, such as a preference first for nouns, then verbs, and finally adjectives. For some applications, the refinement processor uses this technique in combination with the first technique mentioned above, and/or the third technique mentioned below.

According to a third technique for designating the anchors, the refinement processor designates the anchors based on the association scores of each of the terms individually within one or more association graphs, such as the PAG of the user, appropriate TAGs (or merged TAGs), or the GAG, typically based on the user's indicated preference, as described hereinabove with reference to FIGS. 16-19. Typically, those terms having the highest association scores are designated as anchors. As in the first technique described above, the refinement processor typically has an order of preference for different parts of speech, such as a preference first for nouns, then verbs, and finally adjectives. For some applications, the refinement processor uses this technique in combination with the first and/or second techniques mentioned above.

Sometimes the refinement processor does not identify any anchors for a query. For example, the refinement processor may not designate any anchors for a query if all of the terms of the query have numerous synonyms, return many hits, or have high association scores, or if the query includes only a single term.

After designating the anchor terms, refinement processor 64 looks up, in the lexical database, one or more synonyms for each of the remaining non-anchor terms in the query, at a synonym lookup step 1014. These synonyms represent potential substitute terms for their respective non-anchor terms. For some applications, for non-anchor terms having more than one synonym, the refinement processor also retrieves a measure of strength of synonymy between each of the synonyms and the original term. At step 1016 below, the refinement processor uses only the synonyms having the greatest measures, such as the top one or two synonyms. Alternatively, the refinement processor uses all of the synonyms at step 1016 below.

At a candidate generation step 1016, the refinement processor generates a plurality of candidate replacement queries. Each of the candidate replacement queries includes all of the anchor terms designated at step 1012, and, for each of the non-anchor terms in the query, either the non-anchor term itself, or a synonym thereof, as identified at step 1014. The plurality of candidate replacement queries typically includes all of the permutations for replacing non-anchor terms with the synonyms identified at step 1014.

For example, for the query "pregnancy abstain food Chinese medicine," the refinement processor may:
  designate "pregnancy" and "food" as anchor terms;
  identify the terms "refrain," "forbear," and "avoid" as synonyms of the non-anchor term "abstain," and select "refrain" and "avoid" as potential substitute terms because they have the greatest strength of synonymy with "abstain";
  identify the term "medication" as a synonym and potential substitute term for the non-anchor term "medicine"; and
  identify no synonyms for "Chinese."

In this example, identified candidate replacement queries would typically include the following permutations:
  "pregnancy refrain food Chinese medicine";
  "pregnancy avoid food Chinese medicine";
  "pregnancy abstain food Chinese medication";
  "pregnancy refrain food Chinese medication"; and
  "pregnancy avoid food Chinese medication."

At an association score calculation step 1018, the refinement processor calculates association scores of each of the candidate replacement queries within one or more association graphs, such as the PAG of the user, appropriate TAGs (or merged TAGs), or the GAG, typically based on the user's indicated preference, as described hereinabove with reference to FIGS. 16-19. Alternatively or additionally, the refinement processor ranks the candidate replacement queries responsively to a number of hits returned by external search engine 40 against each of the candidate replacement queries. For some applications, if the search query includes only a single term that has synonyms, the refinement processor checks the number of hits received by each of the synonyms using external search engine 40, and presents one or more of the synonyms responsively to the respective numbers of hits.

At a presentation step 1020, the refinement processor presents, as refinement options, one or more of the top scoring candidate replacement queries to user 30. Typically, the refinement processor presents between one and three replacement queries. For some applications, the refinement processor selects the number to present based on a measure of dominance among the scores of the candidates determined at step 1018. For example, if a single candidate replacement query has a dominant score, the refinement processor may decide to present only this candidate replacement query to the user as a refinement option.

The user selects one of the replacement queries (typically by clicking on it), at a refinement option selection step 1022. The current query is replaced with the selected replacement query, at a query replacement step 1024. For some applications, internal search processor 62 automatically executes a search of the refined query, while for other applications, the refined query is only searched if the user gives an instruction to execute the search, such as by clicking on search button 564. In either case, method 1000 typically generates new refinement options responsively to the refined query, by returning to step 1012.

Figure 22:
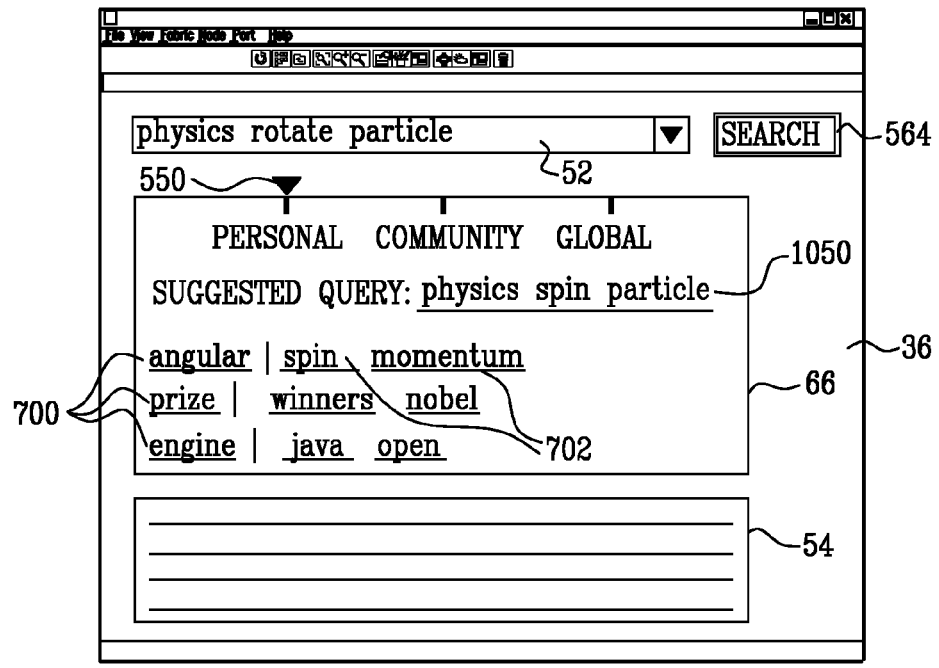
FIG. 22 is a schematic illustration of an exemplary screenshot of a browser including a suggested replacement query, in accordance with an embodiment of the present invention.

Reference is made to FIG. 22, which is a schematic illustration of an exemplary screenshot of browser 36 including a suggested replacement query 1050, in accordance with an embodiment of the present invention. In this embodiment, at presentation step 1020 of method 100 of FIG. 21, the refinement processor presents one or more replacement queries 1050 as hyperlinks. When the user clicks on one of the replacement queries, search field 52 is populated with the selected replacement query. Typically, refinement processor 64 presents both: (a) replacement queries 1050, and (b) the keyword-addition refinement options 66 described hereinabove with reference to FIGS. 16-20.

Figure 23:
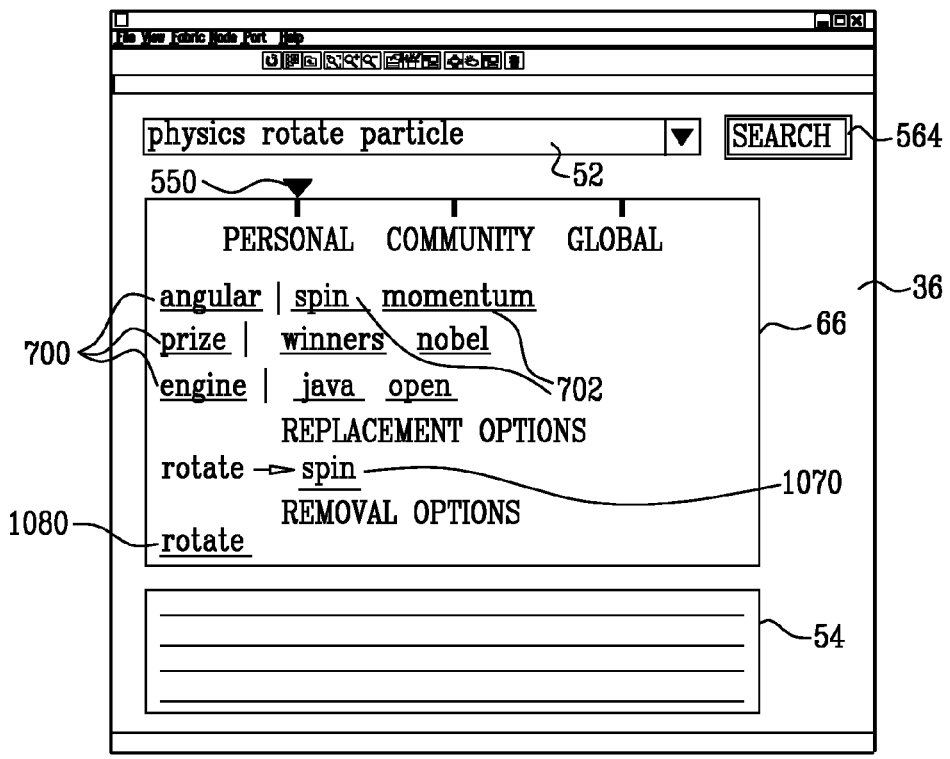
FIG. 23 is a schematic illustration of an exemplary screenshot of a browser including suggested replacement terms, in accordance with an embodiment of the present invention.

Reference is made to FIG. 23, which is a schematic illustration of an exemplary screenshot of browser 36 including suggested replacement terms 1070, in accordance with an embodiment of the present invention. In this embodiment, at presentation step 1020 of method 100 of FIG. 21, the refinement processor presents one or more of the synonyms identified at candidate generation step 1016, in association with the respective original query terms for which the synonyms are suggested replacements. For some applications, in order to decide which and/or how many such replacement terms to present, at step 1018 the refinement processor calculates separate association scores for the initial query with the substitution of each of the synonyms identified at step 1016. For some applications, the refinement processor presents one or more suggested replacement queries 1050, such as shown in FIG. 22, and one or more replacement terms 1070, as shown in FIG. 23. Replacement queries 1050 and replacement terms 1070 may represent the same or different substitutions.

In an embodiment of the present invention, refinement processor 64 alternatively or additionally presents term removal refinement options. Selection by the user of these suggested removal terms removes the terms from the search query. FIG. 23 shows an exemplary technique for displaying removal refinement options 1080. Typically, the refinement processor considers all non-anchor terms of the search query as candidates for removal. For some applications, the refinement processor selects for presentation to the user one or more of the query terms the inclusion of which in the search substantially reduces the number of hits returned by external search engine 40. Alternatively or additionally, the refinement processor selects for presentation to the user one or more of the query terms that has a weak association score with the other query terms within one or more association graphs, such as the PAG of the user, appropriate TAGs (or merged TAGs), or the GAG, typically based on the user's indicated preference, as described hereinabove with reference to FIGS. 16-19.

In an embodiment of the present invention, refinement processor 64 presents one or more of suggested replacement queries 1050, replacement terms 1070, and removal refinement options 1080 integrated with search results 54, such as in association with snippets, as described hereinabove with reference to FIG. 20, mutatis mutandis.

The Advertisement Processor

In an embodiment of the present invention, advertisement processor 70 of online processor 60 provides advertisement services, via web server 22 in advertisement area 72 in browser 36 (FIG. 2). Alternatively or additionally, the advertisements are integrated with search results 54, and/or displayed in a popup window, as is known in the art, or using other advertising display techniques known in the art. The advertising processor uses advertisement search and ranking techniques similar to those used for ranking document search results, as described hereinabove.

In some embodiments of the present invention, search system 10 uses only association graphs (e.g., PAGs, TAGs, and DAGs) that are characterized by a certain level of maturity, which may be measured, for example, by the number of edges of the association graph, or a total association score of the association graph. Immature association graphs generally do not provide meaningful information, so they are not used until they collect sufficient information over time.

The word "document," as used in the present application, including the claims, is to be understood broadly as referring to any digital unit of information, including, but not limited to, files (e.g., containing text, media, or hyperlinks), Web pages, newsgroup postings, and e-mails, which can be stored electronically on a computer or a network.

In some embodiments of the present invention, the search techniques described herein are combined with contextual search techniques known in the art.

Techniques of embodiments of the present invention typically improve the efficiency of searching, and conserve the use of computer resources.

The scope of the present invention includes embodiments described in the following applications, which are assigned to the assignee of the present application and are incorporated herein by reference. In an embodiment, techniques and apparatus described in one or more of the following applications are combined with techniques and apparatus described herein:

International Patent Application PCT/US07/67103, filed Apr. 20, 2007, entitled, "Search techniques using association graphs," which published as PCT Publication WO 07/124, 430;

U.S. patent application Ser. No. 11/633,461, filed Dec. 5, 2006, entitled, "A multi-directional and auto-adaptive relevance and search system and methods thereof," which published as US Patent Application Publication 2007/0250500;

U.S. Provisional Patent Application 60/793,253, filed Apr. 20, 2006, entitled, "Methods for using association graphs in search engines";

U.S. Provisional Patent Application 60/796,188, filed May 1, 2006, entitled, "Apparatus and methods thereof for search engine personalization";

U.S. Provisional Patent Application 60/829,136, filed Oct. 11, 2006, entitled; "Apparatus and methods thereof for search phrase refinement";

U.S. Provisional Patent Application 60/829,135, filed Oct. 11, 2006, entitled, "Apparatus and methods thereof for using explicit query refinements to tune search results ranking factors";

U.S. Provisional Patent Application 60/829,132, filed Oct. 11, 2006, entitled, "Apparatus and methods thereof for adaptive ranking mechanism using association graphs and contextual analysis";

U.S. Provisional Patent Application 60/886,193, filed Jan. 23, 2007, entitled, "Multi-directional and auto-adaptive relevance and search system and methods thereof";

U.S. Provisional Patent Application 60/887,580, filed Jan. 31, 2007, entitled, "Searchable banner display and apparatus that enables exploring destination content prior to reaching it"; and U.S. Provisional Patent Application 60/741,902, filed in January 2006, entitled, "A multi-directional and auto-adaptive relevance and search system and methods thereof."

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method comprising:
   receiving from a user, by a search system, a search query comprising terms, each of which comprises one or more keywords;
   using at least one association graph comprising terms, each of which comprises one or more keywords, generating, by the search system, a suggested replacement query by:
      designating one or more of the terms of the search query as anchor terms, and the remaining terms of the search query as non-anchor terms, and
      replacing one or more of the non-anchor terms of the search query with one or more suggested replacement terms, to generate the suggested replacement query that includes the one or more anchor terms and the one or more suggested replacement terms;
   presenting the suggested replacement query to the user; and,
   responsively to a selection of the suggested replacement query by the user, replacing the search query received from the user with the suggested replacement query, and presenting search results to the user generated responsively to the suggested replacement query.

2. The method according to claim 1, wherein receiving the search query comprises receiving the search query in a search field presented to the user, and wherein replacing the search query received from the user with the suggested replacement query comprises populating, by the search system, the search field with the suggested replacement query.

3. The method according to claim 1, wherein presenting the suggested replacement query to the user comprises presenting the suggested replacement query as a hyperlink, and wherein replacing comprises replacing responsively to the selection of the suggested replacement query made by the user clicking on the hyperlink.

4. The method according to claim 1, further comprising:
   presenting to the user, in addition to the suggested replacement query, one or more keyword-addition refinement options; and
   responsively to a selection of one of the keyword-addition refinement options by the user, adding the selected keyword-addition refinement option to the search query received from the user.

5. The method according to claim 1, wherein generating and presenting the suggested replacement query comprise generating and presenting a plurality of suggested replacement queries.

6. The method according to claim 5, wherein generating the suggested replacement queries comprises:
   generating a plurality of candidate replacement queries including the suggested replacement queries;
   calculating association scores of each of the candidate replacement queries within the at least one association graph; and
   selecting top-scoring ones of the candidate replacement queries as the suggested replacement queries.

7. The method according to claim 1, wherein the at least one association graph includes terms of the search query as vertices.

8. The method according to claim 1, wherein designating the one or more of the terms as the anchor terms comprises designating the one or more of the terms as the anchor terms responsively to respective association scores of each of the terms of the search query within the at least one association graph.

9. The method according to claim 1, wherein replacing the one or more of the non-anchor terms comprises identifying, as the one or more suggested replacement terms, synonyms of the one or more of the non-anchor terms of the search query.

10. The method according to claim 9, wherein identifying the synonyms comprises:
    using the at least one association graph, calculating respective strengths of association of each of the identified synonyms with the terms of the search query other than the one of the terms of the search query corresponding to the identified synonym; and,
    responsively to the calculated strengths of association, selecting as the one or more suggested replacement terms a portion of the identified synonyms including one or more of the identified synonyms.

11. The method according to claim 10, wherein calculating the respective strengths of association comprises calculating a strength of association of at least two of the identified synonyms with the terms of the search query other than the at least two of the terms of the search query respectively synonymous with the identified synonyms.

12. The method according to claim 9, wherein identifying the synonyms of the one or more of the terms of the search query comprises:
    retrieving, from a lexical database, respective measures of strength of synonymy between each of the synonyms and its synonymous term of the search query; and
    selecting only the synonyms having the greatest measures of strength as the identified synonyms.

13. The method according to claim 1, wherein designating as the anchor terms comprises determining, by the search system, a part of speech of each of the terms of the search query, and considering for designation as the anchor terms only those of the terms of the search query that are a particular part of speech.

14. The method according to claim 1, wherein designating as the anchor terms comprises determining how many synonyms each of the second query terms has in a lexical database, and designating as the anchor terms one or more of the second query terms having the fewest synonyms.

15. The method according to claim 1, wherein the at least one association graph comprises an association graph that represents interactions of previous user search queries with respective search result documents presented in response to the previous search queries.

16. The method according to claim 1, wherein the at least one association graph comprises a personal association graph (PAG) for the user that represents interactions of previous search queries of the user with respective search result documents presented to the user in response to the previous search queries.

17. The method according to claim 1, wherein the at least one association graph comprises a topic association graph (TAG) that represents interactions of previous search queries of a plurality of users including the user, conducted within a single topic, with respective search result documents presented to the users in response to the previous search queries.

18. The method according to claim 1, wherein the at least one association graph comprises a global association graph (GAG) that represents interactions of previous search queries of a plurality of users including the user with respective search result documents presented to the users in response to the previous search queries.

19. The method according to claim 1, wherein receiving the search query comprises receiving from the user an indication of a desired level of personalization of the suggested replacement terms, and wherein identifying the suggested replacement terms comprises selecting the at least one association graph for use at least in part responsively to the indication.

20. The method according to claim 19, wherein receiving the indication of the desire level of personalization comprises presenting to the user a range of levels of personalization, including a personalized level, a global level that is not personalized, and a community level between the personalized level and the global level, and receiving from the user the indication of a desired one of the levels.

21. The method according to claim 1, wherein replacing the one or more of the non-anchor terms comprises:
identifying a plurality of replacement terms;
using the at least one association graph, calculating respective strengths of association of each of the identified replacement terms with the terms of the search query other than the one of the terms of the search query corresponding to the identified replacement term; and,
responsively to the calculated strengths of association, selecting as the one or more suggested replacement terms a portion of the identified replacement terms.

22. The method according to claim 1, wherein generating the suggested replacement query comprises:
generating a plurality of candidate replacement queries including the suggested replacement query;
calculating association scores of each of the candidate replacement queries within the at least one association graph; and
selecting as the suggested replacement query the top-scoring one of the candidate replacement queries.

23. Apparatus comprising:
an interface; and
a processor, which is configured to receive from a user, via the interface, a search query comprising terms, each of which comprises one or more keywords; using at least one association graph comprising terms, each of which comprises one or more keywords, generate a suggested replacement query by: (a) designating one or more of the terms of the search query as anchor terms, and the remaining terms of the search query as non-anchor terms, and (b) replacing one or more of the non-anchor terms of the search query with one or more suggested replacement terms, to generate the suggested replacement query that includes the one or more anchor terms and the one or more suggested replacement terms; present, via the interface, the suggested replacement query to the user; and, responsively to a selection of the suggested replacement query by the user, replace the search query received from the user with the suggested replacement query, and present, via the interface, search results to the user generated responsively to the suggested replacement query.

24. The apparatus according to claim 23, wherein the processor is configured to receive the search query in a search field presented to the user, and to replace the search query received from the user with the suggested replacement query by populating the search field with the suggested replacement query.

25. The apparatus according to claim 23, wherein the processor is configured to present the suggested replacement query as a hyperlink, and to replace responsively to the selection of the suggested replacement query made by the user clicking on the hyperlink.

26. The apparatus according to claim 23, wherein the processor is further configured to present to the user, via the interface, in addition to the suggested replacement query, one or more keyword-addition refinement options; and, responsively to a selection of one of the keyword-addition refinement options by the user, to add the selected keyword-addition refinement option to the search query received from the user.

27. The apparatus according to claim 23, wherein the processor is configured to generate and present a plurality of suggested replacement queries.

28. The apparatus according to claim 27, wherein the processor is configured to generate the suggested replacement queries by: generating a plurality of candidate replacement queries including the suggested replacement queries; calculating association scores of each of the candidate replacement queries within the at least one association graph; and selecting top-scoring ones of the candidate replacement queries as the suggested replacement queries.

29. The apparatus according to claim 23, wherein the at least one association graph includes terms of the search query as vertices.

30. The apparatus according to claim 23, wherein the processor is configured to designate the one or more of the terms as the anchor terms responsively to respective association scores of each of the terms of the search query within the at least one association graph.

31. The apparatus according to claim 23, wherein the processor is configured to replace the one or more of the non-anchor terms by identifying, as the one or more suggested replacement terms, synonyms of the one or more of the non-anchor terms of the search query.

32. The apparatus according to claim 31, wherein the processor is configured to identify the synonyms by: using the at least one association graph, calculating respective strengths of association of each of the identified synonyms with the terms of the search query other than the one of the terms of the search query corresponding to the identified synonym;

and, responsively to the calculated strengths of association, selecting as the suggested replacement terms a portion of the identified synonyms including one or more of the identified synonyms.

33. The apparatus according to claim 32, wherein the processor is configured to calculate the respective strengths of association by calculating a strength of association of at least two of the identified synonyms with the terms of the search query other than the at least two of the terms of the search query respectively synonymous with the identified synonyms.

34. The apparatus according to claim 31, wherein the processor is configured to identify the synonyms of the one or more of the terms of the search query by: retrieving, from a lexical database, respective measures of strength of synonymy between each of the synonyms and its synonymous term of the search query; and selecting only the synonyms having the greatest measures of strength as the identified synonyms.

35. The apparatus according to claim 23, wherein the processor is configured to designate as the anchor terms by determining a part of speech of each of the terms of the search query, and considering for designation as the anchor terms only those of the terms of the search query that are a particular part of speech.

36. The apparatus according to claim 23, wherein the processor is configured to determine how many synonyms each of the second query terms has in a lexical database, and to designate as the anchor terms one or more of the second query terms having the fewest synonyms.

37. The apparatus according to claim 23, wherein the at least one association graph comprises an association graph that represents interactions of previous user search queries with respective search result documents presented in response to the previous search queries.

38. The apparatus according to claim 23, wherein the at least one association graph comprises a personal association graph (PAG) for the user that represents interactions of previous search queries of the user with respective search result documents presented to the user in response to the previous search queries.

39. The apparatus according to claim 23, wherein the at least one association graph comprises a topic association graph (TAG) that represents interactions of previous search queries of a plurality of users including the user, conducted within a single topic, with respective search result documents presented to the users in response to the previous search queries.

40. The apparatus according to claim 23, wherein the at least one association graph comprises a global association graph (GAG) that represents interactions of previous search queries of a plurality of users including the user with respective search result documents presented to the users in response to the previous search queries.

41. The apparatus according to claim 23, wherein the processor is configured to receive from the user an indication of a desired level of personalization of the suggested replacement terms, and to identify the suggested replacement terms by selecting the at least one association graph for use at least in part responsively to the indication.

42. The apparatus according to claim 41, wherein the processor is configured to present, via the interface, to the user a range of levels of personalization, including a personalized level, a global level that is not personalized, and a community level between the personalized level and the global level, and to receive from the user the indication of a desired one of the levels.

43. The apparatus according to claim 23, wherein the processor is configured to replace the one or more of the non-anchor terms by: identifying a plurality of replacement terms; using the at least one association graph, calculating respective strengths of association of each of the identified replacement terms with the terms of the search query other than the one of the terms of the search query corresponding to the identified replacement term; and responsively to the calculated strengths of association, selecting as the one or more suggested replacement terms a portion of the identified replacement terms.

44. The apparatus according to claim 23, wherein the processor is configured to generate the suggested replacement query by: generating a plurality of candidate replacement queries including the suggested replacement query; calculating association scores of each of the candidate replacement queries within the at least one association graph; and selecting as the suggested replacement query the top-scoring one of the candidate replacement queries.

45. A computer software product, comprising a tangible computer-readable medium in which program instructions are stored, which instructions, when read by a computer, cause the computer to receive from a user a search query comprising terms, each of which comprises one or more keywords; using at least one association graph comprising terms, each of which comprises one or more keywords, generate a suggested replacement query by: (a) designating one or more of the terms of the search query as anchor terms, and the remaining terms of the search query as non-anchor terms, and (b) replacing one or more of the non-anchor terms of the search query with one or more suggested replacement terms, to generate the suggested replacement query that includes the one or more anchor terms and the one or more suggested replacement terms; present the suggested replacement query to the user; and, responsively to a selection of the suggested replacement query by the user, replace the search query received from the user with the suggested replacement query, and present search results to the user generated responsively to the suggested replacement query.

46. The computer software product according to claim 45, wherein the instructions, when read by the computer, cause the computer to receive the search query in a search field presented to the user, and to replace the search query received from the user with the suggested replacement query by populating the search field with the suggested replacement query.

47. The computer software product according to claim 45, wherein the instructions, when read by the computer, cause the computer to present the suggested replacement query as a hyperlink, and to replace responsively to the selection of the suggested replacement query made by the user clicking on the hyperlink.

48. The computer software product according to claim 45, wherein the instructions, when read by the computer, cause the computer to present to the user in addition to the suggested replacement query, one or more keyword-addition refinement options; and, responsively to a selection of one of the keyword-addition refinement options by the user, to add the selected keyword-addition refinement option to the search query received from the user.

49. The computer software product according to claim 45, wherein the instructions, when read by the computer, cause the computer to generate and present a plurality of suggested replacement queries.

50. The computer software product to claim 49, wherein the instructions, when read by the computer, cause the computer to generate the suggested replacement queries by: generating a plurality of candidate replacement queries including the suggested replacement queries; calculating association scores of each of the candidate replacement queries within the at least one association graph; and selecting top-scoring ones of the candidate replacement queries as the suggested replacement queries.

51. The computer software product according to claim 45, wherein the at least one association graph includes terms of the search query as vertices.

52. The computer software product according to claim 45, wherein the instructions, when read by the computer, cause the computer to designate the one or more of the terms as the anchor terms responsively to respective association scores of each of the terms of the search query within the at least one association graph.

53. The computer software product according to claim 45, wherein the instructions, when read by the computer, cause the computer to replace the one or more of the non-anchor terms by identifying, as the one or more suggested replacement terms, synonyms of the one or more of the non-anchor terms of the search query.

54. The computer software product according to claim 53, wherein the instructions, when read by the computer, cause the computer to identify the synonyms by: using the at least one association graph, calculating respective strengths of association of each of the identified synonyms with the terms of the search query other than the one of the terms of the search query corresponding to the identified synonym; and, responsively to the calculated strengths of association, selecting as the suggested replacement terms a portion of the identified synonyms including one or more of the identified synonyms.

55. The computer software product according to claim 54, wherein the instructions, when read by the computer, cause the computer to calculate the respective strengths of association by calculating a strength of association of at least two of the identified synonyms with the terms of the search query other than the at least two of the terms of the search query respectively synonymous with the identified synonyms.

56. The computer software product according to claim 53, wherein the instructions, when read by the computer, cause the computer to identify the synonyms of the one or more of the terms of the search query by: retrieving, from a lexical database, respective measures of strength of synonymy between each of the synonyms and its synonymous term of the search query; and selecting only the synonyms having the greatest measures of strength as the identified synonyms.

57. The computer software product according to claim 45, wherein the instructions, when read by the computer, cause the computer to designate as the anchor terms by determining a part of speech of each of the terms of the search query, and considering for designation as the anchor terms only those of the terms of the search query that are a particular part of speech.

58. The computer software product according to claim 45, wherein the instructions, when read by the computer, cause the computer to determine how many synonyms each of the second query terms has in a lexical database, and to designate as the anchor terms one or more of the second query terms having the fewest synonyms.

59. The computer software product according to claim 45, wherein the at least one association graph comprises an association graph that represents interactions of previous user search queries with respective search result documents presented in response to the previous search queries.

60. The computer software product according to claim 45, wherein the at least one association graph comprises a personal association graph (PAG) for the user that represents interactions of previous search queries of the user with respective search result documents presented to the user in response to the previous search queries.

61. The computer software product according to claim 45, wherein the at least one association graph comprises a topic association graph (TAG) that represents interactions of previous search queries of a plurality of users including the user, conducted within a single topic, with respective search result documents presented to the users in response to the previous search queries.

62. The computer software product according to claim 45, wherein the at least one association graph comprises a global association graph (GAG) that represents interactions of previous search queries of a plurality of users including the user with respective search result documents presented to the users in response to the previous search queries.

63. The computer software product according to claim 45, wherein the instructions, when read by the computer, cause the computer to receive from the user an indication of a desired level of personalization of the suggested replacement terms, and to identify the suggested replacement terms by selecting the at least one association graph for use at least in part responsively to the indication.

64. The computer software product according to claim 63, wherein the instructions, when read by the computer, cause the computer to present to the user a range of levels of personalization, including a personalized level, a global level that is not personalized, and a community level between the personalized level and the global level, and to receive from the user the indication of a desired one of the levels.

65. The computer software product according to claim 45, wherein the instructions, when read by the computer, cause the computer to replace the one or more of the non-anchor terms by: identifying a plurality of replacement terms; using the at least one association graph, calculating respective strengths of association of each of the identified replacement terms with the terms of the search query other than the one of the terms of the search query corresponding to the identified replacement term; and responsively to the calculated strengths of association, selecting as the one or more suggested replacement terms a portion of the identified replacement terms.

66. The computer software product according to claim 45, wherein the instructions, when read by the computer, cause the computer to generate the suggested replacement query by: generating a plurality of candidate replacement queries including the suggested replacement query; calculating association scores of each of the candidate replacement queries within the at least one association graph; and selecting as the suggested replacement query the top-scoring one of the candidate replacement queries.

* * * * *